US011839212B2

(12) United States Patent
Manhas et al.

(10) Patent No.: US 11,839,212 B2
(45) Date of Patent: Dec. 12, 2023

(54) SYNERGISTIC PESTICIDAL COMPOSITIONS AND METHODS FOR DELIVERY OF INSECTICIDAL ACTIVE INGREDIENTS

(71) Applicant: 0903608 B.C. Ltd., Vancouver (CA)

(72) Inventors: Karan Manhas, Vancouver (CA); Annett Rozek, Port Moody (CA); Eric Van Fleet, Burnaby (CA)

(73) Assignee: 0903608 B.C. Ltd., Vancouver (CA)

( * ) Notice: Subject to any disclaimer, the term of this patent is extended or adjusted under 35 U.S.C. 154(b) by 36 days.

(21) Appl. No.: 17/280,116

(22) PCT Filed: Sep. 27, 2019

(86) PCT No.: PCT/CA2019/051388
§ 371 (c)(1),
(2) Date: Mar. 25, 2021

(87) PCT Pub. No.: WO2020/061709
PCT Pub. Date: Apr. 2, 2020

(65) Prior Publication Data
US 2022/0000107 A1    Jan. 6, 2022

Related U.S. Application Data

(60) Provisional application No. 62/829,512, filed on Apr. 4, 2019, provisional application No. 62/829,525, filed on Apr. 4, 2019, provisional application No. 62/829,010, filed on Apr. 3, 2019, provisional application No. 62/737,907, filed on Sep. 27, 2018, provisional application No. 62/737,914, filed on Sep. 27, 2018.

(51) Int. Cl.
*A01N 37/06* (2006.01)
*A01N 37/02* (2006.01)
*A01N 37/36* (2006.01)
*A01N 43/22* (2006.01)
*A01N 43/36* (2006.01)
*A01N 43/56* (2006.01)
*A01N 65/22* (2009.01)
*A01N 65/26* (2009.01)

(52) U.S. Cl.
CPC ............ *A01N 37/06* (2013.01); *A01N 37/02* (2013.01); *A01N 37/36* (2013.01); *A01N 43/22* (2013.01); *A01N 43/36* (2013.01); *A01N 43/56* (2013.01); *A01N 65/22* (2013.01); *A01N 65/26* (2013.01)

(58) Field of Classification Search
CPC ......... A01N 43/22; A01N 37/02; A01N 37/06
See application file for complete search history.

(56) References Cited

U.S. PATENT DOCUMENTS

| 3,867,300 | A | 2/1975 | Karabinos et al. |
| 4,585,795 | A | 4/1986 | Linderborg |
| 5,346,698 | A | 9/1994 | Abercrombie |
| 5,362,634 | A | * 11/1994 | Boeck ........................ C12P 1/06 |
| | | | 435/252.1 |
| 5,631,290 | A | 5/1997 | Almond et al. |
| 5,648,390 | A | 7/1997 | Vander Meer et al. |
| 5,750,402 | A | 5/1998 | Guri et al. |
| 5,801,153 | A | 9/1998 | Badaway |
| 5,869,517 | A | 2/1999 | Muller et al. |
| 6,103,768 | A | * 8/2000 | Savage ................... A01N 43/00 |
| | | | 514/483 |
| 6,451,731 | B1 | 9/2002 | Agbaje et al. |
| 6,599,514 | B1 | 7/2003 | Greenland et al. |
| 6,841,572 | B2 | 1/2005 | Horst et al. |
| 7,014,861 | B2 | 3/2006 | Roorda et al. |
| 7,820,594 | B2 | 10/2010 | Coleman |
| 7,968,107 | B2 | 6/2011 | Baur et al. |
| 8,097,561 | B2 | 1/2012 | Nabors et al. |
| 8,097,631 | B2 | 1/2012 | Stock et al. |

(Continued)

FOREIGN PATENT DOCUMENTS

CA    2743460    9/2003
CA    2720372    10/2009

(Continued)

OTHER PUBLICATIONS

Busvine, J.R. et al., "Effects of some insect development inhibitors on mosquito larvae," Pesticide Science, vol. 7, pp. 153-160 (1976).*

(Continued)

*Primary Examiner* — John Pak

(74) *Attorney, Agent, or Firm* — Oyen Wiggs Green & Mutala LLP

(57) ABSTRACT

Compositions and methods for increasing the efficacy of pesticidal compositions containing nicotinic acetylcholine receptor disrupters or allosteric modulators and C6-C10 saturated or unsaturated aliphatic acids are described herein, including synergistic pesticidal compositions and methods for delivery of pesticidal active ingredients. Some pesticidal compositions and methods as described are directed to compositions and methods for increasing the efficacy of fungicides. Some pesticidal compositions and methods as described are directed to compositions and methods for increasing the efficacy of nematicides. Some pesticidal compositions and methods as described are directed to compositions and methods for increasing the efficacy of insecticides. Methods for enhancing the activity pesticidal active ingredients in pesticidal compositions in use are also described.

22 Claims, 5 Drawing Sheets

(56) References Cited

U.S. PATENT DOCUMENTS

| | | |
|---|---|---|
| 8,404,260 B2 | 3/2013 | Reid et al. |
| 8,653,110 B2 | 2/2014 | Kilian et al. |
| 8,685,471 B2 | 4/2014 | Enan |
| 8,734,869 B2 | 5/2014 | Enan |
| 8,883,811 B2 | 11/2014 | Owen et al. |
| 8,911,757 B2 | 12/2014 | Reifenrath |
| 8,993,004 B2 | 3/2015 | Lindner et al. |
| 9,028,856 B2 | 5/2015 | Reid et al. |
| 9,113,625 B2 | 8/2015 | Harris |
| 9,492,490 B1 | 11/2016 | Enan |
| 9,545,100 B2 | 1/2017 | Reifenrath |
| 9,572,346 B2 | 2/2017 | Belkind et al. |
| 9,609,865 B2 | 4/2017 | Kilian et al. |
| 9,635,858 B2 | 5/2017 | Newberry et al. |
| 2004/0138176 A1 | 7/2004 | Miles |
| 2005/0208088 A1* | 9/2005 | Hofer .................. A01N 51/00 424/405 |
| 2007/0148204 A1 | 6/2007 | Neudorff |
| 2007/0251020 A1 | 11/2007 | Stockman et al. |
| 2010/0016392 A1 | 1/2010 | Kabanov et al. |
| 2011/0003875 A1 | 1/2011 | Vermeer et al. |
| 2011/0117153 A1 | 5/2011 | Kritikou |
| 2011/0166023 A1 | 7/2011 | Nettleton-Hammond et al. |
| 2011/0319341 A1 | 12/2011 | Awada et al. |
| 2012/0128843 A1 | 5/2012 | Richardson et al. |
| 2012/0252893 A1 | 10/2012 | Pimentel |
| 2013/0164361 A1 | 6/2013 | Enan |
| 2014/0323572 A1 | 10/2014 | Pimentel et al. |
| 2014/0377385 A1 | 12/2014 | Enan |
| 2015/0023045 A1 | 1/2015 | Bauer et al. |
| 2015/0031762 A1 | 1/2015 | Pimentel et al. |
| 2015/0289502 A1 | 10/2015 | Blease et al. |
| 2016/0015031 A1 | 1/2016 | Pesaro et al. |
| 2016/0192649 A1 | 7/2016 | Lindner |
| 2016/0278371 A1 | 9/2016 | Knight et al. |
| 2017/0049108 A1 | 2/2017 | Belkind et al. |
| 2018/0092357 A1 | 4/2018 | Premachandran et al. |
| 2020/0305425 A1 | 10/2020 | Manhas et al. |
| 2020/0323203 A1 | 10/2020 | Manhas et al. |
| 2021/0352895 A1 | 11/2021 | Manhas et al. |

FOREIGN PATENT DOCUMENTS

| | | |
|---|---|---|
| CA | 2882847 A1 | 2/2015 |
| CA | 3001870 A1 | 4/2017 |
| CA | 3076990 A1 | 4/2019 |
| CA | 3076992 A1 | 4/2019 |
| CH | 257642 A | 10/1948 |
| CN | 1069391 A | 3/1993 |
| CN | 1135708 A | 11/1996 |
| CN | 1193344 A | 9/1998 |
| CN | 101233852 A | 8/2008 |
| CN | 101692808 A | 4/2010 |
| CN | 101732820 A | 6/2010 |
| CN | 102149276 A | 8/2011 |
| CN | 101755738 B | 11/2013 |
| CN | 104411832 A | 3/2015 |
| CN | 104186562 B | 7/2016 |
| CN | 103828847 B | 1/2017 |
| CN | 107018979 A | 8/2017 |
| CN | 108135159 A | 6/2018 |
| EP | 2698061 A1 | 2/2014 |
| EP | 1744632 B1 | 4/2015 |
| EP | 2424349 B1 | 5/2015 |
| EP | 2815650 B1 | 8/2016 |
| EP | 3672409 A1 | 7/2020 |
| IL | 105109 | 7/1993 |
| JP | H06279208 A | 10/1994 |
| JP | 2001064104 A | 3/2001 |
| JP | 2002337109 A | 11/2002 |
| JP | 2005132832 A | 5/2005 |
| JP | 2013040156 A | 2/2013 |
| JP | 2015193568 A | 11/2015 |
| WO | 1995008267 A1 | 3/1995 |
| WO | 96/28022 A2 | 12/1996 |
| WO | 19970041727 A1 | 11/1997 |
| WO | 2001012156 A1 | 2/2001 |
| WO | 2007031561 A2 | 3/2007 |
| WO | 20070096833 A2 | 8/2007 |
| WO | 20090045941 A1 | 4/2009 |
| WO | 2009107363 A1 | 9/2009 |
| WO | 20090123907 A1 | 10/2009 |
| WO | 20090133374 A2 | 11/2009 |
| WO | 20100011787 A1 | 1/2010 |
| WO | 2010040835 A2 | 4/2010 |
| WO | 2014078849 A1 | 5/2014 |
| WO | 20140079730 A1 | 5/2014 |
| WO | 20140122446 A1 | 8/2014 |
| WO | 20150185994 A1 | 12/2015 |
| WO | 2017007327 A1 | 1/2017 |
| WO | 2017/005728 A9 | 6/2017 |
| WO | 2017116936 A1 | 7/2017 |
| WO | 20170216722 A2 | 12/2017 |
| WO | 2019064283 A1 | 4/2019 |
| WO | 2019064284 A1 | 4/2019 |
| WO | 2020061708 A1 | 4/2020 |
| WO | 2020061709 A1 | 4/2020 |

OTHER PUBLICATIONS

CABA abstract 2000:68808 (2000).*
U.S. Appl. No. 17/281,210, filed Sep. 27, 2019 by Manhas et al., opened to public Inspection Dec. 23, 2021 but not assigned an official publication number.
Pohl, "Antifungal free fatty acids: A Review", Science against microbial pathogens, pp. 61-71, 2011.
US EPA Memorandum on Reassessment of Exemptions from the Requirement of a Tolerance for Fatty Acids, Jul. 31, 2002.
Ammermann, E. et al., "BAS 500 F—the new broad-spectrum strobilurin fungicide," BCPC Conference—Pest & Diseases, vol. 2, pp. 541-548 (2000).
Unsaturated Fatty Acid, cis-2-Decenoic Acid, in Combination with Disinfectants or Antibiotics Removes Pre-Established Biofilms Formed by Food-Related Bacteria. Sepher, et al., PLOSOne 9(7) e101677, 2014.
Meletiadis et al., "Defining Fractional Inhibitory Concentration Index Cutoffs for Additive Interactions Based on Self- Drug Additive Combinations, Monte Carlo Simulation Analysis, and In Vitro-In Vivo Correlation Data for Antifungal Drug Combinations against Aspergillus fumigatus", Antimicrobial Agents and Chemotherapy, Feb. 2010, 54(2), p. 602-609.
Zhang, Xingli, Master's Thesis in Agricultural Science and Technology, China Master's Theses Full Text Database, Agricultural Science and Technology, 2016.
Zhang, Microbiol. & Immunol. 2016:279.
Xiong, Pocket Manual for Test and Diagnosis, cited Mar. 31, 2021.
Vande Maele, L et al., "In vitro susceptibility of Brachyspira hyodysenteriae to organic acids and essential oil components". Journal of Veterinary Medical Science, Sep. 14, 2015 (Sep. 14, 2015), vol. 78, issue 2, pp. 325-328, ISSN 0916-7250.
Ouattara et al., "Antibacterial activity of selected fatty acids and essential oils against six meat spoilage organisms". International Journal of Food Microbiology 37 (1997) 155-162.
Choi et al., "Antifungal Activity of Lower Alkyl Fatty Acid Esters against Powdery Mildews". The Plant Pathology Journal 26(4): 360-366 (2010) DOI: 10.5423/PPJ.2010.26.4.360.
T.J. Avis, "Antifungal compounds that target fungal membranes: applications in plant disease control". Can. J. Plant Pathol. vol. 29, 2007, pp. 323-329.
Pohl et al., "Antifungal free fatty acids: A Review". Science against microbial pathogens: communicating current research and technological advances, A. Mendez-Vilas (Ed.), pp. 61-71 (2011).
M. O. Leyva et al., "Preventive and post-infection control of Botrytis cinerea in tomato plants by hexanoic acid". Plant Pathology (2008) 57, 1038-1046 Doi: 10.1111/j.1365-3059.2008.01891.x.
Mendonca, "Mechanism of inhibitory action of postassium sorbate in *Escherichia coli*". Iowa State University, Digital Repository: Retrospective Theses and Dissertations, 1992.

(56) References Cited

OTHER PUBLICATIONS

A. Santiesteban-Lopez et al., "Susceptibility of food-borne bacteria to binary combinations of antimicrobials at selected aw and pH". Journal of Applied Microbiology 102 (2007) 486-497, ISSN 1364-5072. Doi: 10.1111/i.1365-2672.2006.03092.x.

Sorbic Acid and Potassium Sorbate as Cosmetic Perservatives. Eastman, Apr. 1998.

Yin et al., Synergistic and Antagonistic Drug Combinations Depend on Network Topology, PLOS 9:e93960 (2014).

Cokol et al., Systematic exploration of synergistic drug pairs, Mol. Systems Biol. 7:544 (2011).

Borisy et al., Systematic discovery of multicomponent therapeutics, Proc. Natl Acad. Sci. 100:7977-7982 (2003).

Hall et al., The fractional inhibitory concentration (FIC) index as a measure of synergy, J. Antimicrob. Chem 11 (5):427-433 (1983).

Colby, Calculating Synergistic and Antagonistic Responses of Herbicide Combinations, Weeds 15(1) (1967).

Abbott, A Method of Computing the Effectiveness of an Insecticide, J. of Economic Entomology 19:265-267 (1925).

Cooper & Hausman, The Cell: A Molecular Approach. 6th Edition. 2013. Sinauer Associates: Sunderland, MA.

Hatem et al., "Synergistic activity of several acids in binary mixtures with synthetic insecticides on Spodoptera littroralis (Boisduval)." Boletin de Sanidad Vegetal. Plagas, 35:533-542, 2009.

\* cited by examiner

SYNERGISTIC PESTICIDAL COMPOSITIONS AND METHODS FOR DELIVERY OF INSECTICIDAL ACTIVE INGREDIENTS

REFERENCE TO RELATED APPLICATIONS

This application is a 371 national phase entry of Patent Cooperation Treaty application No. PCT/CA2019/051388 filed 27 Sep. 2019, which claims priority to, and the benefit of, US provisional patent application Nos. 62/737,907 filed 27 Sep. 2018; 62/737,914 filed 27 Sep. 2018; 62/829,010 filed 3 Apr. 2019; 62/829,512 filed 4 Apr. 2019; and 62/829,525 filed 4 Apr. 2019, all entitled SYNERGISTIC PESTICIDAL COMPOSITIONS AND METHODS FOR DELIVERY OF ACTIVE INGREDIENTS. All of the foregoing applications are incorporated by reference herein in their entireties.

TECHNICAL FIELD

An embodiment of the present invention is related to compositions and methods for increasing the efficacy of pesticidal compositions. More particularly, some embodiments are related to synergistic pesticidal compositions and methods for delivery of pesticidal active ingredients. Some particular embodiments of the present invention are directed to compositions and methods for increasing the efficacy of insecticides. Further embodiments of the present invention are directed to methods for enhancing the activity of pesticidal active ingredients in pesticidal compositions.

BACKGROUND

Pesticides, including fungicides, herbicides, nematicides and insecticides, are important compositions for use in domestic, agricultural, industrial and commercial settings, such as to provide for control of unwanted pests and/or pathogens. Providing for effective pest control is of high importance in many such settings, since pests and/or other pathogens if not controlled can cause loss and or destruction of crops or other plants, or harm to animals, humans or other beneficial or desired organisms. There remains a need for environmentally safe and effective pesticides, including fungicides, nematicides and insecticides, or compounds that enhance the efficacy of pesticides, including fungicides, nematicides and insecticides, and for methods of enhancing the efficacy of pesticides including fungicides, nematicides and insecticides, so that pesticides can be used in a more environmentally safe and effective manner.

In agricultural settings, for example, a variety of plant pests, such as insects, worms, nematodes, fungi, and plant pathogens such as viruses and bacteria, are known to cause significant damage to seeds and ornamental and crop plants. Chemical pesticides have generally been used, but many of these are expensive and potentially toxic to humans, animals, and/or the environment and may persist long after they are applied. Therefore it is typically beneficial to farmers, consumers and the surrounding environment to use the least amount of chemical pesticides as possible, while continuing to control pest growth in order to maximize crop yield. In a growing number of cases, chemical pesticide use has also resulted in growing resistance to certain chemical pesticides by pest organisms, leading to reduced effectiveness, requiring greater doses of pesticidal chemicals, or even failure of certain types of pesticides as viable control agents. As a result, many chemical pesticides are being phased out or otherwise restricted from use.

Natural or biologically-derived pesticidal compounds have been proposed for use in place of some chemical pesticides, in order to attempt to reduce the toxicity, health and environmental risks associated with chemical pesticide use. However, some natural or biologically-derived pesticides have proven less efficacious or consistent in their performance in comparison with competing chemical pesticides, which has limited their adoption as control agents in pesticide markets.

Therefore, there remains a need to provide improved pesticides and pesticidal compositions to allow for effective, economical and environmentally and ecologically safe control of insect, plant, fungal, nematode, mollusk, mite, viral and bacterial pests. In particular, there remains a need to provide for pesticidal compositions that desirably minimize the amount of pesticidal agents or pesticidal active ingredients required to obtain desired or acceptable levels of control of pests in use.

Accordingly, there remains a need to provide synergistic pesticidal compositions that desirably minimize the use of pesticidal agents or pesticidal active ingredients through synergistic efficacy, to provide for desired pest control performance in use. However, large-scale experimental drug combination studies in non-agricultural fields have found that synergistic combinations of drug pairs are extremely complex and rare, with only a 4-10% probability of finding synergistic drug pairs [Yin et al., PLOS 9:e93960 (2014); Cokol et al., Mol. Systems Biol. 7:544 (2011)]. In fact, a systematic screening of about 120,000 two-component drug combinations based on reference-listed drugs found fewer than 10% synergistic pairs, as well as only 5% synergistic two-component pairs for fluconazole, a triazole fungicidal compound related to certain azole agricultural fungicide compounds [Borisy et al., Proc. Natl Acad. Sci. 100:7977-7982 (2003)].

The foregoing examples of the related art and limitations related thereto are intended to be illustrative and not exclusive. Other limitations of the related art will become apparent to those of skill in the art upon consideration of the present disclosure.

BRIEF SUMMARY

In one embodiment according to the present disclosure, a synergistic pesticidal composition is provided, comprising a pesticidal active ingredient; and a C6-C10 unsaturated aliphatic acid (including an unsaturated C6, C7, C8, C9 or C10 aliphatic acid) or an agriculturally compatible salt thereof, wherein the C6-C10 unsaturated aliphatic acid comprises at least one unsaturated C—C bond and wherein a ratio of the concentrations by weight of said pesticidal active ingredient and said C6-C10 unsaturated aliphatic acid or an agriculturally compatible salt thereof is between about 1:15,000 and 15,000:1, and more particularly between about 1:5000 and 5000:1, and further more particularly between about 1:2000 and 2000:1. In another embodiment, a synergistic pesticidal composition is provided, comprising a pesticidal active ingredient; and a C6-C10 saturated aliphatic acid (including a saturated C6, C7, C8, C9 or C10 aliphatic acid) or an agriculturally compatible salt thereof, wherein a ratio of the concentrations by weight of said pesticidal active ingredient and said C6-C10 saturated aliphatic acid or an agriculturally compatible salt thereof is between about 1:15,000 and 15,000:1, and more particularly between about 1:5000 and 5000:1, and further particularly between about 1:2000 and 2000:1. In yet another embodiment, a synergistic pesticidal composition is provided, comprising a pesticidal active ingredient; and a C11 unsaturated or saturated aliphatic acid or an agriculturally compatible salt thereof, wherein a ratio of the concentrations by weight of said pesticidal active ingredient and said C11 unsaturated or saturated aliphatic acid or an agriculturally compatible salt thereof is between about 1:15,000 and 15,000:1, and more particularly between about 1:2000 and 2000:1. In yet a further embodiment, a synergistic pesticidal composition is provided, comprising a pesticidal active ingredient; and a C12 unsaturated or saturated aliphatic acid or an agriculturally compatible salt thereof, wherein a ratio of the concentrations by weight of said pesticidal active ingredient and said C12 unsaturated or saturated aliphatic acid or an agriculturally compatible salt thereof is between about 1:15,000 and 15,000:1, more particularly between about 1:5000 and 5000:1, and further particularly between about 1:2000 and 2000:1.

In some embodiments throughout the present disclosure and wherever reference is made to a C6-C10 saturated or unsaturated aliphatic acid (including an unsaturated C6, C7, C8, C9 or C10 aliphatic acid) or an agriculturally compatible salt thereof, the synergistic pesticidal composition may optionally comprise a C4-C10 unsaturated or saturated aliphatic acid or a biologically compatible salt thereof. In other embodiments, a C11 unsaturated or saturated aliphatic acid or biologically compatible salt thereof, or a C12 unsaturated or saturated aliphatic acid or biologically compatible salt may be provided.

In a further embodiment, a method of synergistically enhancing the pesticidal activity of at least one pesticidal active ingredient adapted to control at least one target pest organism is provided, comprising: providing at least one pesticidal active ingredient active for said at least one target pest organism; adding a synergistically effective concentration of at least one C6-C10 unsaturated aliphatic acid comprising at least one unsaturated C—C bond, or an agriculturally acceptable salt thereof, to said pesticidal active ingredient to provide a synergistic pesticidal composition; and applying said synergistic pesticidal composition in a pesticidally effective concentration to control said at least one target pest organism. In another embodiment, instead of a C6-C10 unsaturated aliphatic acid, a C6-C10 saturated aliphatic acid or agriculturally compatible salts thereof may be provided to provide the synergistic pesticidal composition. In yet another embodiment, a C11 unsaturated or saturated aliphatic acid or agriculturally compatible salts thereof may be provided to provide the synergistic pesticidal composition. In yet a further embodiment, a C12 unsaturated or saturated aliphatic acid or agriculturally compatible salts thereof may be provided to provide the synergistic pesticidal composition. In some embodiments, the synergistic pesticidal composition may comprise a C6-C10 unsaturated or saturated aliphatic acid or a biologically compatible salt thereof, wherein said salt comprises at least one of an agriculturally, aquatic life, or mammal-compatible salt, for example. In other embodiments, a C11 unsaturated or saturated aliphatic acid or biologically compatible salt thereof, or a C12 unsaturated or saturated aliphatic acid or biologically compatible salt may be provided.

In another embodiment according to the present disclosure, a pesticidal composition is provided, comprising: one or more pesticidal agents; and one or more unsaturated C6-C10 aliphatic acids or agriculturally compatible salts thereof having at least one unsaturated C—C bond. In some other embodiments, a pesticidal composition comprising one or more pesticidal agents at one or more saturated C6-C10 aliphatic acids or agriculturally compatible salts thereof are provided. In some embodiments, the one or more saturated or unsaturated C6-C10 aliphatic acids produce a synergistic effect on the pesticidal activity of the pesticidal composition in comparison to the pesticidal activity of the pesticidal agent alone and are present in a respective synergistically active concentration ratio between about 1:15000 and 15000:1, more particularly between about 1:5000 and 5000:1, and further particularly between about 1:2000 and 2000:1. In some such embodiments, a C11 unsaturated or saturated aliphatic acid or agriculturally compatible salts thereof may be provided. In some further such embodiments, a C12 unsaturated or saturated aliphatic acid or agriculturally compatible salts thereof may be provided.

In a further embodiment, a method of synergistically enhancing the pesticidal activity of at least one pesticidal active ingredient adapted to control at least one target pest organism is provided, comprising: providing at least one pesticidal active ingredient active for said at least one target pest organism; adding a synergistically effective concentration of at least one unsaturated or saturated C6-C10 aliphatic acid or an agriculturally acceptable salt thereof to provide a synergistic pesticidal composition; mixing said synergistic pesticidal composition with at least one formulation component comprising a surfactant to form a synergistic pesticidal concentrate; diluting said synergistic pesticidal concentrate with water to form a synergistic pesticidal emulsion; and applying said synergistic pesticidal emulsion at a pesticidally effective concentration and rate to control said at least one target pest organism. In some such embodiments, a C11 unsaturated or saturated aliphatic acid or agriculturally compatible salt thereof may be provided. In some further such embodiments, a C12 unsaturated or saturated aliphatic acid or agriculturally compatible salt thereof may be provided.

In some embodiments, the synergistic pesticidal composition may comprise a ratio of the concentrations by weight of said pesticidal active ingredient and said at least one saturated or unsaturated C6-C10 aliphatic acid or agriculturally compatible salts thereof is between about at least one of: 1:20,000 and 20,000:1, 1:15000 and 15000:1, 1:10,000 and 10,000:1, 1:5000 and 5000:1, 1:2500 and 2500:1, 1:2000 and 2000:1, 1:1500 and 1500:1, 1:1000 and 1000, 1:750 and 750:1, 1:500 and 500:1, 1:400 and 400:1, 1:300 and 300:1, 1:250 and 250:1, 1:200 and 200:1, 1:150 and 150:1, 1:100 and 100:1, 1:90 and 90:1, 1:80 and 80:1, 1:70 and 70:1, 1:60 and 60:1, 1:50 and 50:1, 1:40 and 40:1, 1:30 and 30:1, 1:25 and 25:1, 1:20 and 20:1, 1:15 and 15:1, 1:10 and 10:1, 1:9 and 9:1. 1:8 and 8:1, 1:7 and 7:1, 1:6 and 6:1, 1:5 and 5:1, 1:4 and 4:1, 1:3 and 3:1, 1:2 and 2:1, 1:1.5 and 1.5:1, and 1.25 and 1.25:1. Ina particular such embodiment, the concentration ratios of the pesticidal active ingredient and said at least one C6-C10 saturated or unsaturated aliphatic acid or an agriculturally compatible salt thereof in the synergistic pesticidal composition are advantageously chosen so as to produce a synergistic effect against at least one target pest or pathogen. In some embodiments, the concentration ratios of the pesticidal active ingredient(s) and at least one C11 unsaturated or saturated aliphatic acid or agriculturally compatible salts thereof in the synergistic pesticidal composition may be advantageously chosen so as to produce a synergistic effect against at least one target pest or pathogen. In some further embodiments, the concentration ratios of the pesticidal active ingredient(s) and at least one C11 unsaturated or saturated aliphatic acid or agriculturally compatible salt thereof in the synergistic pesticidal composition may be advantageously chosen so as to produce a synergistic effect against at least one target pest or pathogen.

In some embodiments, the synergistic pesticidal composition comprises a pesticidal active ingredient, and a C6-C10 unsaturated aliphatic acid which comprises at least one of: a trans-unsaturated C—C bond and a cis-unsaturated C—C bond. In a further such embodiment, the C6-C10 unsaturated aliphatic acid comprises at least one of: a trans-2, trans-3, trans-4, trans-5, trans-6, trans-7, trans-8, and trans-9 unsaturated bond. In yet another embodiment, a synergistic pesticidal composition is provided comprising a pesticidal active ingredient and a C6-C10 unsaturated aliphatic acid comprising at least one of: a cis-2, cis-3, cis-4, cis-5, cis-6, cis-7, cis-8, and cis-9 unsaturated bond. In some such embodiments, the pesticidal composition comprises a C11 unsaturated aliphatic acid or agriculturally compatible salt thereof, comprising at least one of: a trans-2, trans-3, trans-4, trans-5, trans-6, trans-7, trans-8, trans-9, trans-10, a cis-2, cis-3, cis-4, cis-5, cis-6, cis-7, cis-8, cis-9, and cis-10 unsaturated bond. In some further such embodiments, the pesticidal composition comprises a C12 unsaturated aliphatic acid or agriculturally compatible salt thereof, comprising at least one of: a trans-2, trans-3, trans-4, trans-5, trans-6, trans-7, trans-8, trans-9, trans-10, a cis-2, cis-3, cis-4, cis-5, cis-6, cis-7, cis-8, cis-9, and cis-10 unsaturated bond. In some embodiments, the synergistic pesticidal composition may comprise at least one C6-C10 saturated aliphatic acid, such as one or more of hexanoic, heptanoic, octanoic, nonanoic and decanoic acid, for example. In some further embodiments, the synergistic pesticidal composition may additionally comprise at least one second C6-C10 saturated or unsaturated aliphatic acid. In some further embodiments, the pesticidal composition may additionally comprise at least one second C11 or C12 unsaturated or saturated aliphatic acid, or agriculturally compatible salt thereof.

In some embodiments, the at least one C6-C10 saturated or unsaturated aliphatic acid may comprise a naturally occurring aliphatic acid, such as may be present in, or extracted, fractionated or derived from a natural plant or animal material, for example. In one such embodiment, the at least one C6-10 saturated or unsaturated aliphatic acid may comprise one or more naturally occurring aliphatic acids provided in a plant extract or fraction thereof. In another such embodiment, the at least one C6-C10 saturated or unsaturated aliphatic acid may comprise one or more naturally occurring aliphatic acids provided in an animal extract or product, or fraction thereof. In one such embodiment, the at least one C6-C10 saturated or unsaturated aliphatic acid may comprise a naturally occurring aliphatic acid comprised in a plant oil extract, such as one or more of coconut oil, palm oil, palm kernel oil, corn oil, or fractions or extracts therefrom. In another such embodiment, the at least one C6-C10 saturated or unsaturated aliphatic acid may comprise a naturally occurring aliphatic acid comprised in an animal extract or product, such as one or more of cow's milk, goat's milk, beef tallow, and/or cow or goat butter, or fractions or extracts thereof for example. In a particular embodiment, at least one C6-C10 saturated aliphatic acid may be provided in an extract or fraction of one or more plant oil extract, such as one or more of coconut oil, palm oil, palm kernel oil, corn oil, or fractions or extracts therefrom. In some further embodiments, the pesticidal composition may comprise at least one C11 or C12 saturated or unsaturated aliphatic acid provided in an extract or fraction of one or more plant or animal materials.

In some embodiments, the synergistic pesticidal composition exhibits a synergistic inhibition of growth of at least one target pest organism, such as an insect pest, for example. In some embodiments, the synergistic pesticidal composition comprises a pesticidally effective concentration of the pesticidal active ingredient, and the one or more C6-C10 saturated or unsaturated aliphatic acid. In some further embodiments, the synergistic pesticidal composition comprises a pesticidal active ingredient, and a synergistic concentration of the one or more C6-C10 saturated or unsaturated aliphatic acid. In some embodiments, the synergistic pesticidal composition has a FIC Index (fractional inhibitory concentration index value) of less than 1 according to a growth inhibition assay for inhibition of growth of at least one target pest or pathogen organism. In some embodiments, the synergistic pesticidal composition has a FIC Index value of less than 0.75. In a further embodiment, the synergistic pesticidal composition has a FIC Index value of 0.5 or less. In some embodiments, the synergistic pesticidal composition has a synergistic efficacy factor, or Synergy Factor (comparing synergistic efficacy relative to expected additive efficacy (i.e. non-synergistic efficacy) according to the Colby Formula, or Loewe's Formula, or other accepted synergy determination method) of: at least 1.01, and more particularly at least 1.1, and further more particularly at least 1.5, and yet further more particularly at least 2, and more particularly at least 5, and yet more particularly at least 10, for example. In some such embodiments, the one or more saturated or unsaturated aliphatic acid may comprise a C11 unsaturated or saturated aliphatic acid or agriculturally compatible salt thereof. In some further such embodiments, the one or more saturated or unsaturated aliphatic acid may comprise a C12 unsaturated or saturated aliphatic acid or agriculturally compatible salt thereof.

In some embodiments, the pesticidal active ingredient may comprise at least one of: a chemical pesticide, a naturally-derived pesticidal compound or extract, or a biosynthetic or semi-synthetic pesticidal compound. In a further aspect, the pesticidal active ingredient may comprise at least one of: a fungicide, nematicide, insecticide, acaricide, herbicide, and bacteriocide. In a particular aspect, the pesticidal active ingredient may comprise an insecticide, and more particularly a nicotinic acetylcholine receptor disruptor insecticide, for example.

In any such embodiments, the synergistic pesticidal composition may comprise one or more C6-C10 saturated or unsaturated aliphatic acid having at least one carboxylic group, and which may be linear or branched. In some embodiments, the one or more C6-C10 saturated or unsaturated aliphatic acid may comprise a linear monocarboxylic acid. In some embodiments, the C6-C10 unsaturated aliphatic acid may comprise one or more of cis and trans isomers. In an embodiment, the one or more C6-C10 saturated or unsaturated aliphatic acid may be unsubstituted or substituted. In some embodiments, the one or more C6-C10 saturated or unsaturated aliphatic acid may comprise a substituent, such as a hydroxy, amino, carbonyl, aldehyde, acetyl, phosphate, or methyl substituent, for example. In one such embodiment, the one or more C6-C10 saturated or unsaturated aliphatic acid may comprise at least one of a 2-, 3-, 4-, 8-, 10-substituted aliphatic acid. In one such embodiment, the one or more C6-C10 saturated or unsaturated aliphatic acid may comprise a hydroxy aliphatic acid. In one particular such embodiment, the one or more C6-C10 saturated or unsaturated aliphatic acid may comprise a 2-hydroxy, 3-hydroxy, or 4-hydroxy aliphatic acid. In one embodiment, the one or more C6-C10 saturated or unsaturated aliphatic acid may comprise an amino aliphatic acid. In one particular such embodiment, the one or more C6-C10 saturated or unsaturated aliphatic acid may comprise a 3-amino aliphatic acid. In a further embodiment, the one or more C6-C10 saturated or unsaturated aliphatic acid may comprise a methyl and/or ethyl substituted aliphatic acid. In a particular such embodiment, the one or more C6-C10 saturated or unsaturated aliphatic acid may comprise at least one of a 2-methyl, 3-methyl, 4-methyl, 2-ethyl, or 2,2-diethyl aliphatic acid, for example. In some embodiments, the one or more C6-C10 saturated or unsaturated aliphatic acid may comprise an unsaturated aliphatic acid which may be mono-unsaturated or polyunsaturated, i.e. containing one, two or more unsaturated carbon-carbon (C—C) bonds respectively. In some embodiments, the one or more C6-C10 saturated or unsaturated aliphatic acid may comprise an unsaturated aliphatic acid with at least one of: a trans-unsaturated C—C bond, a cis-unsaturated C—C bond, and a plurality of conjugated unsaturated C—C bonds. In some such embodiments, the one or more saturated or unsaturated aliphatic acid may comprise a C11 unsaturated or saturated aliphatic acid. In some further such embodiments, the one or more saturated or unsaturated aliphatic acid may comprise a C12 unsaturated or saturated aliphatic acid.

In some further embodiments, the one or more C6-C10 (including C6, C7, C8, C9 or C10) saturated or unsaturated aliphatic acid may comprise at least one of: a trans-hexenoic acid, a cis-hexenoic acid, a hexa-dienoic acid, a hexynoic acid, a trans-heptenoic acid, a cis-heptenoic acid, a hepta-dienoic acid, a heptynoic acid, a trans-octenoic acid, a cis-octenoic acid, an octa-dienoic acid, an octynoic acid, a trans-nonenoic acid, a cis-nonenoic acid, a nona-dienoic acid, a nonynoic acid, a trans-decenoic acid, a cis-decenoic acid, a deca-dienoic acid, and a decynoic acid. In another embodiment, the one or more C6-C10 saturated or unsaturatedaliphatic acid may comprise at least one of: a trans-hexenoic acid, a cis-hexenoic acid, a hexa-dienoic acid other than 2,4-hexadienoic acid, a hexynoic acid, a trans-heptenoic acid, a cis-heptenoic acid, a hepta-dienoic acid, a heptynoic acid, a trans-octenoic acid, a cis-octenoic acid, an octa-dienoic acid, an octynoic acid, a trans-nonenoic acid, a cis-nonenoic acid, a nona-dienoic acid, a nonynoic acid, a trans-decenoic acid, a cis-decenoic acid, a deca-dienoic acid, and a decynoic acid. In some embodiments, the one or more unsaturated aliphatic acid may comprise at least one of a C11 or C12 unsaturated aliphatic acid, such as a cis-undecenoic, trans-undecanoic, cis-dodecenoic, trans-dodecenoic, undeca-dienoic, dodeca-dienoic, undecynoic, or dodecynoic acid, for example.

In some further embodiments, the one or more C6-C10 (including C6, C7, C8, C9 or C10) saturated or unsaturated aliphatic acid may comprise at least one of: hexanoic, heptanoic, octanoic, nonanoic and decanoic acid. In some embodiments, the one or more saturated or unsaturated aliphatic acid may comprise at least one of undecanoic or dodecanoic acid.

In some embodiments, the synergistic pesticidal composition may comprise one or more agriculturally compatible or acceptable salts of a one or more C6-C10 saturated or unsaturated aliphatic acid. In one such embodiment, such agriculturally compatible or acceptable salts may comprise one or more of potassium, sodium, calcium, aluminum, other suitable metal salts, ammonium, and other agriculturally acceptable salts of one or more C6-C10 saturated or unsaturated aliphatic acids, for example. In another embodiment, the synergistic pesticidal composition may comprise one or more C6-C10 saturated or unsaturated aliphatic acid or a biologically compatible salt thereof, wherein said salt comprises at least one of an agriculturally, aquatic life, or mammal-compatible salt, for example. In some embodiments, the pesticidal composition may comprise one or more agriculturally compatible or acceptable salts of one or one or more C11 or C12 saturated or unsaturated aliphatic acid.

However, in some other embodiments, the synergistic pesticidal composition may comprise a pesticidal active ingredient and a one or more C6-C10 saturated or unsaturated aliphatic acid, wherein the C6-C10 unsaturated aliphatic acid comprises at least one unsaturated C—C bond and wherein a ratio of the concentrations of said pesticidal active ingredient and said C6-C10 unsaturated aliphatic acid is between about 1:15000 and 15000:1, more particularly between about 1:5000 and 5000:1, and further particularly between about 1:2000 and 2000:1. In one such embodiment, the one or more C6-C10 saturated or unsaturated aliphatic acid may exclude agriculturally acceptable salts or other salt forms of the one or more C6-C10 saturated or unsaturated aliphatic acids. In a particular such embodiment, the synergistic pesticidal composition may exclude such salts for desired applications for which the acid forms of the one or more C6-C10 saturated or unsaturated aliphatic acids may be preferred. In one such application, it is known that accumulation of an undesirably high concentration of salts in some soils can be detrimental to the productivity or fertility of the soil, such as in particular salt sensitive soil applications, for example. Accordingly, in some embodiments, specifically excluding salt forms of the one or more C6-C10 saturated or unsaturated aliphatic acids may be particularly desirable. In some such embodiments, the pesticidal composition may comprise one or more C11 or C12 saturated or unsaturated aliphatic acid.

In another embodiment, the synergistic pesticidal composition may comprise a pesticidal active ingredient and at least one C6-C10 saturated aliphatic acid, such as at least one of hexanoic, heptanoic, octanoic, nonanoic and decanoic acid, for example. In an alternative embodiment, the synergistic pesticidal composition may comprise a pesticidal active ingredient and at least one C6-C10 unsaturated aliphatic acid but explicitly excluding 2,4-hexadienoic acid. In some such embodiments, the one or more saturated or unsaturated aliphatic acid may comprise a C11 unsaturated or saturated aliphatic acid. In some further such embodiments, the one or more saturated or unsaturated aliphatic acid may comprise a C12 unsaturated or saturated aliphatic acid.

In some embodiments of the present disclosure, a synergistic pesticidal composition may comprise at least one C6-C10 saturated or unsaturated aliphatic acid and at least one pesticidal active ingredient selected from the list comprising:

A) Respiration inhibitors selected from:
  inhibitors of complex III at $Q_o$ site: azoxystrobin (II-1), coumethoxy-strobin, coumoxystrobin, dimoxystrobin (II-2), enestroburin, fenamin-strobin, fenoxystrobin/flufenoxystrobin, fluoxastrobin (II-3), kresoxim-methyl (II-4), metominostrobin, orysastrobin (II-5), picoxystrobin (II-6), pyraclostrobin (II-7), pyrame-tostrobin, pyraoxystrobin, trifloxystrobin (II-8), 2-[2-(2,5-dimethyl-phenoxymethyl)-phenyl]-3-methoxy-acrylic acid methyl ester and 2-(2-(3-(2,6-dichlorophenyl)-1-methyl-allylideneamino-oxymethyl)-phenyl)-2-methoxyimino-N-methyl-acetamide, pyribencarb, triclopyricarb/chlorodincarb, famoxadone, fenamidone;

Inhibitors of complex III at $Q_i$ site: cyazofamid, amisulbrom, [(3S,6S,7R,8R)-8-benzyl-3-[(3-acetoxy-4-methoxy-pyridine-2-carbonyl)-amino]-6-methyl-4,9-dioxo-1,5-dioxonan-7-yl] 2-methylpropanoate, [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate, [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(1,3-benzodioxol5-ylmethoxy)-4-methoxy-pyridine-2-carbon-yl]amino]-6-methyl-4,9-dioxo-1,5-dioxonan-7-yl] 2-methylpropanoate; (3S,6S,7R,8R)-3-[[(3-hydroxy-4-methoxy-2-pyridinyl)carbonyl]amino]-6-methyl-4,9-dioxo-8-(phenyl-methyl)-1,5-dioxonan-7-yl 2-methylpropanoate;

Inhibitors of complex II: benodanil, benzovindiflupyr (II-9), bixafen (II-10), boscalid (II-11), carboxin, fenfuram, fluopyram (II-12), flutolanil, fluxapyroxad (II-13), furametpyr, isofetamid, isopyrazam (II-14), mepronil, oxycarboxin, penflufen (II-15), penthiopyrad (II-16), sedaxane (II-17), tecloftalam, thifluzamide, N-(4'-trifluoromethylthiobiphenyl-2-yl)-3-difluoromethyl-1-methyl-1H-pyrazole-4-carboxamide, N-(2-(1,3,3-trimethyl-butyl)-phenyl)-1,3-dimethyl-5-fluoro-1H-pyrazole-4-carboxamide, 3-(difluorome-thyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, N-(7-fluoro-1,1,3-trimethyl-indan-4-yl)-1,3-dimethyl-pyrazole-4-carboxamide, N-[2-(2,4-dichlorophenyl)-2-methoxy-1-methyl-ethyl]-3-(difluoromethyl)-1-methyl-pyrazole-4-carboxamide;

Other respiration inhibitors: diflumetorim, (5,8-difluoroquinazolin-4-yl)-{2-[2-fluoro-4-(4-trifluoromethylpyridin-2-yloxy)-phenyl]-ethyl}-amine; binapacryl, dinobuton, dinocap, fluazinam (OO-18); ferimzone; fentin salts such as fentin-acetate, fentin chloride or fentin hydroxide; ametoctradin (II-19); and silthiofam;

B) Sterol biosynthesis inhibitors (SBI fungicides) selected from:
C14 demethylase inhibitors (DMI fungicides): azaconazole, bitertanol, bromuconazole, cyproconazole (II-20), difenoconazole (II-21), diniconazole, diniconazole-M, epoxiconazole (II-22), fenbuconazole, fluquinconazole (II-23), flusilazole, flutriafol, hexaconazole, imibenconazole, ipconazole, metconazole (II-24), myclobutanil, oxpoconazole, paclobutrazole, penconazole, propiconazole (II-25), prothioconazole (II-26), simeconazole, tebuconazole (II-27), tetraconazole, triadimefon, triadimenol, triticonazole, uniconazole; imazalil, pefurazoate, prochloraz, triflumizol; fenarimol, nuarimol, pyrifenox, triforine, [3-(4-chloro-2-fluorophenyl)-5-(2,4-difluorophenyl)isoxazol-4-yl]-(3-pyridyl)methanol;
Delta14-reductase inhibitors: aldimorph, dodemorph, dodemorphacetate, fenpropimorph, tridemorph, fenpropidin, piperalin, spiroxamine;
Inhibitors of 3-keto reductase: fenhexamid;

C) Nucleic acid synthesis inhibitors selected from:
phenylamides or acyl amino acid fungicides: benalaxyl, benalaxyl-M, kiralaxyl, metalaxyl, metalaxyl-M (mefenoxam) (II-38), ofurace, oxadixyl;
others nucleic acid inhibitors: hymexazole, octhilinone, oxolinic acid, bupirimate, 5-fluorocytosine, 5-fluoro-2-(p-tolylmethoxy)pyrimidin-4-amine, 5-fluoro-2-(4-fluorophenylmethoxy)pyrimidin-4-amine;

D) Inhibitors of cell division and cytoskeleton selected from:
tubulin inhibitors: benomyl, carbendazim, fuberidazole, thiabendazole, thiophanate-methyl (II-39); 5-chloro-7-(4-methylpiperidin-1-yl)-6-(2,4,6-trifluorophenyl)-[1,2,4]triazolo[1,5-a]pyrimidine
other cell division inhibitors: diethofencarb, ethaboxam, pencycuron, fluopicolide, zoxamide, metrafenone (II-40), pyriofenone;

E) Inhibitors of amino acid and protein synthesis selected from:
methionine synthesis inhibitors (anilino-pyrimidines): cyprodinil, mepanipyrim, Pyrimethanil (II-41);
protein synthesis inhibitors: blasticidin-S, kasugamycin, kasugamycin hydrochloride-hydrate, mildiomycin, streptomycin, oxytetracyclin, polyoxine, validamycin A;

F) Signal transduction inhibitors selected from:
MAP/histidine kinase inhibitors: fluoroimid, iprodione, procymidone, vinclozolin, fenpiclonil, fludioxonil;
G protein inhibitors: quinoxyfen;

G) Lipid and membrane synthesis inhibitors selected from:
Phospholipid biosynthesis inhibitors: edifenphos, iprobenfos, pyrazophos, isoprothiolane; propamocarb, propamocarb-hydrochloride;
lipid peroxidation inhibitors: dicloran, quintozene, tecnazene, tolclofos-methyl, biphenyl, chloroneb, etridiazole;
phospholipid biosynthesis and cell wall deposition: dimethomorph (II-42), flumorph, mandipropamid (II-43), pyrimorph, benthiavalicarb, iprovalicarb, valifenalate, N-(1-(1-(4-cyano-phenyl)ethanesulfonyl)-but-2-yl) carbamic acid-(4-fluorophenyl) ester;
acid amide hydrolase inhibitors: oxathiapiprolin;

H) Inhibitors with Multi Site Action selected from:
inorganic active substances: Bordeaux mixture, copper acetate, copper hydroxide, copper oxychloride (II-44), basic copper sulfate, sulfur;
thio- and dithiocarbamates: ferbam, mancozeb (II-45), maneb, metam, metiram (II-46), propineb, thiram, zineb, ziram;
organochlorine compounds: anilazine, Chlorothalonil (II-47), captafol, captan, folpet, dichlofluanid, dichlorophen, hexachlorobenzene, pentachlorophenole and its salts, phthalide, tolylfluanid, N-(4-chloro-2-nitro-phenyl)-N-ethyl-4-methyl-benzenesulfonamide;
guanidines and others: guanidine, dodine, dodine free base, guazatine, guazatine-acetate, iminoctadine, iminoctadine-triacetate, iminoctadine-tris(albesilate), dithianon, 2,6-dimethyl-1H,5H-[1,4]dithii-no[2,3-c:5,6-c']dipyrrole-1,3,5,7(2H,6H)-tetraone (II-48);

I) Cell wall synthesis inhibitors selected from:
inhibitors of glucan synthesis: validamycin, polyoxin B;
melanin synthesis inhibitors: pyroquilon, tricyclazole, carpropamid, dicyclomet, fenoxanil;

J) Plant defense inducers selected from:
acibenzolar-S-methyl, probenazole, isotianil, tiadinil, prohexadione-calcium; fosetyl, fosetyl-aluminum, phosphorous acid and its salts (II-49);

K) Unknown mode of action selected from: bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxathiapiprolin, tolprocarb, 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, 2-[3,5-bis-(difluoromethyl)-1H-pyrazol-1-yl]-1-[4-(4-{5-[2-fluoro-6-(prop-2-yn-1-yl-oxy)phenyl]-4,5-dihydro-1, 2-oxazol-3-yl}-1,3-thiazol-2-yl)piperidin-1-yl]-ethanone, 2-[3,5-bis(difluoromethyl)-1H-pyrazol-1-yl]-1-[4-(4-{5-[2-chloro-6-(prop-2-yn-1-yloxy) phenyl]-4,5-dihydro-1,2-oxazol-3-yl}-1,3-thiazol-2-yl) piperidin-1-yl]ethanone, oxin-copper, proquinazid, tebufloquin, tecloftalam, triazoxide, 2-butoxy-6-iodo-3-propylchromen-4-one, N-(cyclo-propylmethoxy-imino-(6-difluoro-methoxy-2,3-difluoro-phenyl)-methyl)-2-phenyl acetamide, N'-(4-(4-chloro-3-trifluoromethyl-phenoxy)-2,5-dimethylphenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, methoxyacetic acid 6-tert-butyl-8-fluoro-2,3-dimethyl-quinolin-4-yl ester, 3-[5-(4-meth-ylphenyl)-2,3-dimethyl-isoxazolidin-3-yl]-pyridine, 3-[5-(4-chloro-phenyl)-2,3-dimethyl-isoxazolidin-3-yl]-pyridine (pyrisoxazole), N-(6-methoxy-pyridin-3-yl) cyclopropanecarboxylic acid amide, 5-chloro-1-(4,6-dimethoxy-pyrimidin-2-yl)-2-methyl-1H-benzoimidazole, 2-(4-chloro-phenyl)-N-[4-(3,4-dimethoxy-phe-nyl)-isoxazol-5-yl]-2-prop2-ynyloxy-acetamide, ethyl (Z)-3-amino-2-cyano-3-phenyl-prop-2-enoate, tertbutyl N-[6-[[(Z)-[(1-methyltetrazol-5-yl)-phenyl-methyl-ene]-amino]oxymethyl]-2-pyridyl]carbamate, pentyl N-[6-[[(Z)-[(1-methyltetrazol-5-yl)-phenyl-methylene] amino]oxymethyl]-2-pyridyl]carbamate, 2-[2-[(7,8-dif-luoro-2-methyl-3-quinolyl)oxy]-6-fluoro-phenyl] propan-2-ol, 2-[2-fluoro-6-[(8-fluoro-2-methyl-3-qui-nolyl)oxy]phenyl]propan-2-ol, 3-(5-fluoro-3,3,4,4-tetramethyl-3,4-dihydroisoquinolin-1-yl)quinoline, 3-(4,4-difluoro-3,3-dimethyl-3,4-dihydroisoquinolin-1-yl)quinoline, 3-(4,4,5-trifluoro-3,3-dimethyl-3,4-dihydroisoquinolin-1-yl)quinoline;

L) Antifungal biopesticides selected from: *Ampelomyces quisqualis, Aspergillus flavus, Aureobasidium pullulans, Bacillus pumilus* (II-50), *Bacillus subtilis* (II-51), *Bacillus subtilis* var. *amyloliquefaciens* (II-52), *Candida oleophila* I-82, *Candida saitoana, Clonostachys rosea* f. *catenulata*, also named *Gliocladium catenulatum, Coniothyrium minitans, Cryphonectria parasitica, Cryptococcus albidus, Metschnikowia fructicola, Microdochium dimerum, Phlebiopsis gigantea, Pseudozyma flocculosa, Pythium oligandrum* DV74, *Reynoutria sachlinensis, Talaromyces flavus* V 117b, *Trichoderma asperellum* SKT-1, *T. atroviride* LC52, *T. harzianum* T-22, *T. harzianum* TH 35, *T. harzianum* T-39; *T. harzianum* and *T. viride, T. harzianum* ICC012 and *T. viride* ICC080; *T. polysporum* and *T. harzianum; T. stromaticum, T. virens* GL-21, *T. viride, T. viride* TV1, *Ulocladium oudemansii* HRU3;

M) Growth regulators selected from: abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride) (11-54), naphthaleneacetic acid, N-6-benzyladenine, paclobutrazol, prohexadione (prohexadione-calcium, II-55), prohydrojasmon, thidiazuron, triapenthenol, tributyl phosphorotrithioate, 2,3,5-tri-iodobenzoic acid, trinex-apac-ethyl and uniconazole;

N) Herbicides selected from:
acetamides: acetochlor, alachlor, butachlor, dimethachlor, dimethenamid, flufenacet, mefenacet, metolachlor, metazachlor, napropamide, naproanilide, pethoxamid, pretilachlor, propachlor, thenylchlor;
amino acid derivatives: bilanafos, glyphosate, glufosinate, sulfosate;
aryloxyphenoxypropionates: clodinafop, cyhalofop-butyl, fenoxaprop, fluazifop, haloxyfop, metamifop, propaquizafop, quizalofop, quizalofop-P-tefuryl;
Bipyridyls: diquat, paraquat;
(thio)carbamates: asulam, butylate, carbetamide, desmedipham, dimepiperate, eptam (EPTC), esprocarb, molinate, orbencarb, phenmedipham, prosulfocarb, pyributicarb, thiobencarb, triallate;
cyclohexanediones: butroxydim, clethodim, cycloxydim, profoxydim, sethoxydim, tepraloxydim, tralkoxydim;
dinitroanilines: benfluralin, ethalfluralin, oryzalin, pendimethalin, prodiamine, trifluralin;
diphenyl ethers: acifluorfen, aclonifen, bifenox, diclofop, ethoxyfen, fomesafen, lactofen, oxyfluorfen; -hydroxybenzonitriles: bomoxynil, dichlobenil, ioxynil;
imidazolinones: imazamethabenz, imazamox, imazapic, imazapyr, imazaquin, imazethapyr;
phenoxy acetic acids: clomeprop, 2,4-dichlorophenoxyacetic acid (2,4-D), 2,4-DB, dichlorprop, MCPA, MCPA-thioethyl, MCPB, Mecoprop;
pyrazines: chloridazon, flufenpyr-ethyl, fluthiacet, norflurazon, pyridate;
pyridines: aminopyralid, clopyralid, diflufenican, dithiopyr, fluridone, fluroxypyr, picloram, picolinafen, thiazopyr;
sulfonyl ureas: amidosulfuron, azimsulfuron, bensulfuron, chlorimuronethyl, chlorsulfuron, cinosul-furon, cyclosulfamuron, ethoxysulfuron, flazasulfuron, flucetosulfuron, flupyrsulfuron, foramsulfuron, halosulfuron, imazosulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propyl-imidazo[1,2-b]pyridazin-3-yl)sulfonyl)-3-(4,6-dimethoxy-pyrimidin-2-yl)urea;
triazines: ametryn, atrazine, cyanazine, dimethametryn, ethiozin, hexazinone, metamitron, metribuzin, prometryn, simazine, terbuthylazine, terbutryn, triaziflam;

ureas: chlorotoluron, daimuron, diuron, fluometuron, isoproturon, linuron, methabenzthiazuron, tebuthiuron;

other acetolactate synthase inhibitors: bispyribac-sodium, cloransulammethyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, py-roxsulam;

other herbicides: amicarbazone, aminotriazole, anilofos, beflubutamid, benazolin, bencarbazone, benfluresate, benzofenap, bentazone, benzobicyclon, bicyclopyrone, bromacil, bromobutide, butafenacil, butamifos, cafenstrole, carfentrazone, cinidon-ethyl, chlorthal, cinmethylin, clomazone, cumyluron, cyprosulfa-mide, dicamba, difenzoquat, diflufenzopyr, *Drechslera monoceras*, endothal, ethofumesate, etobenzanid, fenoxasulfone, fentrazamide, flumiclorac-pentyl, flumioxazin, flupoxam, flurochloridone, flurtamone, indanofan, isoxaben, isoxaflutole, lenacil, propanil, propyzamide, quinclorac, quinmerac, mesotrione, methyl arsonic acid, naptalam, oxadiargyl, oxadiazon, oxaziclomefone, pentoxazone, pinoxaden, pyraclonil, pyraflufen-ethyl, pyrasulfotole, pyrazoxyfen, pyrazolynate, quinoclamine, saflufenacil, sulcotrione, sulfentrazone, terbacil, tefuryltrione, tembotrione, thiencarbazone, topramezone, (3-[2-chloro-4-fluoro-5-(3-methyl-2,6-dioxo-4-trifluoromethyl-3,6-dihydro-2H-pyrimidin-1-yl)-phenoxy]-pyri-din-2-yloxy)-acetic acid ethyl ester, 6-amino-5-chloro-2-cyclopropyl-pyrimidine-4-carboxylic acid methyl ester, 6-chloro-3-(2-cyclopropyl-6-methyl-phenoxy)-pyridazin-4-ol, 4-amino-3-chloro-6-(4-chlorophenyl)-5-fluoro-pyridine-2-carboxylic acid, 4-amino-3-chloro-6-(4-chloro-2-fluoro-3-methoxy-phenyl)-pyridine-2-carboxylic acid methyl ester, and 4-amino-3-chloro-6-(4-chloro-3-dimethylamino-2-fluoro-phenyl)-pyridine-2-carboxylic acid methyl ester;

O) Insecticides selected from:

organo(thio)phosphates: acephate, azamethiphos, azinphos-methyl, chlorpyrifos, chlorpyrifos-methyl, chlorfenvinphos, diazinon, dichlorvos, dicrotophos, dimethoate, disulfoton, ethion, fenitrothion, fenthion, isoxathion, malathion, methamidophos, methidathion, methyl-parathion, mevinphos, monocrotophos, oxydemeton-methyl, paraoxon, parathion, phenthoate, phosalone, phosmet, phos-phamidon, phorate, phoxim, pirimiphos-methyl, profenofos, prothiofos, sulprophos, tetrachlorvinphos, terbufos, triazophos, trichlorfon;

carbamates: alanycarb, aldicarb, bendiocarb, benfuracarb, carbaryl, carbofuran, carbosulfan, fenox-ycarb, furathiocarb, methiocarb, methomyl, oxamyl, pirimicarb, propoxur, thiodicarb, triazamate;

pyrethroids: allethrin, bifenthrin, cyfluthrin, cyhalothrin, cyphenothrin, cypermethrin, alpha-cypermethrin, beta-cypermethrin, zetacypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin;

insect growth regulators: a) chitin synthesis inhibitors: benzoylureas: chlorfluazuron, cyramazin, dif-lubenzuron, flucycloxuron, flufenoxuron, hexaflumuron, lufenuron, novaluron, teflubenzuron, triflumuron; buprofezin, diofenolan, hexythiazox, etoxazole, clofentazine; b) ecdysone antagonists: halofenozide, methoxyfenozide, tebufenozide, azadirachtin; c) juvenoids: pyriproxyfen, methoprene, fenoxycarb; d) lipid biosynthesis inhibitors: spirodiclofen, spiromesifen, spirotetramat;

nicotinic receptor agonists/antagonists compounds: clothianidin, dinotefuran, flupyradifurone, imidacloprid, thiamethoxam, nitenpyram, acetamiprid, thiacloprid, 1-2-chloro-thiazol-5-ylmethyl)-2-nitrimino-3,5-dimethyl-[1,3,5]triazinane;

nicotinic acetylcholine receptor disruptors or allosteric modulators (IRAC Group 5): spinosyn (including but not limited to spinosyns A, D, B, C, E, F, G, H, J, and other spinosyn isolates from *Saccharopolyspora spinosa* culture), spinosad (comprising primarily spinsyns A and D), and derivatives or substituents thereof (including but not limited to tetracyclic and pentacyclic spinosyn derivatives, aziridine spinosyn derivatives, C-5,6 and/or C-13,14 substituted spinosyn derivatives); spinetoram (including but not limited to XDE-175-J, XDE-175-L or other O-ethyl substituted spinosyn derivatives); butenyl-spinosyn and derivatives or substituents thereof (such as isolates from *Saccharopolyspora pogona* culture);

bioinsecticides including but not limited to *Bacillus thuriengiensis*, *Burkholderia* spp, *Beauveria bassiana*, *Metarhizium anisoptiae*, *Paecilomyces fumosoroseus*, and baculoviruses (including but not limited to granuloviruses and nucleopolyhedroviruses);

GABA antagonist compounds: endosulfan, ethiprole, fipronil, vaniliprole, pyrafluprole, pyriprole, 5-amino-1-(2,6-dichloro-4-methyl-phenyl)-4-sulfinamoyl-1H-pyrazole-3-carbothioic acid amide;

mitochondrial electron transport inhibitor (METI) I acaricides: fenazaquin, pyridaben, tebufenpyrad, tolfenpyrad, flufenerim;

METI II and III compounds: acequinocyl, fluacyprim, hydramethylnon;

Uncouplers: chlorfenapyr;

oxidative phosphorylation inhibitors: cyhexatin, diafenthiuron, fenbutatin oxide, propargite;

moulting disruptor compounds: cryomazine;

mixed function oxidase inhibitors: piperonyl butoxide;

sodium channel blockers: indoxacarb, metaflumizone;

ryanodine receptor inhibitors: chlorantraniliprole, cyantraniliprole, fluben-diamide, N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; N-[4-chloro-2-[(diethyl-lambda-4-sulfanylidene)carbamoyl]-6-methyl-phenyl]-2-(3-chloro-2-pyridyl)-5-trifluoromethyl) pyrazole-3-carboxamide; N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-car-boxamide; N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; N-[4,6-dichloro-2-[(diethyl-lambda-4-sulfanyli-dene)carbamoyl]-phenyl]-2-(3-chloro-2-pyridyl)-5-(difluoromethyl)pyrazole-3-carboxamide; N-[4,6-dibromo-2-[(di-2-propyl-lambda-4-sulfanyl-idene)carbamoyl]-phenyl]-2-(3-chloro-2-pyridyl)-5-(trifluoromethyl)pyrazole-3-carboxamide; N-[4-chloro-2-[(di-2-propyl-lambda-4-sulfanylidene)

carbamoyl]-6-cyano-phenyl]-2-(3-chloro-2-pyridyl)-5-(trifluoromethyl)pyrazole-3-carboxamide; N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide;

others: benclothiaz, bifenazate, cartap, flonicamid, pyridalyl, pymetrozine, sulfur, thiocyclam, cyenopyrafen, flupyrazofos, cyflumetofen, amidoflumet, imicyafos, bistrifluron, pyrifluquinazon, 1,1'-[(3S,4R,4aR,6S,6aS,12R,12aS,12bS)-4-[[(2-cyclopropylacetyl)oxy]-methyl]-1,3,4,4a,5,6,6a,12,12a,12b-decahydro-12-hydroxy-4,6a,12b-trimethyl-11-oxo-9-(3-pyridinyl)-2H,11H-naphtho[2,1-b]pyrano[3,4-e]pyran-3,6-diyl] cyclopropaneacetic acid ester; fluensulfone, fluoroalkenyl thioethers; and P) ribonucleic acid (RNA) and associated compounds including double-stranded RNA (dsRNA), microRNA (miRNA) and small interfering RNA (siRNA); bacteriophages.

In some such embodiments, the synergistic pesticidal composition may comprise one or more pesticidal active ingredient, such as selected from the list above, and one or more C11 unsaturated or saturated aliphatic acid or agriculturally acceptable salt thereof. In some further such embodiments, the synergistic pesticidal composition may comprise one or more pesticidal active ingredient, such as selected from the list above, and one or more C12 unsaturated or saturated aliphatic acid or agriculturally acceptable salt thereof.

In some embodiments, synergistic pesticidal compositions may be provided, where the pesticidal active ingredient comprises at least one pesticidal natural oil selected from: neem oil, karanja oil, clove oil, clove leaf oil, peppermint oil, spearmint oil, mint oil, cinnamon oil, thyme oil, oregano oil, rosemary oil, geranium oil, lime oil, lavender oil, anise oil, lemongrass oil, tea tree oil, apricot kernel oil, bergamot oil, carrot seed oil, cedar leaf oil, citronella oil, clove bud oil, coriander oil, coconut oil, *eucalyptus* oil, evening primrose oil, fennel oil, ginger oil, grapefruit oil, nootkatone(+), grapeseed oil, lavender oil, marjoram oil, pine oil, scotch pine oil, and/or garlic oil and/or components, derivatives and/or extracts of one or more pesticidal natural oil, or a combination thereof. In some further embodiments, synergistic pesticidal compositions may be provided which comprise additional active components other than the principal one or more pesticidal active ingredients, wherein such additional active components may comprise one or more additional efficacies and/or synergistic effects on the pesticidal efficacy of the composition, such as but not limited to adjuvants, synergists, agonists, activators, or combinations thereof, for example. In one such embodiment, such additional active components may optionally comprise naturally occurring compounds or extracts or derivatives thereof. In other embodiments, the pesticidal active ingredient may comprise at least one organic, certified organic, US Department of Agriculture ("USDA") National Organic Program compliant ("NOP-compliant") such as may be included in the US Environmental Protection Agency FIFRA 25b, list of ingredients published dated December 2015 by the US EPA entitled "Active Ingredients Eligible for Minimum Risk Pesticide Products", the US EPA FIFRA 4a list published August 2004 entitled "List 4A—Minimal Risk Inert Ingredients" or the US EPA FIFRA 4b list published August 2004 entitled "List 4B—Other ingredients for which EPA has sufficient information", for example, Organic Materials Review Institute listed ("OMRI-listed") or natural pesticidal active ingredient, for example.

In some embodiments, the pesticidal active ingredient may comprise at least one of: neem oil, karanja oil and extracts or derivatives thereof. In further exemplary such embodiments, the pesticidal active ingredient may comprise at least one extract or active component of neem oil or karanja oil, such as but not limited to: azadirachtin, azadiradione, azadirone, nimbin, nimbidin, salannin, deacetylsalannin, salannol, maliantriol, gedunin, karanjin, pongamol, or derivatives thereof, for example.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF SEVERAL EMBODIMENTS

Figure 1:
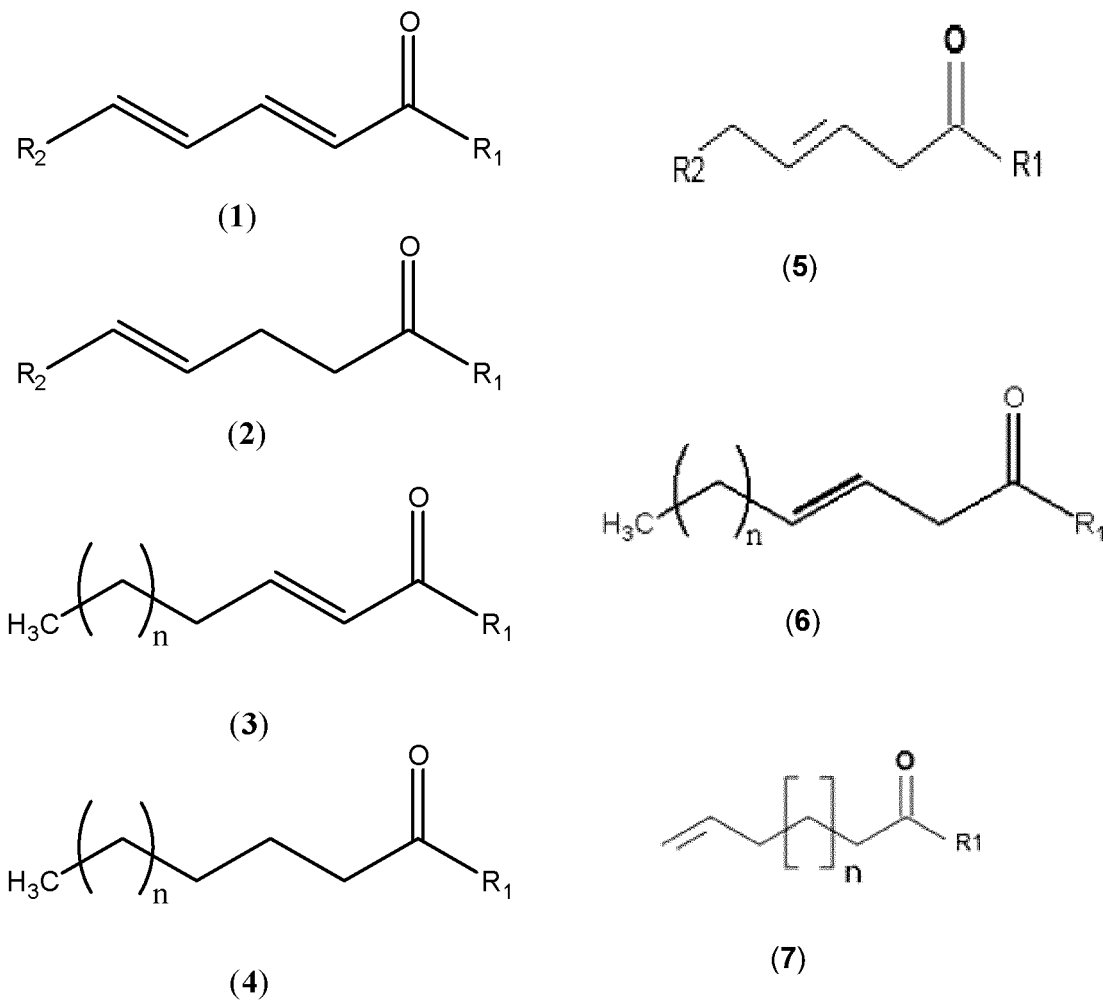
FIG. 1 illustrates general carbonyl alkene structures (1), (2) and (3) associated with an exemplary C6-C10 unsaturated aliphatic acid, or agriculturally acceptable salt thereof, according to an embodiment of the present disclosure.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Definitions

Unless otherwise defined, all technical and scientific terms used herein have the same meaning as commonly understood by one of ordinary skill in the art to which this invention belongs. Although methods and materials similar or equivalent to those described herein can be used in the practice or testing of the invention, suitable methods and materials are described herein.

All applications, publications, patents and other references, citations cited herein are incorporated by reference in their entirety. In case of conflict, the specification, including definitions, will control.

As used herein, the singular forms "a", "and," and "the" include plural referents unless the context clearly indicates otherwise.

As used herein, all numerical values or numerical ranges include integers within such ranges and fractions of the values or the integers within ranges unless the context clearly indicates otherwise. Thus, for example, reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth.

As used herein, "plant" embraces individual plants or plant varieties of any type of plants, in particular agricultural, silvicultural and ornamental plants.

As used herein, the terms "pest" or "pests" or grammatical equivalents thereof, are understood to refer to organisms, e.g., including pathogens, that negatively affect a host or other organism—such as a plant or an animal—by colonizing, damaging, attacking, competing with them for nutrients, infesting or infecting them, as well as undesired organisms that infest human structures, dwellings, living spaces or foodstuffs. Pests include but are not limited to fungi, weeds, nematodes, acari, and arthropods, including insects, arachnids and cockroaches. It is understood that the terms "pest" or "pests" or grammatical equivalents thereof can refer to organisms that have negative effects by infesting plants and seeds, and commodities such as stored grain.

As used herein, the terms "pesticide" or "pesticidal" or grammatical equivalents thereof, are understood to refer to any composition or substance that can be used in the control of any agricultural, natural environmental, human or other animal pathogenic, and domestic/household pests. The terms "control" or "controlling" are meant to include, but are not limited to, any killing, inhibiting, growth regulating, or pestistatic (inhibiting or otherwise interfering with the normal life cycle of the pest) activities of a composition against a given pest. These terms include for example sterilizing activities which prevent the production or normal development of seeds, ova, sperm or spores, cause death of seeds, sperm, ova or spores, or otherwise cause severe injury to the genetic material. Further activities intended to be encompassed within the scope of the terms "control" or "controlling" include preventing larvae from developing into mature progeny, modulating the emergence of pests from eggs including preventing eclosion, degrading the egg material, suffocation, interfering with mycelial growth, reducing gut motility, inhibiting the formation of chitin, disrupting mating or sexual communication, preventing feeding (antifeedant) activity, and interfering with location of hosts, mates or nutrient-sources. The term "pesticide" includes fungicides, herbicides, nematicides, insecticides and the like. The term "pesticide" encompasses, but is not limited to, naturally occurring compounds as well as so-called "synthetic chemical pesticides" having structures or formulations that are not naturally occurring, where pesticides may be obtained by various means including, but not limited to, extraction from biological sources, chemical synthesis of the compound, and chemical modification of naturally occurring compounds obtained from biological sources.

As used herein, the terms "insecticidal" and "acaridical" or "aphicidal" or grammatical equivalents thereof, are understood to refer to substances having pesticidal activity against organisms encompassed by the taxonomical classification of root term and also to refer to substances having pesticidal activity against organisms encompassed by colloquial uses of the root term, where those colloquial uses may not strictly follow taxonomical classifications. The term "insecticidal" is understood to refer to substances having pesticidal activity against organisms generally known as insects of the phylum Arthropoda, class Insecta. Further as provided herein, the term is also understood to refer to substances having pesticidal activity against other organisms that are colloquially referred to as "insects" or "bugs" encompassed by the phylum Arthropoda, although the organisms may be classified in a taxonomic class different from the class Insecta. According to this understanding, the term "insecticidal" can be used to refer to substances having activity against arachnids (class Arachnida), in particular mites (subclass Acari/Acarina), in view of the colloquial use of the term "insect." The term "acaridical" is understood to refer to substances having pesticidal activity against mites (Acari/Acarina) of the phylum Arthropoda, class Arachnida, subclass Acari/Acarina. The term "aphicidal" is understood to refer to substances having pesticidal activity against aphids (Aphididae) of the phylum Arthropoda, class Insecta, family Aphididae. It is understood that all these terms are encompassed by the term "pesticidal" or "pesticide" or grammatical equivalents. It is understood that these terms are not necessarily mutually exclusive, such that substances known as "insecticides" can have pesticidal activity against organisms of any family of the class Insecta, including aphids, and organisms that are encompassed by other colloquial uses of the term "insect" or "bug" including arachnids and mites. It is understood that "insecticides" can also be known as acaricides if they have pesticidal activity against mites, or aphicides if they have pesticidal activity against aphids.

As used herein, the terms "control" or "controlling" or grammatical equivalents thereof, are understood to encompass any pesticidal (killing) activities or pestistatic (inhibiting, repelling, deterring, and generally interfering with pest functions to prevent the damage to the host plant) activities of a pesticidal composition against a given pest. Thus, the terms "control" or "controlling" or grammatical equivalents thereof, not only include killing, but also include such activities as repelling, deterring, inhibiting or killing egg development or hatching, inhibiting maturation or development, and chemisterilization of larvae or adults. Repellant or deterrent activities may be the result of compounds that are poisonous, mildly toxic, or non-poisonous to pests, or may act as pheromones in the environment.

As used herein, the term "pesticidally effective amount" generally means the amount of the inventive mixtures or of compositions comprising the mixtures needed to achieve an observable effect on growth, including the effects of necrosis, death, retardation, prevention, and removal, destruction, or otherwise diminishing the occurrence and activity of the target pest organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mod+e of application, and the like.

As used herein, where a range of values is provided, it is understood that each intervening value, to the tenth of the unit of the lower limit unless the context clearly dictates otherwise, between the upper and lower limit of that range and any other stated or intervening value within that stated range is encompassed within embodiments of the invention. The upper and lower limits of these smaller ranges may independently define a smaller range of values, and it is to be understood that these smaller ranges are intended to be encompassed within embodiments of the invention, subject to any specifically excluded limit in the stated range.

In one embodiment according to the present disclosure, a synergistic pesticidal composition comprises a C6-C10 unsaturated aliphatic acid (or agriculturally acceptable salt thereof), the and at least one pesticidal active ingredient. In some embodiments, the effective dose of the pesticidal active ingredient when used in combination with the one or more C6-C10 saturated or unsaturated aliphatic acid is lower than the effective dose of the pesticidal active ingredient when used alone (i.e. a smaller amount of pesticidal active can still control pests when used in a synergistic composition together with the one or more C6-C10 saturated or unsaturated aliphatic acid). In some embodiments, a pesticidal active ingredient that is not effective against a particular species of pest can be made effective against that particular species when used in a synergistic composition together with one or more C6-C10 saturated or unsaturated aliphatic acid. In some such embodiments, the pesticidal composition may comprise a C11 unsaturated or saturated aliphatic acid or agriculturally compatible salt thereof. In some further such embodiments, the pesticidal composition may comprise a C12 unsaturated or saturated aliphatic acid or agriculturally compatible salt thereof.

Without being bound by any particular theory, it is believed that the one or more C6-C10 saturated or unsaturated aliphatic acids according to some embodiments of the present disclosure act as cell permeabilizing agents, and when combined with a suitable pesticidal active ingredient, may desirably facilitate the entry of the pesticidal active ingredient into the cells of a target pest or pathogen, thereby desirably providing for a synergistic activity of such a synergistic pesticidal composition. All eukaryotic cell membranes, including for example fungal cell membranes and the cell membranes of insects and nematodes are biochemically similar in that they all comprise a lipid bilayer which is comprised of phospholipids, glycolipids and sterols, as well as a large number of proteins (Cooper & Hausmann 2013). The amphipathic structure of the lipid bilayer and the polarity of membrane proteins restricts passage of extracellular compounds across the membrane and allows compartmentalization of internal organelles from the intracellular environment. Without being bound by theory, it is believed that the one or more C6-C10 saturated or unsaturated aliphatic acids according to some embodiments disclosed herein will act as cell permeabilizing agents, and when combined with a suitable pesticidal active ingredient may desirably act to enhance the entry of the active ingredient (such as but not limited to fungicidal, insecticidal, acaricidal, molluscicidal, bactericidal and nematicidal actives) into the cells and/or into the intracellular organelles or intracellular bodies of a target pest or pathogen (such as but not limited to fungi, insects, acari, mollusks, bacteria and nematodes, respectively), for example.

In a further embodiment, without being bound by theory, it is believed that the size and/or polarity of many pesticidal molecules prevents and/or limits the pesticidal active ingredient from crossing the cellular membrane, but that the addition of one or more C6-C10 saturated or unsaturated aliphatic acid in accordance with some embodiments of the present disclosure may desirably compromise or provide for the disturbance of the pest cell membrane's lipid bilayer integrity and protein organization such as to create membrane gaps, and/or increase the membrane fluidity, such as to allow the pesticidal active to more effectively enter the cell and/or intracellular organelles of the pest cells, for example. In some such embodiments, the pesticidal composition may comprise a C11 unsaturated aliphatic acid or agriculturally compatible salt thereof. In some further such embodiments, the pesticidal composition may comprise a C12 unsaturated or saturated aliphatic acid or agriculturally compatible salt thereof.

In another aspect, without being bound to any particular theory, it is believed that the one or more C6-C10 saturated or unsaturated aliphatic acids, or agriculturally acceptable salts thereof, (and in some additional embodiments, alternatively a C11 or C12 unsaturated or saturated aliphatic acid or agriculturally compatible salt thereof). In some further such embodiments, the pesticidal composition may comprise a C12 unsaturated aliphatic acid or agriculturally compatible salt thereof according to some embodiments of the present disclosure act as at least one of a potentiator, synergist, adjuvant and/or agonist when combined with a suitable pesticidal active ingredient, thereby desirably providing for a synergistic activity of such a synergistic pesticidal composition against a target pest or pathogen.

In some embodiments according to the present disclosure, a synergistic pesticidal composition accordingly to the present invention comprises one or more C6-C10 saturated or unsaturated aliphatic acid, or agriculturally acceptable salts thereof (and in some additional embodiments, alternatively a C11 or C12 unsaturated or saturated aliphatic acid or agriculturally compatible salt thereof), as an exemplary cell permeabilizing agent, in combination with a pesticide. In some embodiments, the synergistic composition comprises one or more C6-C10 saturated or unsaturated aliphatic acid (or agriculturally acceptable salt thereof), as an exemplary cell permeabilizing agent, in combination with a fungicide. In some embodiments, the synergistic composition comprises one or more C6-C10 saturated or unsaturated aliphatic acid (or agriculturally acceptable salt thereof), as an exemplary cell permeabilizing agent, in combination with a nematicide. In some embodiments, the synergistic composition comprises one or more C6-C10 saturated or unsaturated aliphatic acid (or agriculturally acceptable salt thereof), as an exemplary cell permeabilizing agent, in combination with an insecticide.

In one such embodiment, without being bound to a particular theory, it is believed that the one or more C6-C10 saturated or unsaturated aliphatic acid (and in some additional embodiments, alternatively a C11 or C12 unsaturated or saturated aliphatic acid or agriculturally compatible salt thereof) may act as a cellular membrane delivery agent, so as to improve the entry of and/or bioavailability or systemic distribution of a pesticidal active ingredient within a target pest cell and/or within a pest intracellular organelle, such by facilitating the pesticidal active ingredient in passing into the mitochondria of the pest cells, for example. In some other embodiments, without being bound by a particular theory, the one or more C6-C10 saturated or unsaturated aliphatic acid may further provide for synergistic interaction with one or more additional compounds provided as part of the pesticidal composition, such as an additional one or more C6-C10 saturated aliphatic acid, or one or more C6-C10 unsaturated aliphatic acid, or one or more additional active ingredients or adjuvants, so as to provide for synergistic enhancement of a pesticidal effect provided by the at least one pesticidal active ingredient, for example.

In another aspect, without being bound to any particular theory, it is believed that the one or more C6-C10 saturated or unsaturated aliphatic acids (or agriculturally acceptable salts thereof) according to some embodiments of the present disclosure act as at least one of a potentiator, synergist, adjuvant and/or agonist when combined with a suitable pesticidal ingredient, thereby desirably providing for a synergistic activity of such a synergistic pesticidal composition against a target pest or pathogen. In some additional embodiments, such synergistic pesticidal composition may alternatively comprise a C11 or C12 unsaturated or saturated aliphatic acid or agriculturally compatible salt thereof.

Without being bound by any particular theory, in some embodiments of the present invention, it is believed that the one or more C6-C10 saturated or unsaturated aliphatic acids act to compromise or alter the integrity of the lipid bilayer and protein organization of cellular membranes in target pest organisms. Further, it is also believed that in some embodiments one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action that is dependent upon interaction with one or more components of the cellular membrane of a target pest. In some such embodiments, one or more C6-C10 saturated or unsaturated aliphatic acids may be particularly adapted for combining to form a synergistic pesticidal composition, demonstrating synergistic efficacy, with pesticidal actives which have a mode of action dependent on interaction with a cellular membrane protein. In one such embodiment, the cellular membrane protein may comprise one or more cytochrome complexes, such as a cytochrome bc1 complex or a cytochrome p450 complex, for example. Accordingly, in one aspect, synergistic pesticidal compositions according to some embodiments of the present invention may desirably be selected to comprise one or more C6-C10 saturated or unsaturated aliphatic acids, and one or more pesticidal active having a pesticidal mode of action that is dependent upon interaction with one or more components of the cellular membrane of a target pest, such as a cellular membrane protein, for example. In one aspect, one or more C11 or C12 saturated or unsaturated aliphatic acids is provided in combination with one or more pesticidal active having a pesticidal mode of action that is dependent upon interaction with one or more components of the cellular membrane of a target pest, such as a cellular membrane protein, for example.

In a particular embodiment, one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action interacting with (such as by inhibiting one or more receptor sites) the cellular membrane cytochrome bc1 complex (also known as the cytochrome complex III), such as fungicidal actives collectively referred to as Group 11 actives by the Fungicide Resistance Action Committee (FRAC), including e.g. azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl trifloxystrobin, dimoxystrobin, fenaminstrobin, metominostrobin, orysastrobin, famoxadone, fluoxastrobin, fenamidone, or pyribencar. In one such embodiment, a synergistic pesticidal composition may be selected comprising one or more C6-C10 saturated or unsaturated aliphatic acid and a pesticidal active having a pesticidal mode of action interacting with the cellular cytochrome bc1 complex, such as a strobilurin pesticidal active. In alternative such embodiments, the synergistic pesticidal composition comprises one or more C11 or C12 saturated or unsaturated aliphatic acids.

In another particular embodiment, one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action interacting with (such as by inhibiting one or more receptor sites) the cellular membrane cytochrome p450 complex, such as to inhibit sterol biosynthesis, as is the case with exemplary fungicidal actives collectively referred to as FRAC Group 3 actives, including e.g. triforine, pyrifenox, pyrisoxazole, fenarimol, nuarimol, imazalil, oxpoconazole, pefurazoate, prochloraz, triflumizole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole, or prothioconazole. In one such embodiment, a synergistic pesticidal composition may be selected comprising one or more C6-C10 saturated or unsaturated aliphatic acid and a pesticidal active having a pesticidal mode of action interacting with the cellular cytochrome p450 complex, such as an azole or triazole pesticidal active, for example. In alternative such embodiments, the synergistic pesticidal composition comprises one or more C11 or C12 saturated or unsaturated aliphatic acids.

In another particular embodiment, one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action interacting with (such as by inhibiting one or more receptor sites) the cellular membrane, such as to uncouple oxidative phosphorylation, as is the case with exemplary insecticidal actives collectively referred to as Group 13 actives by the Insecticide Resistance Action Committee (IRAC), including e.g. quinoxyfen or proquinazid. In one such embodiment, a synergistic pesticidal composition may be selected comprising one or more C6-C10 saturated or unsaturated aliphatic acid and a pesticidal active having a pesticidal mode of action interacting with the cellular membrane, such as a pyrrole insecticidal active, an example of which is chlorfenapyr. In alternative such embodiments, the synergistic pesticidal composition comprises one or more C11 or C12 saturated or unsaturated aliphatic acids.

In another particular embodiment, one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action interacting with (such as by disrupting and/or allosterically modulating one or more receptor sites) the cellular membrane, such as to disrupt one or more nicotinic acetylcholine receptor sites (such as Site 1), as is the case with exemplary insecticidal actives collectively referred to as Group 5 actives by the Insecticide Resistance Action Committee (IRAC). Such IRAC Group 5 actives include, for example: spinosyn (including but not limited to spinosyns A, D, B, C, E, F, G, H, J, and other spinosyn isolates from *Saccharopolyspora spinosa* culture), spinosad (comprising primarily spinsyns A and D), and derivatives or substituents thereof (including but not limited to tetracyclic and pentacyclic spinosyn derivatives, aziridine spinosyn derivatives, C-5,6 and/or C-13,14 substituted spinosyn derivatives); spinetoram (including but not limited to XDE-175-J, XDE-175-L or other O-ethyl substituted spinosyn derivatives); butenyl-spinosyn and derivatives or substituents thereof (such as isolates from *Saccharopolyspora pogona* culture). In one such embodiment, a synergistic pesticidal composition may be selected comprising one or more C6-C10 saturated or unsaturated aliphatic acid and a pesticidal active having a pesticidal mode of action interacting with the cellular membrane, such as a spinosyn or spinosyn derivative insecticidal active, examples of which may include Spinosad and spinetoram. In alternative such embodiments, the synergistic pesticidal composition may comprise one or more C11 or C12 saturated or unsaturated aliphatic acids, substituents, or salts thereof.

Without being bound by any particular theory, in some further embodiments of the present invention, it is believed that one or more C6-C10 saturated or unsaturated aliphatic acids act to compromise or alter the integrity of the lipid bilayer and protein organization of cellular membranes in target pest organisms, and by so doing are effective to increase at least one of the fluidity and permeability of a cellular membrane of a target pest organism, which may desirably increase permeability and/or transport of a pesticidal active through the cellular membrane, for example. Further, it is also believed that in some embodiments one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action that is dependent upon transport across one or more cellular membrane of a target pest, such as to interact with a target site inside a cell or an intracellular organelle of the target pest. In some such embodiments, a synergistic pesticidal composition according to an embodiment of the present invention, demonstrating synergistic efficacy, may comprise one or more C6-C10 saturated or unsaturated aliphatic acid, and one or more pesticidal active having a mode of action dependent on transport across a cellular membrane. Accordingly, in one aspect, synergistic pesticidal compositions according to some embodiments of the present invention may desirably be selected to comprise one or more C6-C10 saturated or unsaturated aliphatic acids, and one or more pesticidal active having a pesticidal mode of action that is dependent upon interaction with a target site within a cell or intracellular organelle of a target pest, such as a cellular membrane protein, for example. In alternative such embodiments, the synergistic pesticidal composition comprises one or more C11 or C12 saturated or unsaturated aliphatic acids.

In a particular embodiment, one or more C6-C10 saturated or unsaturated aliphatic acids are particularly adapted for combination to form synergistic pesticidal compositions according to embodiments of the invention, which demonstrate synergistic efficacy, with pesticidal actives having a pesticidal mode of action interacting with (such as by inhibiting one or more receptors) at a target site across a cellular membrane of a target pest, such as fungicidal actives collectively referred to as FRAC Group 9 and Group 12 actives, for example, including e.g. cyprodinil, mepanipyrim, pyrimethanil, fenpiclonil or fludioxonil. In one such embodiment, a synergistic pesticidal composition may be selected comprising one or more C6-C10 saturated or unsaturated aliphatic acid and a pesticidal active having a pesticidal mode of action interacting with a target site within a cellular membrane of a target pest, such as one or more of an anilinopyrimidine such as cyprodinil, and a phenylpyrrole such as fludioxonil, for example. In alternative such embodiments, the synergistic pesticidal composition comprises one or more C11 or C12 saturated or unsaturated aliphatic acids.

Without being bound by any particular theory, in some yet further embodiments of the present invention, it is believed that one or more C6-C10 saturated or unsaturated aliphatic acids act to compromise or alter the integrity of the lipid bilayer and protein organization of cellular membranes in target pest organisms, and by so doing are effective to increase at least one of the fluidity and permeability of a cellular membrane of a target pest organism, which may desirably increase permeability and/or transport of a pesticidal active through the cellular membrane, for example. Further, it is also believed that in some alternative embodiments one or more C6-C10 unsaturated aliphatic acids having unsaturated C—C bonds at one or more of the second (2-), third (3-) and terminal ((n−1)-) locations in the aliphatic acid carbon chain may be desirably adapted for combination to form synergistic pesticidal compositions according to embodiments of the invention, which demonstrate synergistic efficacy, with pesticidal actives. In some particular such embodiments, one or more C6-C10 aliphatic acids comprising an unsaturated C—C bond at one or more of the 2-,3- and (n−1)-locations (wherein n is the number of carbons in the unsaturated aliphatic acid) may desirably be adapted for forming synergistic pesticidal compositions in combination with one or more pesticidal active having a pesticidal mode of action that is dependent upon interaction with a cellular membrane component of a target pest, or dependent upon transport across one or more cellular membrane of a target pest (such as to interact with a target site inside a cell or an intracellular organelle of the target pest). In some such embodiments, a synergistic pesticidal composition according to an embodiment of the present invention, demonstrating synergistic efficacy, may comprise one or more C6-C10 unsaturated aliphatic acid having an unsaturated C—C bond at one or more of the 2-, 3- and terminal ((n−1)-) locations in the aliphatic acid carbon chain, and one or more pesticidal active having a mode of action dependent on interaction with a target pest cellular membrane component, or on transport across a target pest cellular membrane. In alternative such embodiments, the synergistic pesticidal composition comprises one or more C11 or C12 unsaturated aliphatic acids having an unsaturated C—C bond at one or more of the 2-, 3- and terminal ((n−1)-).

In some embodiments, the one or more C6-C10 saturated or unsaturated aliphatic acid (or agriculturally acceptable salt thereof) comprises an aliphatic carbonyl alkene. In some embodiments, the one or more C6-C10 saturated or unsaturated aliphatic acid (or agriculturally acceptable salt thereof) comprises at least one C6-C10 unsaturated aliphatic acid having at least one carboxylic group and at least one unsaturated C—C bond. In another embodiment, the C6-C10 unsaturated aliphatic acid (or agriculturally acceptable salt thereof) comprises at least two C6-C10 unsaturated aliphatic acids having at least one carboxylic group and at least one unsaturated C—C bond. In yet another embodiment, the C6-C10 unsaturated aliphatic acid (or agriculturally acceptable salt thereof) comprises at least one carboxylic acid group and at least one of a double or triple C—C bond. In a further embodiment, a synergistic pesticidal composition is provided comprising at least one pesticidal active ingredient, and at least one C6-C10 unsaturated aliphatic acid (or agriculturally acceptable salt thereof) having at least one carboxylic acid group and at least one unsaturated C—C bond, in combination with at least one C6-C10 saturated aliphatic acid (or agriculturally acceptable salt thereof). In yet another embodiment, the C6-C10 saturated or unsaturated aliphatic acid may be provided as a plant extract or oil, or fraction thereof, containing the at least one C6-C10 saturated or unsaturated aliphatic acid, for example, or in further embodiments, containing the one or more C11 or C12 saturated or unsaturated aliphatic acid.

In some embodiments, the one or more C6-C10 saturated or unsaturated aliphatic acid (or agriculturally acceptable salt thereof) comprises an aliphatic carbonyl alkene having one of the general structures (1), (2) or (3), as shown in FIG. 1. In further embodiments, the one or more C6-C10 saturated or unsaturated aliphatic acid may additionally comprise a C11 or C12 saturated or unsaturated aliphatic acid, and may compise an aliphatic carbonyl alkene having one of the general structures (1), (2) or (3) as shown in FIG. 1. In some embodiments, the C6-C10 (or alternatively C11 or C12) saturated or unsaturated aliphatic acid may additionally comprise at least one substituent selected from the list comprising: hydroxy, alkyl and amino substituents. In some exemplary embodiments, the at least one substituent may comprise at least one of: 2-hydroxy, 3-hydroxy, 4-hydroxy, 8-hydroxy, 10-hydroxy, 12-hydroxy, 2-methyl, 3-methyl, 4-methyl, 2-ethyl, 3-ethyl, 4-ethyl, 2,2-diethyl, 2-amino, 3-amino, and 4-amino substituents, for example. In some embodiments, the C6-C10 (or alternatively C11 or C12) saturated or unsaturated aliphatic acid may comprise an agriculturally acceptable salt form of any of the above-mentioned aliphatic acids.

In some embodiments, the composition comprises one or more C6-C10 saturated or unsaturated aliphatic acid (or agriculturally acceptable salt thereof) and a fungicidal active ingredient. In some embodiments, the effective dose of the fungicidal active ingredient when used in combination with the one or more C6-C10 saturated or unsaturated aliphatic acid is lower than the effective dose of the fungicidal active ingredient when used alone (i.e. a smaller amount of fungicidal active can still control fungi when used in a composition together with the one or more C6-C10 saturated or unsaturated aliphatic acid). In some embodiments, a fungicidal active ingredient that is not effective against a particular species of fungi (such as at a particular concentration that is below a lower limit of efficacy for a particular fungi, or for a particular species of fungi which may be at least partially resistant or tolerant to the particular fungicidal active ingredient when applied alone) can be made effective against that particular species when used in a composition together with one or more C6-C10 saturated or unsaturated aliphatic acid, or in further embodiments, with one or more C11 or C12 saturated or unsaturated aliphatic acid.

In some embodiments, the composition comprises one or more C6-C10 saturated or unsaturated aliphatic acid (or agriculturally acceptable salt thereof) and a nematicidal active ingredient. In some embodiments, the effective dose of the nematicidal active ingredient when used in combination with the one or more C6-C10 saturated or unsaturated aliphatic acid is lower than the effective dose of the nematicidal active ingredient when used alone (i.e. a smaller amount of nematicidal active can still control nematodes when used in a composition together with the one or more C6-C10 saturated or unsaturated aliphatic acid). In some embodiments, a nematicidal active ingredient that is not effective against a particular species of nematode (such as at a particular concentration that is below a lower limit of efficacy for a particular nematode, or for a particular species of nematode which may be at least partially resistant or tolerant to the particular nematicidal active ingredient when applied alone) can be made effective against that particular species when used in a composition together with one or more C6-C10 saturated or unsaturated aliphatic acid, or in further embodiments, with one or more C11 or C12 saturated or unsaturated aliphatic acid.

In some embodiments, the composition comprises one or more C6-C10 saturated or unsaturated aliphatic acid (or agriculturally acceptable salt thereof) and an insecticidal active ingredient. In some embodiments, the effective dose of the insecticidal active ingredient when used in combination with the one or more C6-C10 saturated or unsaturated aliphatic acid is lower than the effective dose of the insecticidal active ingredient when used alone (i.e. a smaller amount of insecticidal active can still control insects, to an exemplary desired degree of control, when used in a composition together with the one or more C6-C10 saturated or unsaturated aliphatic acid). In some embodiments, the aliphatic acid may further comprise one or more C11 or C12 saturated or unsaturated aliphatic acid. In some embodiments, an insecticidal active ingredient that is not effective against a particular species of insect (such as at a particular concentration that is below a lower limit of efficacy for a particular insect, or for a particular species of insect which may be at least partially resistant or tolerant to the particular insecticidal active ingredient when applied alone) can be made effective against that particular species when used in a composition together with one or more C6-C10 saturated or unsaturated aliphatic acid, or in further embodiments, with one or more C11 or C12 saturated or unsaturated aliphatic acid. In further embodiments, the one or more C6-C10 saturated or unsaturated aliphatic acid (or in further embodiments, with one or more C11 or C12 saturated or unsaturated aliphatic acid) may desirably provide for a synergistic increased efficacy of at least one of an acaricidal, molluscicidal, bactericidal or virucidal active ingredient such that the composition is pesticidally effective against one or more of an acari, mollusk, bacterial or viral pest, for example.

In some embodiments, a pesticidal composition is provided comprising at least one C6-C10 saturated or unsaturated aliphatic acid (or in some further embodiments at least one C11 or C12 saturated or unsaturated apliphatic acid) and an insecticidal pesticidal active ingredient, comprising at least one nicotinic acetylcholine receptor disruptor or allosteric modulator. In one such embodiment, the insecticidal active ingredient may comprise at least one or more of: a spinosyn (including but not limited to spinosyns A, D, B, C, E, F, G, H, J, and other spinosyn isolates from *Saccharopolyspora spinosa* culture), spinosad (comprising primarily spinsyns A and D), and derivatives or substituents thereof (including but not limited to tetracyclic and pentacyclic spinosyn derivatives, aziridine spinosyn derivatives, C-5,6 and/or C-13,14 substituted spinosyn derivatives); a spinetoram (including but not limited to XDE-175-J and XDE-175-L); and a butenyl-spinosyn and derivatives or substituents thereof (such as isolates from *Saccharopolyspora pogona* culture). In a particular such embodiment, a pesticidal composition is provided, comprising at least one C6-C10 saturated or unsaturated aliphatic acid (or in some further embodiments at least one C11 or C12 saturated or unsaturated aliphatic acid) and at least one of spinosyn A and spinosyn D. In a further such embodiment, the at least one spinosyn comprises spinosad. In some embodiments, the pesticidal composition comprises a synergistic pesticidal composition. In some particular embodiments, the synergistic pesticidal composition desirably provides a synergistic efficacy to control at least one insect pest.

In some further embodiments, a method of reducing a risk of resistance of at least one target pest to at least one pesticidal active ingredient is provided, the method comprising:

selecting at least one C6-C10 saturated or unsaturated aliphatic acid, or suitable salt thereof, which when applied to said at least one target pest as a pesticidal composition comprising said at least one pesticidal active ingredient and said at least one C4-C10 saturated or unsaturated aliphatic acid, or suitable salt thereof, is effective to provide a synergistic efficacy against said at least one target pest, relative to the application of said at least one pesticidal active ingredient alone; and applying said at least one pesticidal composition to a locus proximate to said at least one target pest.

In some embodiments, the composition comprises one or more C6-C10 saturated or unsaturated aliphatic acid, or in further embodiments alternatively one or more C11 or C12 saturated or unsaturated aliphatic acid (or agriculturally acceptable salt thereof) and a pesticidal natural or essential oil, for example, neem oil. In some embodiments, the pesticidal natural oil may comprise one or more of: neem oil, karanja oil, clove oil, peppermint oil, mint oil, cinnamon oil, thyme oil, oregano oil, geranium oil, lime oil, lavender oil, anise oil, and/or garlic oil and/or components, derivatives and/or extracts of one or more pesticidal natural oil, or a combination of the foregoing, for example. In some embodiments, the pesticidal natural oil is neem oil or a component or derivative thereof. In another embodiment, the pesticidal natural oil comprises karanja oil or a component or derivative thereof. In another embodiment, the pesticidal natural oil comprises thyme oil or a component or derivative thereof.

In other embodiments, the pesticidal natural oil may comprise any natural oil or oil mixture that includes one or more constituents common to two or more of the pesticidal natural oils listed above (i.e. neem oil, karanja oil, clove oil, peppermint oil, cinnamon oil, thyme oil, oregano oil, garlic oil, anise oil, geranium oil, lime oil, lavender oil), including, but not limited to, thymol (found in oregano oil and thyme oil), p-cymene (found in oregano oil and thyme oil), 1,8-cineole (found in thyme oil and peppermint oil), eugenol (found in clove oil and cinnamon oil), limonene (found in cinnamon, peppermint, and lime oil), alpha-pinene (found in cinnamon oil, geranium oil, and lime oil), carvacrol (found in oregano oil, thyme oil, and clove oil), gamma-terpinene (found in oregano oil and lime oil), geraniol (found in thyme oil and geranium oil), alpha-Terpineol (found in thyme oil and anise oil), beta-caryophyllene (found in clove oil, cinnamon oil, and peppermint oil) and linalool (found in thyme oil, cinnamon oil and geranium oil, amongst others). In other embodiments, the pesticidal natural oil may comprise any oil having as a constituent one of the following compounds, or a combination of the following compounds: azadirachtin, nimbin, nimbinin, salannin, gedunin, geraniol, geranial, gamma-terpinene, alpha-terpineol, beta-caryophyllene, terpinen-4-ol, myrcenol-8, thuyanol-4, benzyl alcohol, cinnamaldehyde, cinnamyl acetate, alpha-pinene, geranyl acetate, citronellol, citronellyl formate, isomenthone, 10-epi-gamma-eudesmol, 1,5-dimethyl-1-vinyl-4-hexenylbutyrate, 1,3,7-octatriene, eucalyptol, camphor, diallyl disulfide, methyl allyl trisulfide, 3-vinyl-4H-1,2 dithiin, 3-vinyl-1,2 dithiole-5-cyclohexane, diallyl trisulfide, anethole, methyl chavicol, anisaldehyde, estragole, linalyl acetate, geranial, beta-pinene, thymol, carvacrol, p-cymene, beta-myrcene, alpha-myrcene, 1,8-cineole, eugenol, limonene, alpha-pinene, menthol, menthone, and linalool.

In further embodiments, the pesticidal natural oil may comprise one or more suitable plant essential oils or extracts or fractions thereof disclosed herein including, without limitation: alpha- or beta-pinene; alpha-campholenic aldehyde; alpha.-citronellol; alpha-iso-amyl-cinnamic (e.g., amyl cinnamic aldehyde); alpha-pinene oxide; alpha-cinnamic terpinene; alpha-terpineol (e.g., 1-methyl-4-isopropyl-1-cyclohexen-8-ol); lamda-terpinene; *achillea*; aldehyde C16 (pure); allicin; alpha-phellandrene; amyl cinnamic aldehyde; amyl salicylate; anethole; anise; aniseed; anisic aldehyde; basil; bay; benzyl acetate; benzyl alcohol; bergamot (e.g., Monardia fistulosa, Monarda didyma, Citrus bergamia, Monarda *punctata*); bitter orange peel; black pepper; borneol; calamus; camphor; *cananga* oil (e.g., java); cardamom; carnation (e.g., *dianthus caryophyllus*); carvacrol; carveol; *cassia*; castor; cedar (e.g., hinoki); cedarwood; chamomile; cineole; cinnamaldehyde; cinnamic alcohol; cinnamon; cis-pinane; citral (e.g., 3,7-dimethyl-2,6-octadienal); citronella; citronellal; citronellol dextro (e.g., 3-7-dimethyl-6-octen-1-ol); citronellol; citronellyl acetate; citronellyl nitrile; citrus unshiu; clary sage; clove (e.g., *eugenia caryophyllus*); clove bud; coriander; corn; cotton seed; d-dihydrocarvone; decyl aldehyde; diallyl disulfide; diethyl phthalate; dihydroanethole; dihydrocarveol; dihydrolinalool; dihydromyrcene; dihydromyrcenol; dihydromyrcenyl acetate; dihydroterpineol; dimethyl salicylate; dimethyloctanal; dimethyloctanol; dimethyloctanyl acetate; diphenyl oxide; dipropylene glycol; d-limonene; d-pulegone; estragole; ethyl vanillin (e.g., 3-ethoxy-4-hydrobenzaldehyde); eucalyptol (e.g., cineole); *eucalyptus citriodora; eucalyptus globulus; eucalyptus;* eugenol (e.g., 2-methoxy-4-allyl phenol); evening primrose; fenchol; fennel; Ferniol™; fish; florazon (e.g., 4-ethyl-.alpha., .alpha.-dimethyl-benzenepropanal); galaxolide; geraniol (e.g., 2-trans-3,7-dimethyl-2,6-octadien-8-ol); geraniol; geranium; geranyl acetate; geranyl nitrile; ginger; grapefruit; guaiacol; guaiacwood; gurjun balsam; heliotropin; herbanate (e.g., 3-(1-methyl-ethyl) bicyclo(2,2,1) hept-5-ene-2-carboxylic acid ethyl ester); hiba; hydroxycitronellal; i-carvone; i-methyl acetate; ionone; isobutyl quinoleine (e.g., 6-secondary butyl quinoline); isobornyl acetate; isobornyl methylether; isoeugenol; isolongifolene; jasmine; jojoba; juniper berry; lavender; lavandin; lemon grass; lemon; lime; limonene; linallol oxide; linallol; linalyl acetate; linseed; *litsea cubeba*; l-methyl acetate; longifolene; mandarin; *mentha*; menthane hydroperoxide; menthol crystals; menthol laevo (e.g., 5-methyl-2-isopropyl cyclohexanol); menthol; menthone laevo (e.g., 4-isopropyl-1-methyl cyclohexan-3-one); methyl anthranilate; methyl cedryl ketone; methyl chavicol; methyl hexyl ether; methyl ionone; mineral; mint; musk ambrette; musk ketone; musk xylol; mustard (also known as allylisothio-cyanate); myrcene; nerol; neryl acetate; nonyl aldehyde; nutmeg (e.g., *myristica fragrans*); orange (e.g., citrus aurantium *dulcis*); orris (e.g., iris florentina) root; para-cymene; para-hydroxy phenyl butanone crystals (e.g., 4-(4-hydroxphenyl)-2-butanone); passion palmarosa oil (e.g., *cymbopogon martini*); patchouli (e.g., pogostemon cablin); p-cymene; pennyroyal oil; pepper; peppermint (e.g., *Mentha piperita*); perillaldehyde; petitgrain (e.g., citrus aurantium *amara*); phenyl ethyl alcohol; phenyl ethyl propionate; phenyl ethyl-2-methylbutyrate; pimento berry; pimento leaf; pinane hydroperoxide; pinanol; pine ester; pine needle; pine; pinene; piperonal; piperonyl acetate; piperonyl alcohol; plinol; plinyl acetate; pseudo ionone; rhodinol; rhodinyl acetate; rosalin; rose; rosemary (e.g., *Rosmarinus officinalis*); ryu; sage; sandalwood (e.g., *santalum album*); sandenol; *sassafras*; sesame; soybean; spearmint; spice; spike lavender; spirantol; starflower; tangerine; tea seed; tea tree; terpenoid; terpineol; terpinolene; terpinyl acetate; tert-butylcyclohexyl acetate; tetrahydrolinalool; tetrahydrolinalyl acetate; tetrahydromyrcenol; thulasi; thyme; thymol; tomato; trans-2-hexenol; trans-anethole and metabolites thereof; turmeric; turpentine; vanillin (e.g., 4-hydroxy-3-methoxy benzaldehyde); vetiver; vitalizair; white cedar; white grapefruit; wintergreen (methyl salicylate) oils, and the like.

In some embodiments, the effective dose of a pesticidal natural oil when used in combination with the one or more C6-C10 saturated or unsaturated aliphatic acid or in further embodiments, with one or more C11 or C12 saturated or unsaturated aliphatic acid (or agriculturally acceptable salt thereof), is lower than the effective dose of the pesticidal natural oil when used alone (i.e. a smaller amount of pesticidal natural oil can still control pests when used in a composition together with one or more C6-C10 saturated or unsaturated aliphatic acid). In some embodiments, an essential oil that is not effective against a particular species of pest can be made effective against that particular species when used in a composition together with one or more C6-C10 saturated or unsaturated aliphatic acid.

In some embodiments, the at least one C6-C10 saturated or unsaturated aliphatic acid, or in further embodiments, with one or more C11 or C12 saturated or unsaturated aliphatic acid, may comprise a naturally occurring aliphatic acid, such as may be present in, or extracted, fractionated or derived from a natural plant or animal material, for example. In one such embodiment, the at least one C6-C10 saturated or unsaturated aliphatic acid may comprise one or more naturally occurring aliphatic acids provided in a plant extract or fraction thereof. In another such embodiment, the at least one C6-C10 saturated or unsaturated aliphatic acid may comprise one or more naturally occurring aliphatic acids provided in an animal extract or product, or fraction thereof. In one such embodiment, the at least one C6-C10 saturated or unsaturated alphatic acid may comprise a naturally occurring aliphatic acid comprised in a plant oil extract, such as one or more of coconut oil, palm oil, palm kernel oil, corn oil, or fractions or extracts therefrom. In another such embodiment, the at least one C6-C10 saturated or unsaturated alphatic acid may comprise a naturally occurring aliphatic acid comprised in an animal extract or product, such as one or more of cow's milk, goat's milk, beef tallow, and/or cow or goat butter, or fractions or extracts thereof for example. In a particular embodiment, at least one C6-C10 saturated or unsaturated aliphatic acid may be provided as a component of one or more natural plant or animal material, or extract or fraction thereof. In a particular such embodiment, at least one C6-C10 saturated aliphatic acid may be provided in an extract or fraction of one or more plant oil extract, such as one or more of coconut oil, palm oil, palm kernel oil, corn oil, or fractions or extracts therefrom.

In some embodiments, an emulsifier or other surfactant may used in preparing pesticidal compositions according to aspects of the present disclosure. Suitable surfactants can be selected by one skilled in the art. Examples of surfactants that can be used in some embodiments of the present disclosure include, but are not limited to sodium lauryl sulfate, saponin, ethoxylated alcohols, ethoxylated fatty esters, alkoxylated glycols, ethoxylated fatty acids, ethoxylated castor oil, glyceryl oleates, carboxylated alcohols, carboxylic acids, ethoxylated alkylphenols, fatty esters, sodium dodecylsulfide, other natural or synthetic surfactants, and combinations thereof. In some embodiments, the surfactant(s) are non-ionic surfactants. In some embodiments, the surfactant(s) are cationic or anionic surfactants. In some embodiments, a surfactant may comprise two or more surface active agents used in combination. The selection of an appropriate surfactant depends upon the relevant applications and conditions of use, and selection of appropriate surfactants are known to those skilled in the art.

In one aspect, a pesticidal composition according to some embodiments of the present disclosure comprises one or more suitable carrier or diluent component. A suitable carrier or diluent component can be selected by one skilled in the art, depending on the particular application desired and the conditions of use of the composition. Commonly used carriers and diluents may include ethanol, isopropanol, isopropyl myristate, other alcohols, water and other inert carriers, such as but not limited to those listed by the EPA as a Minimal Risk Inert Pesticide Ingredients (4A) (the list of ingredients published dated December 2015 by the US EPA FIFRA 4a list published August 2004 entitled "List 4A—Minimal Risk Inert Ingredients") or, for example, Inert Pesticide Ingredients (4B) (the US EPA FIFRA 4b list published August 2004 entitled "List 4B—Other ingredients for which EPA has sufficient information") or under EPA regulation 40 CFR 180.950 dated May 24, 2002, each of which is hereby incorporated herein in its entirety for all purposes including for example, citric acid, lactic acid, glycerol, castor oil, benzoic acid, carbonic acid, ethoxylated alcohols, ethoxylated amides, glycerides, benzene, butanol, 1-propanol, hexanol, other alcohols, dimethyl ether, and polyethylene glycol.

In one embodiment according to the present disclosure, a method of enhancing the efficacy of a pesticide is provided. In one aspect, a method of enhancing the efficacy of a fungicide is provided. In another aspect, a method of enhancing the efficacy of a nematicide is provided. In a further aspect, a method of enhancing the efficacy of an insecticide is provided.

In one such embodiment, the method comprises providing a synergistic pesticidal composition comprising a pesticidal active ingredient and at least one C6-C10 saturated or unsaturated aliphatic acid (or in further embodiments, with one or more C11 or C12 saturated or unsaturated aliphatic acid) and exposing a pest to the resulting synergistic composition. In a particular exemplary embodiment, without being bound by any particular theory, the at least one C6-C10 saturated or unsaturated aliphatic acid may desirably be functional as a cell permeabilizing or cell membrane disturbing agent. In one aspect, the method comprises providing a fungicidal composition comprising a fungicidal active ingredient and at least one C6-C10 saturated or unsaturated aliphatic acid and exposing a fungus to the resulting synergistic composition. In another aspect, the method comprises providing a nematicidal composition comprising a nematicidal active ingredient and at least one C6-C10 saturated or unsaturated aliphatic acid and exposing a nematode to the resulting synergistic composition. In a further aspect, the method comprises providing an insecticidal composition comprising an insecticidal active ingredient and at least one C6-C10 saturated or unsaturated aliphatic acid and exposing an insect to the resulting synergistic composition.

In one embodiment according to the present disclosure, the at least one C6-C10 saturated or unsaturated aliphatic acid (or in further embodiments, with one or more C11 or C12 saturated or unsaturated aliphatic acid) provided in a pesticidal composition comprises an unsaturated aliphatic carbonyl alkene. In a particular such embodiment, without being bound by any particular theory, the at least one C6-C10 unsaturated aliphatic acid may desirably be functional as a cell permeabilizing or cell membrane disturbing agent. In one such embodiment, the cell permeabilizing agent comprises a carbonyl alkene having the general structure (1), (2) or (3), as shown in FIG. 1. In a further embodiment, the cell permeabilizing agent comprises at least one saturated or unsaturated aliphatic acid comprising at least one carboxylic group and having at least one unsaturated C—C bond.

In one exemplary embodiment, a method comprises providing a synergistic pesticidal composition comprising a pesticidal active ingredient and at least one C6-C10 saturated or unsaturated aliphatic acid (or in further embodiments, with one or more C11 or C12 saturated or unsaturated aliphatic acid) which is functional as a cell permeabilizing agent, and exposing a pest to the synergistic pesticidal composition to increase the amount of the pesticidal active ingredient that enters cells of the pest. In some such embodiments, the pesticidal active is a fungicide and the pest is a fungus, and without being bound by a particular theory, the at least one C6-C10 saturated or unsaturated aliphatic acid cell permeabilizing agent allows the fungicide to pass more easily through the fungal cell walls and membranes and/or intracellular membranes. In some such embodiments, the pesticide is a nematicide and the pest is a nematode, and without being bound by a particular theory, the at least one C6-C10 saturated or unsaturated aliphatic acid cell permeabilizing agent allows the nematicide to pass more easily through the nematode cell and intracellular membranes. In some such embodiments, the pesticide is an insecticide, and without being bound by a particular theory, the at least one C6-C10 saturated or unsaturated aliphatic acid cell permeabilizing agent allows the insecticide to pass more easily through insect cuticle, chitin membrane, or cell or intracellular membranes.

In some embodiments, in addition to the actual synergistic action with respect to pesticidal activity, certain synergistic pesticidal compositions according to embodiments of the present disclosure can also desirably have further surprising advantageous properties. Examples of such additional advantageous properties may comprise one or more of: more advantageous degradability in the environment; improved toxicological and/or ecotoxicological behaviour such as reduced aquatic toxicity or toxicity to beneficial insects, for example.

In a further aspect, for any of the embodiments described above or below providing for a synergistic pesticidal composition comprising at least one pesticidal active and one or more C6-C10 saturated or unsaturated aliphatic acid or salt thereof, in an alternative embodiment, the synergistic pesticidal composition may alternatively comprise at least one pesticidal active and one or more C11 saturated or unsaturated aliphatic acid or salt thereof. In another aspect, for any of the embodiments described above providing for a synergistic pesticidal composition comprising at least one pesticidal active and one or more C6-C10 saturated or unsaturated aliphatic acid or salt thereof, in an alternative embodiment, the synergistic pesticidal composition may alternatively comprise at least one pesticidal active and one or more C12 saturated or unsaturated aliphatic acid or salt thereof.

Experimental Methods

In accordance with an embodiment of the present disclosure, the combination of at least one C6-C10 saturated or unsaturated aliphatic acid (and in some embodiments also at least one C11 or C12 saturated or unsaturated aliphatic acid) and a pesticidal active ingredient produces a synergistic pesticidal composition demonstrating a synergistic pesticidal effect. In some embodiments, the synergistic action between the pesticidal active ingredient, and the at least one C6-C10 (or alternatively C11 or C12) saturated or unsaturated aliphatic acid components of the pesticidal compositions according to embodiments of the present disclosure was tested using a Synergistic Growth Inhibition Assay, which is derived from and related to a checkerboard assay as is known in the art for testing of combinations of antimicrobial agents. In the Synergistic Growth Inhibition Assay used in accordance with some embodiments of the present disclosure, multiple dilutions of combinations of pesticidal active ingredient and at least one C6-C10 saturated or unsaturated aliphatic acid agents are tested in individual cells for inhibitory activity against a target pest or pathogenic organism. In one such embodiment, the combinations of pesticidal active ingredient and C6-C10 (or alternatively C11 or C12) saturated or unsaturated aliphatic acid agents may preferably be tested in decreasing concentrations. In a further such embodiment, the combinations of pesticidal active ingredient and C6-C10 (or alternatively C11 or C12) saturated or unsaturated aliphatic acid agents may be tested in increasing concentrations. These multiple combinations of the pesticidal active ingredient and at least one C6-C10 (or alternatively C11 or C12) saturated or unsaturated aliphatic acid agents may be prepared in 96-well microtiter plates. In one such embodiment, the Synergistic Growth Inhibition Assay then comprises rows which each contain progressively decreasing concentrations of the pesticidal active ingredient and one or more C6-C10 (or alternatively C11 or C12) saturated or unsaturated aliphatic acid agents to test for the MIC of the agents in combination at which growth of the target pest or pathogen is inhibited. Thus, each well of the microtiter plate is a unique combination of the two agents, at which inhibitory efficacy of the combination against the target pest or pathogen can be determined.

A method of determining and quantifying synergistic efficacy is by calculation of the "Fractional Inhibitory Concentration Index" or FIC index, as is known in the art for determining synergy between two antibiotic agents (see for example M. J. Hall et al., "The fractional inhibitory concentration (FIC) index as a measure of synergy", J Antimicrob Chem., 11 (5):427-433, 1983, for example). In one embodiment according to the present disclosure, for each row of microtiter cells in the Synergistic Growth Inhibition Assay, the FIC index is calculated from the lowest concentration of the pesticidal active ingredient and one or more C6-C10 saturated or unsaturated aliphatic acid agents necessary to inhibit growth of a target pest or pathogen. The FIC of each component is derived by dividing the concentration of the agent present in that well of the microtiter plate by the minimal inhibitory concentration (MIC) needed of that agent alone to inhibit growth of the target pest or pathogen. The FIC index is then the sum of these values for both agents in that well of the microtiter plate. The FIC index is calculated for each row as follows:

$$FIC_{index} = MIC_a/MIC_A + MIC_b/MIC_B$$

where $MIC_a$, $MIC_b$ are the minimal inhibitory concentration (MIC) of compounds A and B, respectively, when combined in the mixture of the composition, and $MIC_A$, $MIC_B$ are the MIC of compounds A and B, respectively, when used alone. Fractional inhibitory concentration indices may then used as measure of synergy. When the lowest FIC index obtained in a microtiter plate in this way is less than 1 ($FIC_{index} < 1$), the combination of the pesticidal active ingredient and one or more C6-C10 (or alternatively C11 or C12) saturated or unsaturated aliphatic acid agents exhibits synergism, and indicates a synergistic pesticidal composition. When the FIC index is equal to 1, the combination is additive. FIC index values of greater than 4 are considered to exhibit antagonism.

In a particular embodiment, when the FIC index is equal or less than 0.5, the combination of the pesticidal active ingredient and one or more C6-C10 (or alternatively C11 or C12) saturated or unsaturated aliphatic acid agents exhibits strong synergism. For example, in one embodiment, an FIC index of 0.5 may correspond to a synergistic pesticidal composition comprising a pesticidal agent at ¼ of its individual MIC, and one or more (or alternatively C11 or C12) C6-C10 saturated or unsaturated aliphatic acid agent at ¼ of its individual MIC.

In some embodiments of the present disclosure, the exemplary Synergistic Growth Inhibition Assay was conducted starting with an initial composition comprising a pesticidal active ingredient agent (compound A) at its individual MIC and one or more C6-C10 (or alternatively C11 or C12) saturated or unsaturated aliphatic acid agent (compound B) at its individual MIC in the first well of a row on a 96 well microtiter plate. Then, serial dilutions of these initial compositions in successive wells in the row of the microtiter plate were used to assay the pesticidal composition under the same conditions to determine the concentration of the composition combining the two agents corresponding to the microtiter well in which growth inhibition of the target pest or organism ceases. The minimal inhibitory concentrations of each individual pesticidal active ingredient agent (compound A) and each of the one or more C6-C10 saturated or unsaturated aliphatic acid agent (as compound B) were determined in parallel with the compositions combining the two agents.

In some embodiments, *Fusarium oxysporum* was used as a representative pest organism or pathogen to determine synergy in pesticidal compositions comprising a pesticidal active ingredient agent (compound A) and one or more C6-C10 (or alternatively C11 or C12) saturated or unsaturated aliphatic acid agent (compound B). Resazurin dye (also known as Alamar blue dye) was used as an indicator to determine the presence of growth or inhibition of growth of *Fusarium oxysporum* in the wells of the 96 well microtiter plates used in the exemplary Synergistic Growth Inhibition Assay. In addition to the color change of the resazurin dye in the presence of growth of the *Fusarium oxysporum*, an optical or visual examination of the microtiter well may also be made to additionally determine the presence of growth or inhibition of growth of the *Fusarium oxysporum*.

In other embodiments, *Botrytis cinerea* was used as a representative pest organism or pathogen to determine synergy in pesticidal compositions comprising a pesticidal active ingredient (compound A) and one or more C6-C10 (or alternatively C11 or C12) saturated or unsaturated aliphatic acid agent (compound B). Similarly to as described above, Resazurin was used as an indicator of growth or inhibition of growth of *Botrytis cinerea* in the exemplary Synergistic Growth Inhibition Assay. In addition to the color change of the resazurin, an optical or visual examination of the microtiter well may also be made to additionally determine the presence of growth or inhibition of growth of the *Botrytis cinerea*.

In further embodiments, *Sclerotinia sclerotiorum* was used as a representative pest organism or pathogen to determine synergy in pesticidal compositions comprising a pesticidal active ingredient (compound A) and one or more C6-C10 (or alternatively C11 or C12) saturated or unsaturated aliphatic acid agent (compound B). Similarly to as described above, Resazurin was used as an indicator of growth or inhibition of growth of *Sclerotinia sclerotiorum* in the exemplary Synergistic Growth Inhibition Assay. In addition to the color change of the resazurin, an optical or visual examination of the microtiter well may also be made to additionally determine the presence of growth or inhibition of growth of the *Sclerotinia sclerotiorum*.

Alternatively, other suitable representative pest or pathogen organisms may be used to determine synergy of combinations of pesticidal active ingredient agents and one or more C6-C10 (or alternatively C11 or C12) saturated or unsaturated aliphatic acid agents in accordance with embodiments of the present disclosure. For example, other representative fungal pathogens may be used, such as but not limited to *Leptosphaeria maculans, Sclerotinia* spp. and *Verticillium* spp. In yet other examples, suitable non-fungal representative pests or pathogens may be used, such as insect, acari, nematode, bacterial, viral, mollusc or other pests or pathogens suitable for use in an MIC growth inhibition assay test method.

All examples detailed below were tested according to the exemplary Synergistic Growth Inhibition Assay described above, using routine techniques for MIC determination known to those of skill in the art. Stock solutions of the pesticidal active ingredient agents and the one or more C6-C10 (or alternatively C11 or C12) saturated or unsaturated aliphatic acid agents were initially prepared in 100% dimethylsulfoxide ("DMSO"), and diluted to 10% DMSO using sterile potato dextrose broth (PDB) before further serial dilution to obtain the test solution concentrations for use in the microtiter plate wells, with exceptions in particular experimental examples noted in detail below. Accordingly, the maximum concentration of DMSO in the test solutions was limited to 10% DMSO or less, which was separately determined to be non-inhibitory to the growth of the representative fungal pests used in the test.

Figure 2:
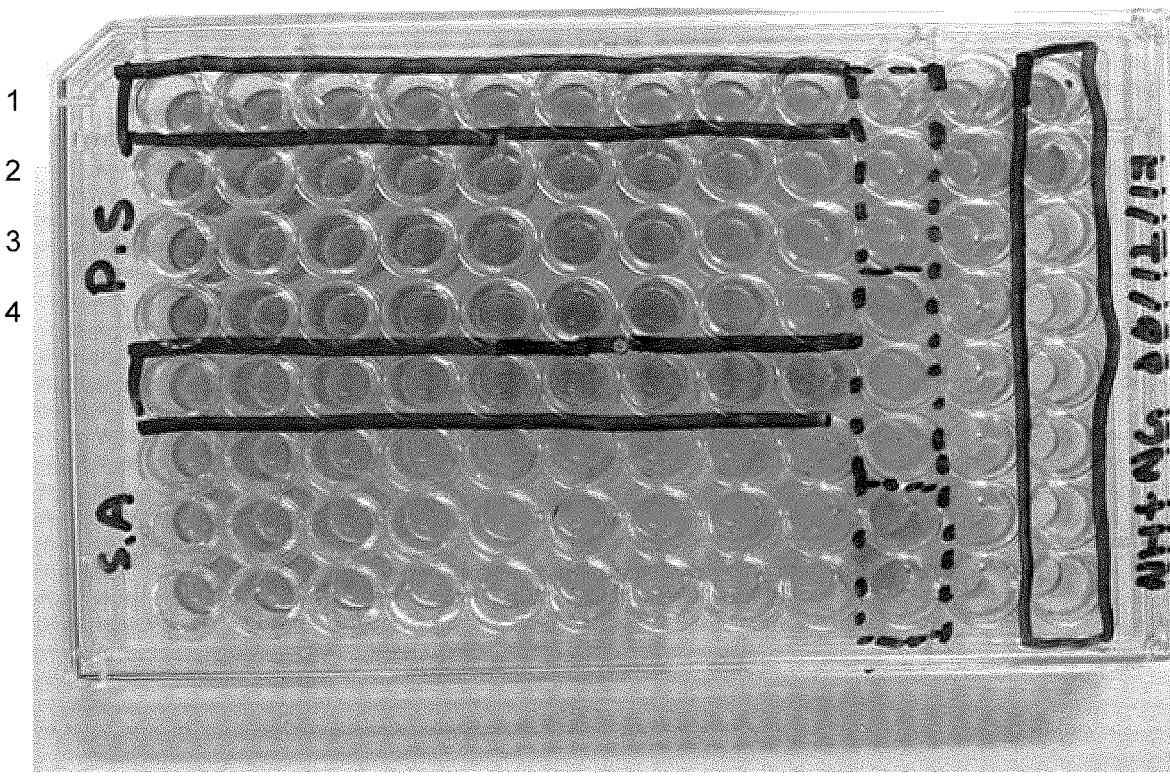
FIG. 2 illustrates an exemplary 96 well microtiter plate showing a color transition of a resazurin dye between colors indicating absence and presence of growth of a representative pest or pathogen, in accordance with a synergistic growth inhibition assay according to an embodiment of the present disclosure.

A culture of the representative fungal pathogen, namely *Fusarium oxysporum, Botrytis cinerea,* or *Sclerotinia sclerotiorum*, for example, is grown to exponential phase in potato dextrose broth (PDB). A 20 uL aliquot of homogenized mycelium from the culture is transferred to a well of a 96 well microtiter plate, and incubated for a period between 1 day and 7 days (depending on the pathogen and the particular assay reagents, as noted in the example descriptions below) with 180 uL of the test solution comprising the pesticidal and aliphatic acid agents in combination at a range of dilutions, to allow the mycelium to grow. Following the incubation period, 10 uL of resazurin dye is added to each well and the color in the solution is observed and compared to the color of the test solution at the same concentrations in wells without mycelial culture innoculum to control for effects of the test solution alone. The resazurin dye appears blue for wells with only the initial 20 uL culture where growth has been inhibited, and appears pink for wells where mycelial growth has occurred, as shown in FIG. 2, where the transition from blue to pink color can be clearly seen in each of the uppermost 4 rows of microtiter wells (labelled as 1-4 in FIG. 2) as the concentration of the pesticidal and one or more C6-C10 (or alternatively C11 or C12) saturated or unsaturated aliphatic acid agents in the test solution decreases from left to right. In addition to the color change of the resazurin dye, growth or absence of growth of the mycelial culture is also observed visually or optically.

In accordance with this assay method, the Minimum Inhibitory Concentration is the lowest concentration at which growth is inhibited, and corresponds to the microtiter well in which the dye color is the same as for the control without culture and without growth, and/or in which a visual and/or optical inspection confirm that growth is inhibited.

EXAMPLES

Example 1: Growth Inhibition of *Fusarium oxysporum* by Pyraclostrobin in Combination with Several Exemplary C6-C10 Unsaturated Aliphatic Acids (or Agriculturally Acceptable Salts Thereof)

Sample Preparation:

10 mg of pyraclostrobin (available from Santa Cruz Biotechnology of Dallas, TX as stock #229020) was dissolved in 10 mL dimethylsulfoxide (DMSO) and the resulting solution was diluted 2-fold in DMSO to give a concentration of 0.5 mg/mL. This solution was diluted 10-fold in potato dextrose broth (PDB) to give a concentration of 0.05 mg/mL in 10% DMSO/90% PDB. The solubility of pyraclostrobin in 10% DMSO/90% PDB was determined to be 0.0154 mg/mL using high performance liquid chromatography (HPLC).

A solution of (2E,4E)-2,4-hexadienoic acid, potassium salt, was prepared by dissolving 2 g of (2E,4E)-2,4-hexadienoic acid, potassium salt, in 20 mL of PDB which was diluted further by serial dilution in PDB. A solution of (2E,4E)-2,4-hexadienoic acid (available from Sigma-Aldrich as stock #W342904) was prepared by dissolving 20 mg of (2E,4E)-2,4-hexadienoic acid in 1 mL DMSO and adding 0.1 mL to 0.9 mL PDB resulting in a 2 mg/mL solution of (2E,4E)-2,4-hexadienoic acid in 10% DMSO/90% PDB which was diluted further by serial dilution in PDB.

A solution of trans-2-hexenoic acid (available from Sigma-Aldrich as stock #W316903) was prepared by dissolving 100 mg trans-2-hexenoic acid in 1 mL DMSO and adding 0.1 mL to 0.9 mL PDB resulting in a 10 mg/mL solution in 10% DMSO/90% PDB which was diluted further by serial dilution in PDB. A solution of trans-3-hexenoic acid (available from Sigma-Aldrich as stock #W317004) was prepared by adding 20 uL trans-3-hexenoic acid to 1980 uL PDB and the resulting solution was serially diluted in PDB. The density of trans-3-hexenoic acid was assumed to be 0.963 g/mL.

Combinations of pyraclostrobin and one or more exemplary C6-C10 saturated or unsaturated aliphatic acids (and agriculturally acceptable salts thereof) were prepared by adding 0.5 mL of 0.0308 mg/mL pyraclostrobin to 0.5 mL of 1.25 mg/mL (2E,4E)-2,4-hexadienoic acid, potassium salt, (combination 1), 0.5 mL of 0.25 mg/mL (2E,4E)-2,4-hexadienoic acid (combination 2), 0.5 mL of 0.625 mg/mL (2E,4E)-2,4-hexadienoic acid (combination 3), 0.5 mL of 1.25 mg/mL of trans-2-hexenoic acid (combination 4), or 0.5 mL of 0.6019 mg/mL trans-3-hexenoic acid (combination 5). Each combination was tested over a range of 2-fold dilutions in the Synergistic Growth Inhibition Assay detailed above, observed following a 24 hour incubation period, and the FIC Index for each combination calculated, as shown below in Table 1.

TABLE 1

Growth inhibition of *Fusarium oxysporum* by pyraclostrobin in combination with several exemplary unsaturated aliphatic acids (or agriculturally acceptable salts thereof).

| Combination | Compound A | Compound B | MIC(A) (mg/mL) | MIC(B) (mg/mL) | Ratio Compound B/ Compound A | FIC Index |
|---|---|---|---|---|---|---|
| | Pyraclostrobin | | 0.0154 | | | |
| | | (2E,4E)-2,4-hexadienoic acid, potassium salt | | 0.625 | | |
| | | (2E,4E)-2,4-hexadienoic acid | | 0.125 | | |
| | | Trans-2-hexenoic acid | | 0.3125 | | |
| | | Trans-3-hexenoic acid | | 0.3125 | | |
| 1 | Pyraclostrobin | (2E,4E)-2,4-hexadienoic acid, potassium salt | 0.00385 | 0.1563 | 40 | 0.50 |
| 2 | Pyraclostrobin | (2E,4E)-2,4-hexadienoic acid | 0.00385 | 0.03125 | 20 | 0.50 |
| 3 | Pyraclostrobin | (2E,4E)-2,4-hexadienoic acid | 0.001925 | 0.03906 | 8 | 0.44 |
| 4 | Pyraclostrobin | Trans-2-hexenoic acid | 0.00385 | 0.1563 | 40 | 0.75 |
| 5 | Pyraclostrobin | Trans-3-hexenoic acid | 0.00385 | 0.07813 | 20 | 0.50 |

Example 2: Growth Inhibition of *Fusarium oxysporum* by Fludioxonil in Combination with Several Exemplary Unsaturated Aliphatic Acids (or Agriculturally Acceptable Salts Thereof)

Sample Preparation:

20 mg of fludioxonil (available from Shanghai Terppon Chemical Co. Ltd., of Shanghai, China) was dissolved in 10 mL dimethylsulfoxide (DMSO) and the resulting solution was diluted 2-fold in DMSO to give a concentration of 1 mg/mL. This solution was diluted 10-fold in potato dextrose broth (PDB) to give a concentration of 0.1 mg/mL in 10% DMSO/90% PDB. The solubility of fludioxonil in 10% DMSO/90% PDB was determined to be 0.0154 mg/mL using HPLC.

A solution of (2E,4E)-2,4-hexadienoic acid, potassium salt, was prepared by dissolving 2 g of (2E,4E)-2,4-hexadienoic acid, potassium salt, in 20 mL of PDB which was diluted further by serial dilution in PDB. A solution of (2E,4E)-2,4-hexadienoic acid (available from Sigma-Aldrich as #W342904) was prepared by dissolving 20 mg of (2E,4E)-2,4-hexadienoic acid in 1 mL DMSO and adding 0.1 mL to 0.9 mL PDB resulting in a 2 mg/mL solution of (2E,4E)-2,4-hexadienoic acid in 10% DMSO/90% PDB which was diluted further by serial dilution in PDB.

A solution of trans-2-hexenoic acid (available from Sigma-Aldrich as stock #W316903) was prepared by dissolving 100 mg trans-2-hexenoic acid in 1 mL DMSO and adding 0.1 mL to 0.9 mL PDB resulting in a 10 mg/mL solution in 10% DMSO/90% PDB which was diluted further by serial dilution in PDB. A solution of trans-3-hexenoic acid (available from Sigma-Aldrich as stock #W317004) was prepared by adding 20 uL trans-3-hexenoic acid to 1980 uL PDB and the resulting solution was serially diluted in PDB. The density of trans-3-hexenoic acid was assumed to be 0.963 g/mL.

Combinations of compounds A and B as shown below in Table 2 were prepared by adding 0.5 mL of 9.63×10−4 mg/mL fludioxonil to each of 0.5 mL of 0.625 mg/mL (2E,4E)-2,4-hexadienoic acid, potassium salt, (combination 1), 0.5 mL of 0.25 mg/mL (2E,4E)-2,4-hexadienoic acid (combination 2), 0.5 mL of 0.625 mg/mL of trans-2-hexenoic acid (combination 3), and 0.5 mL of 0.6019 mg/mL trans-3-hexenoic acid (combination 4). Each combination was tested over a range of 2-fold dilutions in the synergistic growth inhibition assay, observed following a 24 hour incubation period, and the FIC Index for each combination calculated, as shown below in Table 2.

dilution in PDB, for each of 3-octenoic acid (available from Sigma-Aldrich as stock #CDS000466), trans-2-octenoic acid (available from Sigma-Aldrich), 9-decenoic acid (available from Sigma-Aldrich as #W366005), 3-decenoic acid (available from Sigma-Aldrich as stock #CDS000299), and trans-2-decenoic acid (available from TCI America as stock #D0098).

For testing in combination with fludioxonil, solutions of 3-octenoic acid, trans-2-octenoic acid, and 9-decenoic acid were prepared at 0.78 uL/mL in DMSO by adding 3.125 uL of each Compound B to 2 mL of DMSO, followed by 2-fold dilution in DMSO to give 0.78 uL/mL. Solutions of 3-decenoic acid and trans-2-decenoic acid were prepared similarly, but applying a further 2-fold dilution in DMSO to give a concentration of 0.39 uL/mL in DMSO.

Each of these resulting stock solutions were then diluted 10-fold in PDB to give solutions of 0.078 uL/mL for each of 3-octenoic acid, trans-2-octenoic acid, and 9-decenoic acid, and to give solutions of 0.039 uL/mL for each of 3-decenoic acid and trans-2-decenoic acid, all in 10% DMSO/90% PDB.

TABLE 2

Growth inhibition of *Fusarium oxysporum* by fludioxonil in combination with several exemplary unsaturated aliphatic acids (or agriculturally acceptable salts thereof).

| Combination | Compound A | Compound B | MIC (A) (mg/mL) | MIC (B) (mg/mL) | Ratio Compound B/ Compound A | FIC Index |
|---|---|---|---|---|---|---|
| | Fludioxonil | | $4.8125 \times 10^{-4}$ | | | |
| | | (2E,4E)-2,4-hexadienoic acid, potassium salt | | 0.625 | | |
| | | (2E,4E)-2,4-hexadienoic acid | | 0.125 | | |
| | | Trans-2-hexenoic acid | | 0.3125 | | |
| | | Trans-3-hexenoic acid | | 0.3125 | | |
| 1 | Fludioxonil | (2E,4E)-2,4-hexadienoic acid, potassium salt | $6.0188 \times 10^{-5}$ | 0.03906 | 649 | 0.19 |
| 2 | Fludioxonil | (2E,4E)-2,4-hexadienoic acid | $6.0188 \times 10^{-5}$ | 0.01563 | 260 | 0.25 |
| 3 | Fludioxonil | Trans-2-hexenoic acid | $1.2038 \times 10^{-4}$ | 0.07813 | 649 | 0.5 |
| 4 | Fludioxonil | Trans-3-hexenoic acid | $1.2038 \times 10^{-4}$ | 0.07813 | 649 | 0.5 |

Example 3: Growth Inhibition of *Fusarium oxysporum* by Fludioxonil in Combination with Several Exemplary Unsaturated Aliphatic Acids Sample Preparation:

20 mg fludioxonil (available from Shanghai Terppon Chemical Co. Ltd., of Shanghai, China) was dissolved in 10 mL dimethylsulfoxide (DMSO) and the resulting solution was diluted 2-fold in DMSO to give a concentration of 1 mg/mL. This solution was diluted 10-fold in potato dextrose broth (PDB) to give a concentration of 0.1 mg/mL in 10% DMSO/90% PDB. The solubility of fludioxonil in 10% DMSO/90% PDB was determined to be 0.0154 mg/mL using HPLC.

Stock solutions of several exemplary C6-C10 unsaturated aliphatic acids as Compound B for testing individual MICs were prepared at 25 uL/mL in DMSO by adding 25 uL of each Compound B to 975 uL DMSO, followed by 10-fold Combinations of the exemplary Compound B components with fludioxonil were prepared by adding 0.5 mL of 0.078 uL/mL of each of 3-octenoic acid, trans-2-octenoic acid, and 9-decenoic acid or 0.039 uL/mL of each of 3-decenoic acid and trans-2-decenoic acid, to 0.5 mL of $4.813 \times 10^{-4}$ mg/mL fludioxonil obtained from serial dilution of 0.0154 mg/mL of fludioxonil in 10% DMSO/90% PDB, as prepared above, with PDB. The density of 3-octenoic acid was assumed to be 0.938 g/mL. The density of trans-2-octenoic acid was assumed to be 0.955 g/mL. The density of 3-decenoic acid was assumed to be 0.939 g/mL. The density of trans-2-decenoic acid was assumed to be 0.928 g/mL. The density of 9-decenoic acid was assumed to be 0.918 g/mL.

Each combination was tested over a range of 2-fold dilutions in the synergistic growth inhibition assay, observed following a 24 hour incubation period, and the FIC Index for each combination calculated, as shown below in Table 3.

TABLE 3

Growth inhibition of *Fusarium oxysporum* by fludioxonil in combination with several exemplary unsaturated aliphatic acids.

| Combination | Compound A | Compound B | MIC (A) (mg/mL) | MIC(B) (mg/mL) | Ratio Compound B/ Compound A | FIC Index |
|---|---|---|---|---|---|---|
| | Fludioxonil | | $2.4063 \times 10^{-4}$ | | | |
| | | 3-Octenoic acid | | 0.1466 | | |
| | | Trans-2-octenoic acid | | 0.1492 | | |
| | | 3-Decenoic acid | | 0.07336 | | |
| | | Trans-2-decenoic acid | | 0.03625 | | |
| | | 9-Decenoic acid | | 0.07172 | | |
| 1 | Fludioxonil | 3-Octenoic acid | $1.2031 \times 10^{-4}$ | 0.01832 | 152 | 0.63 |
| 2 | Fludioxonil | Trans-2-octenoic acid | $1.2031 \times 10^{-4}$ | 0.01865 | 155 | 0.63 |
| 3 | Fludioxonil | 3-Decenoic acid | $1.2031 \times 10^{-4}$ | 0.00917 | 76 | 0.63 |
| 4 | Fludioxonil | Trans-2-decenoic acid | $1.2031 \times 10^{-4}$ | 0.00906 | 75 | 0.75 |
| 5 | Fludioxonil | 9-Decenoic acid | $1.2031 \times 10^{-4}$ | 0.01793 | 149 | 0.75 |

Example 4: Growth Inhibition of *Fusarium oxysporum* by Thyme Oil in Combination in Combination with Several Exemplary Unsaturated Aliphatic Acids Sample Preparation:

12.5 mg of thyme oil (available from Sigma-Aldrich as stock #W306509) was dissolved in 1 g dimethylsulfoxide (DMSO) and the resulting solution was diluted 10-fold in PDB to give a concentration of 1.25 mg/mL 10% DMSO/90% PDB.

Stock solutions of several exemplary C6-C10 unsaturated aliphatic acids as Compound B for testing individual MICs were prepared at 25 μL/mL by adding 25 μL of each of 3-octenoic acid (available from Sigma-Aldrich as stock #CDS000466), trans-2-octenoic acid (available from Sigma-Aldrich as stock #CDS000466), 9-decenoic acid (available from Sigma-Aldrich as stock #W366005), 3-decenoic acid (available from Sigma-Aldrich as stock #CDS000299), and trans-2-decenoic acid (available from TCI America as stock #D0098), to 975 μL DMSO followed by 10-fold dilution in PDB.

Stock solutions of the exemplary C6-C10 unsaturated aliphatic acids as Compound B for testing in combination with thyme oil were prepared by adding 3.125 μL of each of 3-octenoic acid, trans-2-octenoic acid, and 9-decenoic acid, to 2 mL of DMSO followed by 2-fold dilution in DMSO to give a 0.78 μL/mL concentration stock solution. Solutions of 3-decenoic acid and trans-2-decenoic acid were prepared similarly, but applying a further 2-fold dilution in DMSO to give a concentration of 0.39 μL/mL.

Each of these resulting stock solutions were then diluted 10-fold dilution in PDB to give solutions of 0.078 μL/mL (for each of 3-octenoic acid, trans-2-octenoic acid, and 9-decenoic acid) and 0.039 μL/mL (for 3-decenoic acid and trans-2-decenoic acid) in 10% DMSO/90% PDB.

Combinations of the exemplary Compound B components with thyme oil were prepared by adding 0.5 mL of 0.078 μL/mL of each of 3-octenoic acid, trans-2-octenoic acid, and 9-decenoic acid or 0.039 μL/mL of each of 3-decenoic acid and trans-2-decenoic acid, to 0.5 mL of 1.25 mg/mL thyme oil in 10% DMSO/90% PDB. The density of 3-octenoic acid was assumed to be 0.938 g/mL. The density of trans-2-octenoic acid was assumed to be 0.955 g/mL. The density of 3-decenoic acid was assumed to be 0.939 g/mL. The density of trans-2-decenoic acid was assumed to be 0.928 g/mL. The density of 9-decenoic acid was assumed to be 0.918 g/mL.

Each combination was tested over a range of 2-fold dilutions in the synergistic growth inhibition assay, observed following a 24 hour incubation period, and the FIC Index for each combination calculated, as shown below in Table 4.

TABLE 4

Growth inhibition of *Fusarium oxysporum* by thyme oil in combination in combination with several exemplary unsaturated aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | Thyme oil | | 1.25 | | | |
| | | 3-Octenoic acid | | 0.14656 | | |
| | | Trans-2-octenoic acid | | 0.14922 | | |
| | | 3-Decenoic acid | | 0.07336 | | |
| | | Trans-2-decenoic acid | | 0.03625 | | |
| | | 9-Decenoic acid | | 0.07172 | | |
| 1 | Thyme oil | 3-Octenoic acid | 0.3125 | 0.01832 | 0.059 | 0.38 |
| 2 | Thyme oil | Trans-2-octenoic acid | 0.3125 | 0.01865 | 0.060 | 0.38 |
| 3 | Thyme oil | 3-Decenoic acid | 0.3125 | 0.00917 | 0.029 | 0.38 |
| 4 | Thyme oil | Trans-2-decenoic acid | 0.3125 | 0.00906 | 0.029 | 0.50 |
| 5 | Thyme oil | 9-Decenoic acid | 0.3125 | 0.01793 | 0.057 | 0.50 |

Example 5: Growth Inhibition of *Botrytis cinerea* by Neem Oil Limonoid Extract (Extracted from Cold-Pressed Neem Oil) and Fortune Aza Technical (Azadirachtin Extract) in Combination with Various Exemplary Unsaturated Aliphatic Acids Sample Preparation:

An extract of limonoids was prepared from cold-pressed neem oil using solvent extraction with hexane and methanol to prepare a neem oil limonoid extract. Fortune Aza Technical pesticide containing 14% azadirachtin (extracted from neem seed/kernel source) was obtained from Fortune Biotech Ltd. of Secunderabad, India.

Solutions of neem oil limonoid extract and Fortune Aza Technical were prepared at 5 mg/mL in DMSO followed by ten-fold dilution in PDB to give a concentration of 0.5 mg/mL in 10% DMSO/90% PDB. Stock solutions of 3-octenoic acid and trans-2-octenoic acid as Compound B for testing of individual MICs were prepared at 25 µL/mL by adding 25 µL of each Compound B to 975 µL DMSO followed by 10-fold dilution in PDB.

For testing in combination with neem oil limonoid extract and Fortune Aza Technical, stock solutions of 3-octenoic acid and trans-2-octenoic acid were prepared at 6.25 µL/mL by adding 62.5 µL of the respective compound to 937.5 µL of DMSO followed by 10-fold dilution in PDB (ratio 11.7). Stock solutions of 3-octenoic acid and trans-2-octenoic acid were prepared at 3.125 µL/mL for testing in combination by adding 31.25 µL of the respective compound to 968.75 µL of DMSO followed by 10-fold dilution in PDB (ratio 6.0 or 5.9). Stock solutions of 3-octenoic acid and trans-2-octenoic acid at 0.625 µL/mL for testing in combination were prepared by adding 6.25 µL of the respective compound to 993.75 µL of DMSO followed by 10-fold dilution in PDB (ratio 1.2). The density of 3-octenoic acid was assumed to be 0.938 g/mL. The density of trans-2-octenoic acid was assumed to be 0.955 g/mL.

Combinations were prepared by adding 0.5 mL of 6.25 µL/mL, 3.125 µL/mL, or 0.625 µL/mL 3-octenoic acid or trans-2-octenoic acid, as prepared above (as Compound B), to 0.5 mL neem oil limonoid extract or Fortune Aza Technical at 0.5 mg/mL in 10% DMSO/90% PDB (as Compound A) for testing in the synergistic growth inhibition assay. Each combination was observed following a 24 hour incubation period, and the FIC Index for each combination calculated, as shown below in Tables 5 and 6.

TABLE 5

Growth inhibition of *Botrytis cinerea* by limonoid extract from cold-pressed neem oil in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Neem oil limonoid extract | | 0.25 | | | |
| | | 3-octenoic acid | | 0.14656 | | |
| | | Trans-2-octenoic acid | | 0.07461 | | |
| 1 | Neem oil limonoid extract | 3-octenoic acid | 0.0078125 | 0.09160 | 11.7 | 0.66 |
| 2 | Neem oil limonoid extract | 3-octenoic acid | 0.015625 | 0.09160 | 5.9 | 0.69 |
| 3 | Neem oil limonoid extract | 3-octenoic acid | 0.0625 | 0.07656 | 1.2 | 0.75 |
| 4 | Neem oil limonoid extract | Trans-2-octenoic acid | 0.0078125 | 0.04663 | 6.0 | 0.66 |
| 5 | Neem oil limonoid extract | Trans-2-octenoic acid | 0.03125 | 0.03730 | 1.2 | 0.63 |

TABLE 6

Growth inhibition of *Botrytis cinerea* by Fortune Aza Technical in combination with various exemplary unsaturated aliphatic acids

| Combination | Compound A | Compound B | MIC (A) (mg/mL) | MIC(B) (mg/mL) | Ratio Compound B/ Compound A | FIC Index |
|---|---|---|---|---|---|---|
| | Fortune Aza Tech. | | 0.25 | | | |
| | | 3-octenoic acid | | 0.14656 | | |
| | | Trans-2-octenoic acid | | 0.07461 | | |
| 1 | Fortune Aza Tech. | 3-octenoic acid | 0.0078125 | 0.09160 | 11.7 | 0.66 |
| 2 | Fortune Aza Tech. | 3-octenoic acid | 0.015625 | 0.09160 | 5.9 | 0.69 |
| 3 | Fortune Aza Tech. | 3-octenoic acid | 0.0625 | 0.07656 | 1.2 | 0.75 |
| 4 | Fortune Aza Tech. | Trans-2-octenoic acid | 0.0078125 | 0.04663 | 6.0 | 0.66 |
| 5 | Fortune Aza Tech. | Trans-2-octenoic acid | 0.03125 | 0.03730 | 1.2 | 0.63 |

Example 6: Growth Inhibition of *Fusarium oxysporum* by Fludioxonil in Combination with Various Exemplary Saturated Aliphatic Acids Sample Preparation:

20 mg fludioxonil was dissolved in 10 mL dimethylsulfoxide (DMSO) and the resulting solution was diluted 2-fold in DMSO to give a concentration of 1 mg/mL. This solution was diluted 10-fold in potato dextrose broth (PDB) to give a concentration of 0.1 mg/mL in 10% DMSO/90% PDB. The solubility of fludioxonil in 10% DMSO/90% PDB was determined to be 0.0154 mg/mL using high performance liquid chromatography. A solution of 0.000963 mg/mL fludioxonil was prepared by adding 625 µL of 0.0154 mg/mL fludioxonil to 9375 µL of PDB.

For testing individual MICs, stock solutions of hexanoic acid or octanoic acid as Component B were prepared by adding 100 µL hexanoic acid (93 mg) or octanoic acid (91 mg) to 900 µL PDB resulting in concentrations of 9.3 mg/mL and 9.1 mg/mL, respectively. A stock solution of decanoic acid was prepared at 10 mg/mL in DMSO followed by 10-fold dilution in PDB producing a concentration of 1 mg/mL in 10% DMSO/90% PDB. The stock solution of decanoic acid, potassium salt, was prepared by adding 100 mg to 10 mL of PDB resulting in a concentration of 10 mg/mL. A stock solution of dodecanoic acid was prepared at 1 mg/mL in DMSO followed by 10-fold dilution in PDB producing a concentration of 0.1 mg/mL in 10% DMSO/ 90% PDB.

For testing MICs of combinations, a solution of hexanoic acid at 0.29 mg/mL was prepared by adding 156 µL of the 9.3 mg/mL stock solution to 4844 µL PDB. Similarly, a solution of octanoic acid at 1.14 mg/mL was prepared diluting the 9.1 mg/mL stock solution in PDB. A solution of decanoic acid at 0.5 mg/mL was prepared by 2-fold dilution of the 1 mg/mL stock solution. A solution of decanoic acid, potassium salt, at 0.156 mg/mL was prepared by adding 78 µL of the 10 mg/mL stock solution to 4922 µL PDB. A solution of dodecanoic acid at 0.2 mg/mL was prepared by dissolving 2 mg in 1 mL DMSO followed by 10-fold dilution in PDB at 40° C.

Combinations for results shown in Table 7 were prepared by adding 0.5 mL of 0.0154 mg/mL fludioxonil to 0.5 mL of each of the stock solutions. Each combination was tested over a range of 2-fold dilutions in the synergistic growth inhibition assay, observed following a 24 hour incubation period, and the FIC Index for each combination calculated, as shown below in Table 7.

TABLE 7

Growth inhibition of *Fusarium oxysporum* by fludioxonil in combination with various exemplary saturated aliphatic acids (and salts thereof).

| Combination | Compound A | Compound B | MIC(A) (mg/mL) | MIC(B) (mg/mL) | Ratio Compound B/ Compound A | FIC Index |
|---|---|---|---|---|---|---|
| | Fludioxonil | | $4.8125 \times 10^{-4}$ | | | |
| | | Hexanoic acid | | 0.14531 | | |
| | | Octanoic acid | | 0.56875 | | |
| | | Decanoic acid | | 0.25 | | |
| | | Decanoic acid, potassium salt | | 0.078125 | | |
| | | Dodecanoic acid | | 0.1 | | |
| 1 | Fludioxonil | Hexanoic acid | $1.20375 \times 10^{-4}$ | 0.00114 | 10 | 0.26 |
| 2 | Fludioxonil | Octanoic acid | $1.20375 \times 10^{-4}$ | 0.00444 | 37 | 0.26 |
| 3 | Fludioxonil | Decanoic acid | $1.20375 \times 10^{-4}$ | 0.00195 | 16 | 0.26 |
| 4 | Fludioxonil | Decanoic acid, potassium salt | $1.20375 \times 10^{-4}$ | 0.00061 | 5 | 0.26 |
| 5 | Fludioxonil | Dodecanoic acid | $1.20375 \times 10^{-4}$ | 0.00078 | 7 | 0.26 |

Combinations for results shown in Table 8 were prepared by adding 0.5 mL of 0.000963 mg/mL fludioxonil to 0.5 mL of each of the stock solutions.

TABLE 8

Growth inhibition of *Fusarium oxysporum* by fludioxonil in combination with various exemplary saturated aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | Fludioxonil | | $4.8125 \times 10^{-4}$ | | | |
| | | Hexanoic acid | | 0.29 | | |
| | | Octanoic acid | | 1.14 | | |
| | | Decanoic acid | | 0.25 | | |
| | | Decanoic acid, potassium salt | | 0.078125 | | |
| | | Dodecanoic acid | | 0.1 | | |
| 1 | Fludioxonil | Hexanoic acid | $1.20375 \times 10^{-4}$ | 0.03633 | 309 | 0.38 |
| 2 | Fludioxonil | Octanoic acid | $1.20375 \times 10^{-4}$ | 0.14219 | 1181 | 0.38 |
| 3 | Fludioxonil | Decanoic acid | $1.20375 \times 10^{-4}$ | 0.0625 | 519 | 0.5 |

TABLE 8-continued

Growth inhibition of *Fusarium oxysporum* by fludioxonil in combination with various exemplary saturated aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| 4 | Fludioxonil | Decanoic acid, potassium salt | $1.20375 \times 10^{-4}$ | 0.01953 | 162 | 0.5 |
| 5 | Fludioxonil | Dodecanoic acid | $1.20375 \times 10^{-4}$ | 0.025 | 208 | 0.5 |

Example 7: Growth Inhibition of *Fusarium oxysporum* by Limonoid Extract from Cold-Pressed Neem Oil and Fortune Aza Technical (Azadirachtin Extract) in Combination with Various Exemplary Saturated Aliphatic Acids Sample Preparation:

An extract of limonoids was prepared from cold-pressed neem oil using solvent extraction with hexane and methanol to prepare a neem oil limonoid extract. Fortune Aza Technical pesticide containing 14% azadirachtin (extracted from neem seed/kernel source) was obtained from Fortune Biotech Ltd. of Secunderabad, India (also referred to as "Azatech"). Solutions of neem oil limonoid extract and Fortune Aza Technical were prepared at 5 mg/mL in DMSO followed by ten-fold dilution in PDB to give a concentration of 0.5 mg/mL in 10% DMSO/90% PDB. These solutions were used for testing the individual MICs.

For testing the individual MIC of octanoic acid, a solution was prepared by adding 100 uL octanoic acid (91 mg) to 900 uL PDB resulting in concentrations of 9.1 mg/mL. A stock solution of decanoic acid was prepared at 10 mg/mL in DMSO followed by 10-fold dilution in PDB producing a concentration of 1 mg/mL in 10% DMSO/90% PDB.

Combinations with octanoic acid were prepared by dissolving 5 mg neem oil limonoid extract or Fortune Aza Technical in 1 mL of DMSO and adding 6.25 uL octanoic acid (d=0.91 g/mL) followed by 10-fold dilution in PDB. This produced a solution containing 0.5 mg/mL neem oil limonoid extract or Fortune Aza Technical and 0.56875 mg/mL octanoic acid. Combinations with decanoic acid were prepared by dissolving 5 mg neem oil limonoid extract or Fortune Aza Technical in 1 mL of DMSO and adding 2.5 mg of decanoic acid followed by 10-fold dilution in PDB. This produced a solution containing 0.5 mg/mL neem oil limonoid extract or Fortune Aza Technical and 0.25 mg/mL decanoic acid.

Each combination was tested over a range of 2-fold dilutions in the synergistic growth inhibition assay, observed following a 24 hour incubation period, and the FIC Index for each combination calculated, as shown below in Table 9.

TABLE 9

Growth inhibition of *Fusarium oxysporum* by neem oil limonoid extract or Fortune Aza Technical (Azatech) in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Neem oil limonoid extract |  | 0.5 |  |  |  |
|  | Azatech |  | 0.5 |  |  |  |
|  |  | Octanoic acid |  | 0.56875 |  |  |
|  |  | Decanoic acid |  | 0.25 |  |  |
| 1 | Neem oil limonoid extract | Octanoic acid | 0.0625 | 0.07109 | 1.14 | 0.25 |
| 2 | Neem oil limonoid extract | Decanoic acid | 0.125 | 0.0625 | 0.5 | 0.5 |
| 3 | Fortune Aza Tech. | Octanoic acid | 0.0625 | 0.07109 | 1.14 | 0.25 |
| 4 | Fortune Aza Tech. | Decanoic acid | 0.125 | 0.0625 | 0.5 | 0.5 |

Sample Preparation for Examples 8-19

For each of experimental Examples 8-19 described below, concentrated stock solutions, and diluted working solutions were prepared for each of the exemplary pesticidal active ingredients as Component A, and each of the exemplary unsaturated and saturated aliphatic acids as Component B, in accordance with the following descriptions:

Compound A Pesticidal Active Ingredients:

Concentrated stock solutions were prepared by dissolving pesticidal active ingredient in 100% dimethylsulfoxide (DMSO), which were then diluted 10-fold in potato dextrose broth (PDB) to give a working stock solution, as described below:

Pyraclostrobin (available from Santa Cruz Biotech, Dallas, TX, USA, as stock #SC-229020): A 0.5 mg/mL stock solution in 100% DMSO was diluted 10-fold in PDB to provide a nominal 0.05 mg/mL working stock solution, for which an effective solubilized concentration of 0.015 mg/mL was verified using high performance liquid chromatography (HPLC). This 0.015 mg/mL effective concentration working stock solution was used for further serial dilution in PDB to the required individual concentrations as specified in the tables below.

Azoxystrobin (available from Sigma-Aldrich, St. Louis, MO, USA, as stock #31697): A 1.75 mg/mL stock solution in 100% DMSO was diluted 10-fold in PDB to provide a nominal 0.175 mg/mL working stock solution, for which an effective solubilized concentration of 0.15 mg/mL was verified using high performance liquid chromatography (HPLC). This 0.15 mg/mL effective concentration working stock solution was used for further serial dilution in PDB to the required individual concentrations as specified in the tables below.

Chlorothalonil (available from Chem Service Inc., West Chester, PA, USA, as stock #N-11454): A 0.5 mg/mL stock solution in 100% DMSO was diluted 10-fold in PDB to provide a nominal 0.05 mg/mL working stock solution, for which an effective solubilized concentration of 0.002 mg/mL was verified using high performance liquid chromatography (HPLC). This 0.002 mg/mL effective concentration working stock solution was used for further serial dilution in PDB to the required individual concentrations as specified in the tables below.

Fludioxonil (available from Shanghai Terppon Chemical Co. Ltd., of Shanghai, China): A 1.05 mg/mL stock solution in 100% DMSO was diluted 10-fold in PDB to provide a nominal 0.105 mg/mL working stock solution, for which an effective solubilized concentration of 0.021 mg/mL was verified using high performance liquid chromatography (HPLC). This 0.021 mg/mL effective concentration working stock solution was used for further serial dilution in PDB to the required individual concentrations as specified in the tables below.

Cyprodinil (available from Shanghai Terppon Chemical Co. Ltd., of Shanghai, China): A 1.37 mg/mL stock solution in 100% DMSO was diluted 10-fold in PDB to provide a nominal 0.137 mg/mL working stock solution, for which an effective solubilized concentration of 0.009 mg/mL was verified using high performance liquid chromatography (HPLC). This 0.009 mg/mL effective concentration working stock solution was used for further serial dilution in PDB to the required individual concentrations as specified in the tables below.

Metalaxyl: A 3.32 mg/mL stock solution in 100% DMSO was diluted 10-fold in PDB to provide a nominal 0.332 mg/mL working stock solution, for which an effective solubilized concentration of 0.316 mg/mL was verified using high performance liquid chromatography (HPLC). This 0.316 mg/mL effective concentration working stock solution was used for further serial dilution in PDB to the required individual concentrations as specified in the tables below.

Difenoconazole (available from Santa Cruz Biotech, Dallas, TX, USA, as stock no. SC-204721): A 1.3 mg/mL stock solution in 100% DMSO was diluted 10-fold in PDB to provide a nominal 0.13 mg/mL working stock solution, for which an effective solubilized concentration of 0.051 mg/mL was verified using high performance liquid chromatography (HPLC). This 0.051 mg/mL effective concentration working stock solution was used for further serial dilution in PDB to the required individual concentrations as specified in the tables below.

Propiconazole (available from Shanghai Terppon Chemical Co. Ltd., of Shanghai, China): A 1.0 mg/mL stock solution in 100% DMSO was diluted 10-fold in PDB to provide a nominal 0.10 mg/mL working stock solution, for which an effective solubilized concentration of 0.089 mg/mL was verified using high performance liquid chromatography (HPLC). This 0.089 mg/mL effective concentration working stock solution was used for further serial dilution in PDB to the required individual concentrations as specified in the tables below.

Epoxiconazole (available from Shanghai Terppon Chemical Co. Ltd., of Shanghai, China): A 2.5 mg/mL stock solution in 100% DMSO was diluted 10-fold in PDB to provide a nominal 0.25 mg/mL working stock solution, for which an effective solubilized concentration of 0.03 mg/mL was verified using high performance liquid chromatography (HPLC). This 0.025 mg/mL effective concentration working stock solution was used for further serial dilution in PDB to the required individual concentrations as specified in the tables below.

Tebuconazole (available from Shanghai Terppon Chemical Co. Ltd., of Shanghai, China): A 5.0 mg/mL stock solution in 100% DMSO was diluted 10-fold in PDB to provide a nominal 0.50 mg/mL working stock solution, for which an effective solubilized concentration of 0.45 mg/mL was verified using high performance liquid chromatography (HPLC). This 0.45 mg/mL effective concentration working stock solution was used for further serial dilution in PDB to the required individual concentrations as specified in the tables below.

Picoxystrobin (available from Sigma Aldrich, #33658): A 5.0 mg/mL stock solution in 100% DMSO was diluted 10-fold in PDB to provide a nominal 0.50 mg/mL working picoxystrobin stock solution, which was used for further serial dilution in PDB to the required individual concentrations as specified in the tables below.

Isopyrazam (available from Sigma Aldrich, #32532): A 5.0 mg/mL stock solution in 100% DMSO was diluted 10-fold in PDB to provide a nominal 0.50 mg/mL working isopyrazam stock solution, which was used for further serial dilution in PDB to the required individual concentrations as specified in the tables below.

Penthiopyrad (available from aksci.com, #X5975): A 5.0 mg/mL stock solution in 100% DMSO was diluted 10-fold in PDB to provide a nominal 0.50 mg/mL working penthiopyrad stock solution, which was used for further serial dilution in PDB to the required individual concentrations as specified in the tables below.

Oxathiapiprolin (available from carbosynth.com, #F0159014): A 5.0 mg/mL stock solution in 100% DMSO was diluted 10-fold in PDB to provide a nominal 0.50 mg/mL working oxathiapiprolin stock solution, which was used for further serial dilution in PDB to the required individual concentrations as specified in the tables below.

Prothioconazole (available from Sigma Aldrich, #34232): A 5.0 mg/mL stock solution in 100% DMSO was diluted 10-fold in PDB to provide a nominal 0.50 mg/mL working prothioconazole stock solution, which was used for further serial dilution in PDB to the required individual concentrations as specified in the tables below.

Trifloxystrobin (available from Sigma Aldrich, #46447): A 5.0 mg/mL stock solution in 100% DMSO was diluted 10-fold in PDB to provide a nominal 0.50 mg/mL working trifloxystrobin stock solution, which was used for further serial dilution in PDB to the required individual concentrations as specified in the tables below.

Mancozeb (available from Sigma Aldrich, #45553): A 5.0 mg/mL stock solution in 100% DMSO was diluted 10-fold in PDB to provide a nominal 0.50 mg/mL working penthiopyrad stock solution, which was used for further serial dilution in PDB to the required individual concentrations as specified in the tables below.

Compound B Unsaturated Aliphatic Acids:

Concentrated stock solutions were prepared by dissolving each exemplary unsaturated aliphatic acid in 100% dimethylsulfoxide (DMSO), which were then diluted 10-fold in potato dextrose broth (PDB) to give a working stock solution, as described below:

Trans-2-hexenoic acid, trans-3-hexenoic acid, cis-3-hexenoic acid, 5-hexenoic acid, 3-heptenoic acid, trans-2-octenoic acid, trans-3-octenoic acid, 3-octenoic acid, 7-octenoic acid, 3-decenoic acid, cis-3-decenoic acid, 9-decenoic acid, trans-2-nonenoic acid, 3-nonenoic acid, (9Z)-octadecenoic acid (oleic acid) (all available from Sigma-Aldrich, St. Louis, MO, USA), trans-2-decenoic acid (available from TCI America, Portland, OR, USA as stock #D0098), cis-2-decenoic acid (available from BOC Sciences, Sirley, NY, USA), and trans-2-undecenoic acid (available from Alfa Aesar, Ward Hill, MA, USA as stock #L-11579): A 50 mg/mL stock solution in 100% DMSO was diluted 10-fold in PDB to provide a working stock solution of 5 mg/mL concentration. This 5 mg/mL effective concentration working stock solution was used for further serial dilution in PDB to the required individual concentrations as specified in Tables 10-111 below.

(2E,4E)-2,4-hexadienoic acid (available from Sigma-Aldrich, St. Louis, MO, USA): A 20 mg/mL stock solution in 100% DMSO was diluted 10-fold in PDB to provide a working stock solution of 2 mg/mL concentration. This 2 mg/mL effective concentration working stock solution was used for further serial dilution in PDB to the required individual concentrations as specified in Tables 10-111 below.

Compound B Saturated Aliphatic Acids:

Concentrated stock solutions were prepared by dissolving each exemplary saturated aliphatic acid in 100% dimethylsulfoxide (DMSO), which were then diluted 10-fold in potato dextrose broth (PDB) to give a working stock solution, as described below:

Hexanoic acid, heptanoic acid, octanoic acid, nonanoic acid (all available from Sigma-Aldrich, St. Louis, MO, USA): A 50 mg/mL stock solution in 100% DMSO was diluted 10-fold in PDB to provide a working stock solution of 5 mg/mL concentration. This 5 mg/mL effective concentration working stock solution was used for further serial dilution in PDB to the required individual concentrations as specified in data Tables below.

Decenoic acid (available from Sigma-Aldrich, St. Louis, MO, USA): A 10 mg/mL stock solution in 100% DMSO was diluted 10-fold in PDB to provide a working stock solution of 1 mg/mL concentration. This 1 mg/mL effective concentration working stock solution was used for further serial dilution in PDB to the required individual concentrations as specified in data Tables below.

Dodecenoic acid (available from Sigma-Aldrich, St. Louis, MO, USA): A 1 mg/mL stock solution in 100% DMSO was diluted 10-fold in PDB to provide a working stock solution of 0.1 mg/mL concentration. This 0.1 mg/mL effective concentration working stock solution was used for further serial dilution in PDB to the required individual concentrations as specified in data Tables below.

Exemplary Hydroxy-substituted aliphatic acids: 2- and 3-hydroxybutyric acid, 2-hydroxyhexanoic acid, 12-hydroxydodecanoic acid (all available from Sigma-Aldrich, St. Louis, MO, USA); 3-hydroxydecanoic acid, 3-hydroxyhexanoic acid (both available from Shanghai Terppon Chemical, Shanghai, China); 3-, 8-, 10-hydroxyoctanoic acid (all available from AA Blocks LLC, San Diego, CA, USA), 2-hydroxyoctanoic acid (available from Alfa Aesar, Ward Hill, MA, USA): a stock solution was prepared for each by dissolving each acid in 100% DMSO, which was then diluted in PDB to 10% DMSO concentration, before further serial dilution in PDB to the required individual concentrations as specified in the data Tables below.

Exemplary alkyl-substituted aliphatic acids: 2-ethylhexanoic acid, 2-methyloctanoic acid, 3-methylnonanoic acid, 3-methylbutyric acid (all available from Sigma-Aldrich, St. Louis, MO, USA); 2,2-diethylbutyric acid, 2- and 4-methylhexanoic acid, 2-methyldecanoic acid (all available from AA Blocks LLC, San Diego, CA, USA); 3-methylhexanoic acid (available from 1 ClickChemistry Inc., Kendall Park, NJ, USA): a stock solution was prepared for each by dissolving each acid in 100% DMSO, which was then diluted in PDB to 10% DMSO concentration, before further serial dilution in PDB to the required individual concentrations as specified in the data Tables below.

Exemplary amino-substituted aliphatic acid: 3-aminobutyric acid (available from AK Scientific Inc., Union City, CA, USA): a stock solution was prepared by dissolving each acid in 100% DMSO, which was then diluted in PDB to 10% DMSO concentration, before further serial dilution in PDB to the required individual concentrations as specified in the data Tables below.

The working stock solutions for each Compound A and Compound B component were then serially diluted to test the individual MIC of each pesticidal active ingredient (as Compound A), each unsaturated or saturated aliphatic acid (as Compound B), and the combined MIC of each combination of Compound A and Compound B, according to the synergistic growth inhibition assay described above.

Example 8: Growth Inhibition of *Fusarium oxysporum* by Pyraclostrobin, Azoxystrobin, Chlorothalonil, Fluidioxonil, Cyprodinil, Difenoconazole, and Tebuconazole, in Combination with Various Exemplary Saturated Aliphatic Acids Working solutions of pyraclostrobin, azoxystrobin, chlorothalonil, fluidioxonil, cyprodinil, difenoconazole, and tebuconazole were each prepared as described above (as Compound A) and were serially diluted in PDB to the individual required concentrations for MIC testing as shown in Tables 10-15 below. Working solutions of hexanoic acid, heptanoic acid, octanoic acid, nonanoic acid, and decanoic acid, (as Compound B), were each prepared as described above, and were serially diluted in PDB to the individual required concentrations for MIC testing as shown in Tables 10-15 below.

Each individual compound and combination was tested over a range of 2-fold dilutions in the synergistic growth inhibition assay, observed following an incubation period of 48 hours, and the FIC Index for each combination calculated, as shown in Tables 10-15 below.

TABLE 10

Growth inhibition of *Fusarium oxysporum* by pyraclostrobin, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.015 | | | |
| | | Hexanoic acid | | 0.15625 | | |
| | | Heptanoic acid | | 0.15625 | | |
| | | Octanoic acid | | 0.15625 | | |
| | | Nonanoic acid | | 0.15625 | | |
| | | Decanoic acid | | 0.125 | | |
| | | Dodecanoic acid | | 0.1 | | |
| | | 3-Hydroxybutyric acid | | 10 | | |
| | | 3-Hydroxydecanoic acid | | 0.25 | | |
| 1 | Pyraclostrobin | Hexanoic acid | 0.00187 | 0.019531 | 10 | 0.25 |
| 2 | Pyraclostrobin | Heptanoic acid | 0.00375 | 0.039062 | 10 | 0.50 |
| 3 | Pyraclostrobin | Octanoic acid | 0.00187 | 0.039062 | 21 | 0.38 |
| 4 | Pyraclostrobin | Nonanoic acid | 0.00375 | 0.039062 | 10 | 0.50 |
| 5 | Pyraclostrobin | Decanoic acid | 0.00375 | 0.015625 | 4 | 0.38 |
| 6 | Pyraclostrobin | Dodecanoic acid | 0.00375 | 0.025 | 7 | 0.50 |
| 7 | Pyraclostrobin | 3-Hydroxybutyric acid | 0.00375 | 2.5 | 667 | 0.50 |
| 8 | Pyraclostrobin | 3-Hydroxydecanoic acid | 0.00094 | 0.03125 | 33 | 0.19 |

TABLE 11

Growth inhibition of *Fusarium oxysporum* by azoxystrobin, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Azoxystrobin | | 0.075 | | | |
| | | Hexanoic acid | | 0.15625 | | |
| | | Heptanoic acid | | 0.15625 | | |
| | | Octanoic acid | | 0.15625 | | |
| | | Nonanoic acid | | 0.07812 | | |
| | | Dodecanoic acid | | 0.1 | | |
| 1 | Azoxystrobin | Hexanoic acid | 0.01875 | 0.039062 | 2 | 0.50 |
| 2 | Azoxystrobin | Heptanoic acid | 0.01875 | 0.039062 | 2 | 0.50 |
| 3 | Azoxystrobin | Octanoic acid | 0.01875 | 0.039062 | 2 | 0.50 |
| 4 | Azoxystrobin | Nonanoic acid | 0.01875 | 0.019531 | 1 | 0.50 |
| 5 | Azoxystrobin | Dodecanoic acid | 0.01875 | 0.025 | 1.3 | 0.50 |

TABLE 12

Growth inhibition of *Fusarium oxysporum* by chlorothalonil, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Chlorothalonil | | 0.000125 | | | |
| | | Heptanoic acid | | 0.15625 | | |
| | | Octanoic acid | | 0.3125 | | |
| | | Nonanoic acid | | 0.3125 | | |
| | | Dodecanoic acid | | 0.1 | | |
| | | 3-Hydroxydecanoic acid | | 0.25 | | |
| 1 | Chlorothalonil | Heptanoic acid | $6.25 \times 10^{-5}$ | 0.039062 | 625 | 0.75 |
| 2 | Chlorothalonil | Octanoic acid | $6.25 \times 10^{-5}$ | 0.039062 | 625 | 0.63 |
| 3 | Chlorothalonil | Nonanoic acid | $6.25 \times 10^{-5}$ | 0.019531 | 313 | 0.56 |
| 4 | Chlorothalonil | Dodecanoic acid | $6.25 \times 10^{-5}$ | 0.025 | 400 | 0.75 |
| 5 | Chlorothalonil | 3-Hydroxydecanoic acid | $1.9531 \times 10^{-6}$ | 0.003125 | 16000 | 0.19 |

TABLE 13

Growth inhibition of *Fusarium oxysporum* by fludioxonil and cyprodinil, in combination with an exemplary saturated aliphatic acid

| Combination | Compound A | Compound B | MIC (A) (mg/mL) | MIC (B) (mg/mL) | Ratio Compound B/ Compound A | FIC Index |
|---|---|---|---|---|---|---|
| | Fludioxonil | | 0.021 | | | |
| | Cyprodinil | | 0.009 | | | |
| | | Dodecanoic acid | | 0.1 | | |
| | | 3-Hydroxydecanoic acid | | 0.25 | | |
| 1 | Fludioxonil | Dodecanoic acid | 0.00525 | 0.025 | 5 | 0.50 |
| 2 | Fludioxonil | 3-Hydroxydecanoic acid | 0.00131 | 0.03125 | 24 | 0.19 |
| 3 | Cyprodinil | 3-Hydroxydecanoic acid | 0.0005625 | 0.03125 | 56 | 0.19 |

TABLE 14

Growth inhibition of *Fusarium oxysporum* by difenoconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Difenoconazole | | 0.051 | | | |
| | | Heptanoic acid | | 0.15625 | | |
| | | Octanoic acid | | 0.3125 | | |
| 1 | Difenoconazole | Heptanoic acid | 0.01275 | 0.039062 | 3 | 0.50 |
| 2 | Difenoconazole | Octanoic acid | 0.01275 | 0.078125 | 6 | 0.50 |

TABLE 15A

Growth inhibition of *Fusarium oxysporum* by tebuconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.255 | | | |
| | | Heptanoic acid | | 0.15625 | | |
| | | Octanoic acid | | 0.15625 | | |
| | | Nonanoic acid | | 0.15625 | | |
| | | Decanoic acid | | 0.03125 | | |
| | | Dodecanoic acid | | 0.1 | | |
| 1 | Tebuconazole | Heptanoic acid | 0.05625 | 0.039062 | 0.7 | 0.50 |
| 2 | Tebuconazole | Octanoic acid | 0.05625 | 0.039062 | 0.7 | 0.50 |
| 3 | Tebuconazole | Nonanoic acid | 0.05625 | 0.039062 | 0.7 | 0.50 |
| 4 | Tebuconazole | Decanoic acid | 0.05625 | 0.007812 | 0.14 | 0.50 |
| 5 | Tebuconazole | Dodecanoic acid | 0.05625 | 0.0025 | 0.4 | 0.50 |

TABLE 15B

Growth inhibition of *Fusarium oxysporum* by various synthetic fungicides in combination with saturated 3-hydroxy aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.015 | | | |
| | Azoxystrobin | | 0.15 | | | |
| | Fludioxonil | | 0.021 | | | |
| | Difenoconazole | | 0.051 | | | |
| | Tebuconazole | | 0.225 | | | |

TABLE 15B-continued

Growth inhibition of *Fusarium oxysporum* by various synthetic fungicides in combination with saturated 3-hydroxy aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | | 3-Hydroxybuturic acid | | 10 | | |
| | | 3-Hydroxyhexanoic acid | | 2.5 | | |
| | | 3-Hydroxydecanoic acid | | 0.25 | | |
| 1 | Pyraclostrobin | 3-Hydroxybuturic acid | 0.001875 | 2.5 | 1333 | 0.38 |
| 2 | Azoxystrobin | 3-Hydroxybuturic acid | 0.0375 | 2.5 | 67 | 0.50 |
| 3 | Azoxystrobin | 3-Hydroxyhexanoic acid | 0.0375 | 0.625 | 17 | 0.50 |
| 4 | Fludioxonil | 3-Hydroxybuturic acid | 0.00525 | 2.5 | 476 | 0.50 |
| 5 | Difenoconazole | 3-Hydroxybuturic acid | 0.01275 | 2.5 | 196 | 0.50 |
| 6 | Tebuconazole | 3-Hydroxydecanoic acid | 0.05625 | 2.5 | 44 | 0.50 |
| 7 | Tebuconazole | 3-Hydroxydecanoic acid | 0.05625 | 0.0625 | 1.1 | 0.50 |

Example 9: Growth Inhibition of *Sclerotinia sclerotiorum* by Pyraclostrobin, Azoxystrobin, Propiconazole, Epiconazole, Tebuconazole, and Difenoconazole, in Combination with Various Exemplary Saturated Aliphatic Acids Working solutions of pyraclostrobin, azoxystrobin, propiconazole, epiconazole, tebuconazole, and difenoconazole were each prepared as described above (as Compound A) and were serially diluted in PDB to the individual required concentrations for MIC testing as shown in Tables 16-20 below. Working solutions of hexanoic acid, heptanoic acid, octanoic acid, nonanoic acid, decanoic acid, and dodecanoic acid, (as Compound B), were each prepared as described above, and were serially diluted in PDB to the individual required concentrations for MIC testing as shown in Tables 16-20 below.

Each individual compound and combination was tested over a range of 2-fold dilutions in the synergistic growth inhibition assay, observed following an incubation period of 7 days, and the FIC Index for each combination calculated, as shown in Tables 16-20 below.

TABLE 16

Growth inhibition of *Sclerotinia sclerotiorum* by pyraclostrobin, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.0075 | | | |
| | | Hexanoic acid | | 0.039062 | | |
| | | Heptanoic acid | | 0.039062 | | |
| | | Octanoic acid | | 0.019531 | | |
| | | Nonanoic acid | | 0.019531 | | |
| | | Decanoic acid | | 0.15625 | | |
| | | Dodecanoic acid | | 0.05 | | |
| | | 3-Hydroxybuturic acid | | 10 | | |
| | | 3-Hydroxyhexanoic acid | | 5 | | |
| | | 3-Hydroxydecanoic acid | | 0.125 | | |
| 1 | Pyraclostrobin | Hexanoic acid | $9.375 \times 10^{-4}$ | 0.009765 | 10 | 0.38 |
| 2 | Pyraclostrobin | Heptanoic acid | $4.688 \times 10^{-4}$ | 0.004883 | 10 | 0.19 |
| 3 | Pyraclostrobin | Octanoic acid | $9.375 \times 10^{-4}$ | 0.004883 | 5 | 0.38 |
| 4 | Pyraclostrobin | Nonanoic acid | $4.688 \times 10^{-4}$ | 0.004883 | 10 | 0.31 |
| 5 | Pyraclostrobin | Decanoic acid | $9.375 \times 10^{-4}$ | 0.001953 | 2 | 0.14 |
| 6 | Pyraclostrobin | Dodecanoic acid | $9.375 \times 10^{-4}$ | 0.00625 | 7 | 0.25 |
| 7 | Pyraclostrobin | 3-Hydroxybuturic acid | $2.930 \times 10^{-5}$ | 0.039062 | 1333 | 0.008 |
| 8 | Pyraclostrobin | 3-Hydroxyhexanoic acid | $1.465 \times 10^{-5}$ | 0.009765 | 667 | 0.004 |
| 9 | Pyraclostrobin | 3-Hydroxydecanoic acid | $2.930 \times 10^{-5}$ | $4.882 \times 10^{-4}$ | 17 | 0.008 |

TABLE 17

Growth inhibition of *Sclerotinia sclerotiorum* by azoxystrobin, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Azoxystrobin | | 0.15 | | | |
| | | Hexanoic acid | | 0.039062 | | |
| | | Heptanoic acid | | 0.039062 | | |
| | | Octanoic acid | | 0.039062 | | |
| | | Nonanoic acid | | 0.078125 | | |
| | | Decanoic acid | | 0.078125 | | |
| | | Dodecanoic acid | | 0.05 | | |
| 1 | Azoxystrobin | Hexanoic acid | 0.0375 | 0.019531 | 0.52 | 0.75 |
| 2 | Azoxystrobin | Heptanoic acid | 0.0375 | 0.009766 | 0.26 | 0.50 |
| 3 | Azoxystrobin | Octanoic acid | 0.01875 | 0.004883 | 0.26 | 0.25 |
| 4 | Azoxystrobin | Nonanoic acid | 0.01875 | 0.004883 | 0.26 | 0.19 |
| 5 | Azoxystrobin | Decanoic acid | 0.0375 | 0.003906 | 0.10 | 0.75 |
| 6 | Azoxystrobin | Dodecanoic acid | 0.009375 | 0.003125 | 0.33 | 0.13 |

TABLE 18

Growth inhibition of *Sclerotinia sclerotiorum* by propiconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Propiconazole | | 0.089 | | | |
| | | Decanoic acid | | 0.078125 | | |
| | | Dodecanoic acid | | 0.05 | | |
| 1 | Propiconazole | Decanoic acid | 0.0445 | 0.0078125 | 0.18 | 0.60 |
| 2 | Propiconazole | Dodecanoic acid | 0.0223 | 0.0125 | 0.56 | 0.50 |

TABLE 19

Growth inhibition of *Sclerotinia sclerotiorum* by epiconzaole and tebuconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Epoxiconazole | | 0.03 | | | |
| | Tebuconazole | | 0.225 | | | |
| | | Hexanoic acid | | 0.078125 | | |
| | | Heptanoic acid | | 0.0390625 | | |
| | | Octanoic acid | | 0.078125 | | |
| | | Nonanoic acid | | 0.078125 | | |
| | | Decanoic acid | | 0.03125 | | |
| | | Dodecanoic acid | | 0.1 | | |
| 1 | Epoxiconazole | Heptanoic acid | 0.0075 | 0.009765 | 1.3 | 0.50 |
| 2 | Epoxiconazole | Octanoic acid | 0.0375 | 0.004883 | 1.3 | 0.19 |
| 3 | Epoxiconazole | Decanoic acid | 0.075 | 0.003906 | 0.5 | 0.38 |
| 4 | Epoxiconazole | Dodecanoic acid | 0.0375 | 0.00625 | 1.7 | 0.19 |
| 5 | Tebuconazole | Hexanoic acid | 0.031875 | 0.009765 | 0.31 | 0.27 |
| 6 | Tebuconazole | Heptanoic acid | 0.031875 | 0.004883 | 0.15 | 0.27 |
| 7 | Tebuconazole | Octanoic acid | 0.06375 | 0.004883 | 0.15 | 0.20 |
| 8 | Tebuconazole | Nonanoic acid | 0.031875 | 0.004883 | 0.15 | 0.20 |
| 9 | Tebuconazole | Decanoic acid | 0.06375 | 0.003906 | 0.06 | 0.41 |
| 10 | Tebuconazole | Dodecanoic acid | 0.031875 | 0.00625 | 0.20 | 0.20 |

TABLE 20A

Growth inhibition of *Sclerotinia sclerotiorum* by difenoconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Difenoconazole | | 0.01275 | | | |
| | | Nonanoic acid | | 0.039062 | | |
| | | Decanoic acid | | 0.015615 | | |
| | | Dodecanoic acid | | 0.025 | | |
| 1 | Difenoconazole | Nonanoic acid | 0.006375 | 0.009766 | 1.5 | 0.75 |
| 2 | Difenoconazole | Decanoic acid | 0.006375 | 0.003906 | 0.6 | 0.75 |
| 4 | Difenoconazole | Dodecanoic acid | 0.0375 | 0.00625 | 2.0 | 0.50 |

TABLE 20B

Growth inhibition of *Sclerotinia sclerotiorum* by various fungicides, in combination with various exemplary saturated hydroxy aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.00375 | | | |
| | Azoxyst robin | | 0.075 | | | |
| | Chlorothalonil | | $3.125 \times 10^{-5}$ | | | |
| | Cyprodinil | | 0.009 | | | |
| | Metalaxyl | | 1.261 | | | |
| | Difenoconazole | | 0.0255 | | | |
| | Propiconazole | | 0.089 | | | |
| | Epoxiconazole | | 0.03 | | | |
| | Tebuconazole | | 0.05625 | | | |
| | | 3-Hydroxybuturic acid | | 5.0 | | |
| | | 3-Hydroxyhexanoic acid | | 2.5 | | |
| | | 3-Hydroxydecanoic acid | | 0.0625 | | |
| 1 | Pyraclostrobin | 3-Hydroxybuturic acid | 0.0009375 | 1.25 | 1333 | 0.50 |
| 2 | Pyraclostrobin | 3-Hydroxyhexanoic acid | 0.0009375 | 0.625 | 667 | 0.50 |
| 3 | Pyraclostrobin | 3-Hydroxydecanoic acid | 0.0009375 | 0.015625 | 17 | 0.50 |
| 4 | Azoxyst robin | 3-Hydroxyhexanoic acid | 0.01875 | 0.625 | 33 | 0.50 |
| 5 | Chlorothalonil | 3-Hydroxyhexanoic acid | $7.813 \times 10^{-6}$ | 1.25 | 160000 | 0.75 |
| 6 | Cyprodinil | 3-Hydroxyhexanoic acid | 0.00225 | 1.25 | 556 | 0.75 |
| 7 | Metalaxyl | 3-Hydroxyhexanoic acid | 0.31525 | 1.25 | 4 | 0.75 |
| 8 | Difenoconazole | 3-Hydroxybuturic acid | 0.006375 | 2.5 | 392 | 0.75 |
| 9 | Difenoconazole | 3-Hydroxyhexanoic acid | 0.006375 | 1.25 | 196 | 0.75 |
| 10 | Propiconazole | 3-Hydroxybuturic acid | 0.02225 | 2.5 | 112 | 0.75 |
| 11 | Propiconazole | 3-Hydroxyhexanoic acid | 0.02225 | 1.25 | 56 | 0.75 |
| 12 | Epoxiconazole | 3-Hydroxybuturic acid | 0.001875 | 0.625 | 333 | 0.19 |
| 13 | Epoxiconazole | 3-Hydroxyhexanoic acid | 0.00375 | 0.625 | 167 | 0.38 |
| 14 | Tebuconazole | 3-Hydroxybuturic acid | 0.014062 | 1.25 | 89 | 0.50 |
| 15 | Tebuconazole | 3-Hydroxyhexanoic acid | 0.014062 | 0.625 | 44 | 0.50 |

Example 10: Growth Inhibition of *Botrytis cinerea* by Pyraclostrobin, Azoxystrobin, Cyprodinil, Metalaxyl, Epiconazole, Tebuconazole, Propiconazole, and Difenoconazole, in Combination with Various Exemplary Saturated Aliphatic Acids Working solutions of pyraclostrobin, azoxystrobin, cyprodinil, metalaxyl, epiconazole, tebuconazole, propiconazole, and difenoconazole were each prepared as described above (as Compound A) and were serially diluted in PDB to the individual required concentrations for MIC testing as shown in Tables 21-26 below. Working solutions of hexanoic acid, heptanoic acid, octanoic acid, nonanoic acid, decanoic acid, and dodecanoic acid, (as Compound B), were each prepared as described above, and were serially diluted in PDB to the individual required concentrations for MIC testing as shown in Tables 21-26 below.

Each individual compound and combination was tested over a range of 2-fold dilutions in the synergistic growth inhibition assay, observed following an incubation period of 48 hours, and the FIC Index for each combination calculated, as shown in Tables 21-26 below.

TABLE 21

Growth inhibition of *Botrytis cinerea* by pyraclostrobin, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Pyraclostrobin |  | 0.0019 |  |  |  |
|  |  | Hexanoic acid |  | 0.078125 |  |  |
|  |  | Heptanoic acid |  | 0.078125 |  |  |
|  |  | Octanoic acid |  | 0.078125 |  |  |
|  |  | Nonanoic acid |  | 0.078125 |  |  |
|  |  | Decanoic acid |  | 0.03125 |  |  |
|  |  | Dodecanoic acid |  | 0.025 |  |  |
| 1 | Pyraclostrobin | Hexanoic acid | $9.375 \times 10^{-4}$ | 0.009766 | 10 | 0.63 |
| 2 | Pyraclostrobin | Heptanoic acid | $9.375 \times 10^{-4}$ | 0.004883 | 5 | 0.56 |
| 3 | Pyraclostrobin | Octanoic acid | $4.688 \times 10^{-4}$ | 0.002441 | 5 | 0.28 |
| 4 | Pyraclostrobin | Nonanoic acid | $4.688 \times 10^{-4}$ | 0.002441 | 5 | 0.28 |
| 5 | Pyraclostrobin | Decanoic acid | $2.344 \times 10^{-4}$ | 0.001953 | 8 | 0.19 |
| 6 | Pyraclostrobin | Dodecanoic acid | $9.375 \times 10^{-4}$ | 0.003125 | 3 | 0.63 |

TABLE 22

Growth inhibition of *Botrytis cinerea* by azoxystrobin, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Azoxystrobin |  | 0.0375 |  |  |  |
|  |  | Hexanoic acid |  | 0.078125 |  |  |
|  |  | Heptanoic acid |  | 0.078125 |  |  |
|  |  | Octanoic acid |  | 0.078125 |  |  |
|  |  | Nonanoic acid |  | 0.078125 |  |  |
|  |  | Decanoic acid |  | 0.078125 |  |  |
| 1 | Azoxystrobin | Hexanoic acid | 0.01875 | 0.019531 | 1 | 0.75 |
| 2 | Azoxystrobin | Heptanoic acid | 0.01875 | 0.009765 | 0.5 | 0.63 |
| 3 | Azoxystrobin | Octanoic acid | 0.01875 | 0.009765 | 0.5 | 0.63 |
| 4 | Azoxystrobin | Nonanoic acid | 0.01875 | 0.009765 | 0.5 | 0.63 |
| 5 | Azoxystrobin | Decanoic acid | 0.009375 | 0.078125 | 0.8 | 0.35 |

TABLE 23

Growth inhibition of *Botrytis cinerea* by pyraclostrobin, cyprodinil, metalaxyl, azoxystrobin, epoxiconazole, and tebuconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Pyraclostrobin |  | 0.00375 |  |  |  |
|  | Cyprodinil |  | 0.0045 |  |  |  |
|  | Metalaxyl |  | 0.316 |  |  |  |
|  | Azoxystrobin |  | 0.075 |  |  |  |
|  | Epoxiconazole |  | 0.03 |  |  |  |

TABLE 23-continued

Growth inhibition of *Botrytis cinerea* by pyraclostrobin, cyprodinil, metalaxyl, azoxystrobin, epoxiconazole, and tebuconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.1125 | | | |
| | | Decanoic acid | 0.03125 | | | |
| 1 | Pyraclostrobin | Decanoic acid | $2.344 \times 10^{-4}$ | 0.001953 | 8 | 0.13 |
| 3 | Cyprodinil | Decanoic acid | $5.625 \times 10^{-4}$ | 0.03125 | 28 | 0.63 |
| 4 | Metalaxyl | Decanoic acid | 0.0395 | 0.015625 | 0.4 | 0.63 |
| 5 | Azoxystrobin | Decanoic acid | 0.009375 | 0.0078125 | 0.8 | 0.38 |
| 6 | Epoxiconazole | Decanoic acid | 0.00375 | 0.015625 | 4 | 0.50 |
| 7 | Tebuconazole | Decanoic acid | 0.014062 | 0.0078125 | 0.6 | 0.38 |

TABLE 24

Growth inhibition of *Botrytis cinerea* by difenoconazole and propiconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Difenoconazole | | 0.051 | | | |
| | Propiconazole | | 0.089 | | | |
| | | Hexanoic acid | | 0.15625 | | |
| | | Heptanoic acid | | 0.15625 | | |
| | | Octanoic acid | | 0.15625 | | |
| | | Nonanoic acid | | 0.15625 | | |
| | | Decanoic acid | | 0.3125 | | |
| | | Dodecanoic acid | | 0.05 | | |
| 1 | Difenoconazole | Hexanoic acid | 0.01275 | 0.039062 | 3.1 | 0.50 |
| 2 | Difenoconazole | Heptanoic acid | 0.01275 | 0.019531 | 1.5 | 0.38 |
| 3 | Difenoconazole | Octanoic acid | 0.01275 | 0.019531 | 1.5 | 0.38 |
| 4 | Difenoconazole | Nonanoic acid | 0.01275 | 0.019531 | 1.5 | 0.38 |
| 5 | Difenoconazole | Decanoic acid | 0.006275 | 0.015625 | 2.5 | 0.18 |
| 6 | Difenoconazole | Dodecanoic acid | 0.01275 | 0.0125 | 1.0 | 0.5 |
| 7 | Propiconazole | Decanoic acid | 0.011125 | 0.015625 | 1.4 | 0.18 |
| 8 | Propiconazole | Dodecanoic acid | 0.02225 | 0.0125 | 0.6 | 0.5 |

TABLE 25

Growth inhibition of *Botrytis cinerea* by tebuconazole, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.1125 | | | |
| | | Hexanoic acid | | 0.078125 | | |
| | | Heptanoic acid | | 0.078125 | | |
| | | Octanoic acid | | 0.078125 | | |
| | | Nonanoic acid | | 0.078125 | | |
| | | Decanoic acid | | 0.015625 | | |
| | | Dodecanoic acid | | 0.05 | | |
| 1 | Tebuconazole | Hexanoic acid | 0.014062 | 0.009766 | 0.7 | 0.25 |
| 2 | Tebuconazole | Heptanoic acid | 0.014062 | 0.004883 | 0.3 | 0.19 |
| 3 | Tebuconazole | Octanoic acid | 0.014062 | 0.004883 | 0.3 | 0.19 |
| 4 | Tebuconazole | Nonanoic acid | 0.014062 | 0.004883 | 0.3 | 0.19 |
| 5 | Tebuconazole | Decanoic acid | 0.007031 | 0.003906 | 0.6 | 0.31 |
| 6 | Tebuconazole | Dodecanoic acid | 0.014062 | 0.003125 | 0.2 | 0.19 |

TABLE 26

Growth inhibition of *Botrytis cinerea* by cyprodinil and metalaxyl, in combination with various exemplary saturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Cyprodinil | | 0.0045 | | | |
| | Metalaxyl | | 0.316 | | | |
| | | Octanoic acid | | 0.078125 | | |
| | | Decanoic acid | | 0.078125 | | |
| | | Dodecanoic acid | | 0.05 | | |
| 1 | Cyprodinil | Decanoic acid | 0.001125 | 0.03125 | 28 | 0.65 |
| 2 | Metalaxyl | Octanoic acid | 0.01975 | 0.004883 | 0.25 | 0.13 |
| 3 | Metalaxyl | Decanoic acid | 0.0395 | 0.015625 | 0.4 | 0.33 |
| 4 | Metalaxyl | Dodecanoic acid | 0.079 | 0.0125 | 0.16 | 0.50 |

Example 11: Growth Inhibition of *Fusarium oxysporum* by Pyraclostrobin, Azoxystrobin, Fludioxonil, Cyprodinil, Difenoconazole, Epoxiconazole, and Tebuconazole, in Combination with Various Exemplary Unsaturated Aliphatic Acids Working solutions of pyraclostrobin, azoxystrobin, fludioxonil, cyprodinil, difenoconazole, epoxiconazole, and tebuconazole were each prepared as described above (as Compound A) and were serially diluted in PDB to the individual required concentrations for MIC testing as shown in Tables 27-32 below. Working solutions of (2E,4E)-2,4-hexadienoic acid, trans-3-hexenoic acid, 4-hexenoic acid, 5-hexenoic acid, 3-heptenoic acid, trans-2-octenoic acid, trans-3-octenoic acid, 7-octenoic acid, 3-decenoic acid, 9-decenoic acid, trans-2-nonenoic acid, 3-nonenoic acid, trans-2-decenoic acid, and trans-2-undecenoic acid, (as Compound B), were each prepared as described above, and were serially diluted in PDB to the individual required concentrations for MIC testing as shown in Tables 27-32 below.

Each individual compound and combination was tested over a range of 2-fold dilutions in the synergistic growth inhibition assay, observed following an incubation period of 48 hours, and the FIC Index for each combination calculated, as shown in Tables 27-32 below.

TABLE 27

Growth inhibition of *Fusarium oxysporum* by pyraclostrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.015 | | | |
| | | (2E,4E)-2,4-hexadienoic acid | | 0.025 | | |
| | | Trans-3-hexenoic acid | | 0.3125 | | |
| | | 4-Hexenoic acid | | 0.3125 | | |
| | | 5-Hexenoic acid | | 0.3125 | | |
| | | 3-Heptenoic acid | | 0.15625 | | |
| | | Trans-2-octenoic acid | | 0.3125 | | |
| | | Trans-3-octenoic acid | | 0.15625 | | |
| | | 7-Octenoic acid | | 0.3125 | | |
| | | 3-Decenoic acid | | 0.3125 | | |
| | | 9-Decenoic acid | | 0.3125 | | |
| 1 | Pyraclostrobin | (2E,4E)-2,4-hexadienoic acid | 0.00375 | 0.0625 | 17 | 0.50 |
| 2 | Pyraclostrobin | Trans-3-hexenoic acid | 0.001875 | 0.078125 | 42 | 0.38 |
| 3 | Pyraclostrobin | 4-Hexenoic acid | 0.00375 | 0.15625 | 42 | 0.75 |
| 4 | Pyraclostrobin | 5-Hexenoic acid | 0.00375 | 0.039062 | 10 | 0.38 |
| 5 | Pyraclostrobin | 3-Heptenoic acid | 0.001875 | 0.078125 | 42 | 0.63 |
| 6 | Pyraclostrobin | Trans-2-octenoic acid | 0.001875 | 0.019531 | 10 | 0.19 |
| 7 | Pyraclostrobin | Trans-3-octenoic acid | 0.001875 | 0.019531 | 10 | 0.25 |
| 8 | Pyraclostrobin | 7-Octenoic acid | 0.001875 | 0.019531 | 10 | 0.19 |
| 9 | Pyraclostrobin | 3-Decenoic acid | 0.00375 | 0.078125 | 21 | 0.50 |
| 10 | Pyraclostrobin | 9-Decenoic acid | 0.00375 | 0.039062 | 10 | 0.38 |

TABLE 28

Growth inhibition of *Fusarium oxysporum* by azoxystrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Azoxystrobin |  | 0.15 |  |  |  |
|  |  | Trans-3-hexenoic acid |  | 0.3125 |  |  |
|  |  | 3-Heptenoic acid |  | 0.15625 |  |  |
|  |  | Trans-2-nonenoic acid |  | 0.15625 |  |  |
|  |  | 3-Decenoic acid |  | 0.078125 |  |  |
|  |  | 9-Decenoic acid |  | 0.3125 |  |  |
| 1 | Azoxystrobin | Trans-3-hexenoic acid | 0.001875 | 0.078125 | 2 | 0.50 |
| 2 | Azoxystrobin | 3-Heptenoic acid | 0.001875 | 0.019531 | 1 | 0.25 |
| 3 | Azoxystrobin | Trans-2-nonenoic acid | 0.0375 | 0.039062 | 1 | 0.50 |
| 4 | Azoxystrobin | 3-Decenoic acid | 0.001875 | 0.019531 | 1 | 0.38 |
| 5 | Azoxystrobin | 9-Decenoic acid | 0.00375 | 0.039062 | 1 | 0.50 |

TABLE 29

Growth inhibition of *Fusarium oxysporum* by fludioxonil and cyprodinil, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Fludioxonil |  | 0.021 |  |  |  |
|  | Cyprodinil |  | 0.009 |  |  |  |
|  |  | 3-Heptenoic acid |  | 0.15625 |  |  |
|  |  | 3-Decenoic acid |  | 0.15625 |  |  |
| 1 | Fludioxonil | 3-Heptenoic acid | 0.039062 | 0.00525 | 7 | 0.50 |
| 2 | Fludioxonil | 3-Decenoic acid | 0.039062 | 0.00525 | 7 | 0.50 |
| 3 | Cyprodinil | 3-Decenoic acid | 0.00225 | 0.019531 | 9 | 0.38 |

TABLE 30

Growth inhibition of *Fusarium oxysporum* by difenoconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Difenoconazole |  | 0.051 |  |  |  |
|  |  | Trans-3-hexenoic acid |  | 0.3125 |  |  |
|  |  | 4-Hexenoic acid |  | 0.3125 |  |  |
|  |  | 3-Heptenoic acid |  | 0.15625 |  |  |
|  |  | Trans-2-octenoic acid |  | 0.15625 |  |  |
|  |  | 3-Octenoic acid |  | 0.15625 |  |  |
|  |  | Trans-3-octenoic acid |  | 0.15625 |  |  |
|  |  | 7-Octenoic acid |  | 0.3125 |  |  |
|  |  | Trans-2-nonenoic acid |  | 0.3125 |  |  |
|  |  | Trans-2-decenoic acid |  | 0.078125 |  |  |
|  |  | 9-Decenoic acid |  | 0.15625 |  |  |
| 1 | Difenoconazole | Trans-3-hexenoic acid | 0.006375 | 0.078125 | 12 | 0.38 |
| 2 | Difenoconazole | 4-Hexenoic acid | 0.01275 | 0.15625 | 12 | 0.75 |
| 3 | Difenoconazole | 3-Heptenoic acid | 0.006375 | 0.078125 | 12 | 0.63 |
| 4 | Difenoconazole | Trans-2-octenoic acid | 0.01275 | 0.039062 | 3 | 0.50 |
| 5 | Difenoconazole | 3-Octenoic acid | 0.01275 | 0.019531 | 1.5 | 0.38 |
| 6 | Difenoconazole | Trans-3-octenoic acid | 0.01275 | 0.039062 | 3 | 0.50 |
| 7 | Difenoconazole | 7-Octenoic acid | 0.01275 | 0.039062 | 3 | 0.50 |
| 8 | Difenoconazole | Trans-2-nonenoic acid | 0.01275 | 0.039062 | 3 | 0.38 |
| 9 | Difenoconazole | Trans-2-decenoic acid | 0.01275 | 0.019531 | 1.5 | 0.50 |
| 10 | Difenoconazole | 9-Decenoic acid | 0.01275 | 0.039062 | 3 | 0.50 |

TABLE 31

Growth inhibition of *Fusarium oxysporum* by epoxiconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Epoxiconazole | | 0.03 | | | |
| | | Trans-3-hexenoic acid | | 0.15625 | | |
| | | 3-Heptenoic acid | | 0.15625 | | |
| | | Trans-2-octenoic acid | | 0.15625 | | |
| | | 3-Octenoic acid | | 0.15625 | | |
| | | 3-Decenoic acid | | 0.078125 | | |
| 1 | Epoxiconazole | Trans-3-hexenoic acid | 0.0075 | 0.078125 | 10 | 0.75 |
| 2 | Epoxiconazole | 3-Heptenoic acid | 0.0075 | 0.039062 | 5 | 0.50 |
| 3 | Epoxiconazole | Trans-2-octenoic acid | 0.0075 | 0.039062 | 5 | 0.50 |
| 4 | Epoxiconazole | 3-Octenoic acid | 0.0075 | 0.039062 | 5 | 0.50 |
| 5 | Epoxiconazole | 3-Decenoic acid | 0.0075 | 0.039062 | 5 | 0.75 |

TABLE 32

Growth inhibition of *Fusarium oxysporum* by tebuconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.225 | | | |
| | | Trans-2-octenoic acid | | 0.3125 | | |
| | | 3-Octenoic acid | | 0.15625 | | |
| | | Trans-3-octenoic acid | | 0.15625 | | |
| | | 7-Octenoic acid | | 0.15625 | | |
| | | Trans-2-nonenoic acid | | 0.3125 | | |
| | | 3-Nonenoic acid | | 0.15625 | | |
| | | Trans-2-decenoic acid | | 0.15625 | | |
| | | 9-Decenoic acid | | 0.078125 | | |
| | | Trans-2-undecenoic acid | | 0.15625 | | |
| 1 | Tebuconazole | Trans-2-octenoic acid | 0.05625 | 0.039062 | 0.7 | 0.38 |
| 2 | Tebuconazole | 3-Octenoic acid | 0.05625 | 0.019531 | 0.3 | 0.38 |
| 3 | Tebuconazole | Trans-3-octenoic acid | 0.05625 | 0.039062 | 0.7 | 0.50 |
| 4 | Tebuconazole | 7-Octenoic acid | 0.05625 | 0.039062 | 0.7 | 0.50 |
| 5 | Tebuconazole | Trans-2-nonenoic acid | 0.028125 | 0.019531 | 0.7 | 0.19 |
| 6 | Tebuconazole | 3-Nonenoic acid | 0.05625 | 0.019531 | 0.3 | 0.38 |
| 7 | Tebuconazole | Trans-2-decenoic acid | 0.05625 | 0.019531 | 0.3 | 0.38 |
| 8 | Tebuconazole | 9-Decenoic acid | 0.05625 | 0.039062 | 0.7 | 0.75 |
| 9 | Tebuconazole | Trans-2-undecenoic acid | 0.05625 | 0.019531 | 0.3 | 0.38 |

Example 12: Growth Inhibition of *Sclerotinia sclerotiorum* by Pyraclostrobin, Azoxystrobin, Chlorothalonil, Fludioxonil, Difenoconazole, Propiconazole, Epoxiconazole, and Tebuconazole, in Combination with Various Exemplary Unsaturated Aliphatic Acids Working solutions of pyraclostrobin, azoxystrobin, chlorothalonil, fludioxonil, difenoconazole, propiconazole, epoxiconazole, and tebuconazole were each prepared as described above (as Compound A) and were serially diluted in PDB to the individual required concentrations for MIC testing as shown in Tables 33-42 below. Working solutions of (2E,4E)-2,4-hexadienoic acid, trans-2-hexenoic acid, trans-3-hexenoic acid, 5-hexenoic acid, 3-heptenoic acid, trans-2-octenoic acid, trans-3-octenoic acid, 3-octenoic acid, 7-octenoic acid, 3-decenoic acid, cis-3-hexenoic acid, 9-decenoic acid, trans-2-nonenoic acid, 3-nonenoic acid, (9Z)-octadecenoic acid, trans-2-decenoic acid, cis-2-decenoic acid, and trans-2-undecenoic acid (as Compound B), were each prepared as described above, and were serially diluted in PDB to the individual required concentrations for MIC testing as shown in Tables 33-42 below.

Each individual compound and combination was tested over a range of 2-fold dilutions in the synergistic growth inhibition assay, observed following an incubation period of 7 days, and the FIC Index for each combination calculated, as shown in Tables 33-42 below.

TABLE 33

Growth inhibition of *Sclerotinia sclerotiorum* by pyraclostrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Pyraclostrobin |  | 0.0075 |  |  |  |
|  |  | (2E,4E)-2,4-hexadienoic acid |  | 0.125 |  |  |
|  |  | Trans-2-hexenoic acid |  | 0.15625 |  |  |
|  |  | Trans-3-hexenoic acid |  | 0.15625 |  |  |
|  |  | 5-Hexenoic acid |  | 0.15625 |  |  |
|  |  | 3-Heptenoic acid |  | 0.078125 |  |  |
|  |  | Trans-2-octenoic acid |  | 0.039062 |  |  |
|  |  | 3-Octenoic acid |  | 0.078125 |  |  |
|  |  | Trans-3-octenoic acid |  | 0.039062 |  |  |
|  |  | 7-Octenoic acid |  | 0.039062 |  |  |
|  |  | Trans-2-nonenoic acid |  | 0.019531 |  |  |
|  |  | 3-Nonenoic acid |  | 0.019531 |  |  |
|  |  | Trans-2-decenoic acid |  | 0.019531 |  |  |
|  |  | 3-Decenoic acid |  | 0.039062 |  |  |
|  |  | 9-Decenoic acid |  | 0.039062 |  |  |
|  |  | Trans-2-undecenoic acid |  | 0.019531 |  |  |
|  |  | (9Z)-octadecenoic acid |  | 5.0 |  |  |
| 1 | Pyraclostrobin | (2E,4E)-2,4-hexadienoic acid | 0.001875 | 0.015625 | 8 | 0.38 |
| 2 | Pyraclostrobin | Trans-2-hexenoic acid | 0.000937 | 0.009765 | 10 | 0.19 |
| 3 | Pyraclostrobin | Trans-3-hexenoic acid | 0.000937 | 0.019531 | 21 | 0.25 |
| 4 | Pyraclostrobin | 5-Hexenoic acid | 0.000937 | 0.019531 | 21 | 0.25 |
| 5 | Pyraclostrobin | 3-Heptenoic acid | 0.000937 | 0.009766 | 10 | 0.25 |
| 6 | Pyraclostrobin | Trans-2-octenoic acid | 0.000469 | 0.004882 | 10 | 0.19 |
| 7 | Pyraclostrobin | 3-Octenoic acid | 0.000469 | 0.004882 | 10 | 0.13 |
| 8 | Pyraclostrobin | Trans-3-octenoic acid | 0.000469 | 0.004882 | 10 | 0.19 |
| 9 | Pyraclostrobin | 7-Octenoic acid | 0.000469 | 0.004882 | 10 | 0.19 |
| 10 | Pyraclostrobin | Trans-2-nonenoic acid | 0.000469 | 0.004882 | 10 | 0.31 |
| 11 | Pyraclostrobin | 3-Nonenoic acid | 0.000469 | 0.004882 | 10 | 0.31 |
| 12 | Pyraclostrobin | Trans-2-decenoic acid | 0.000937 | 0.002441 | 3 | 0.25 |
| 13 | Pyraclostrobin | 3-Decenoic acid | 0.000234 | 0.002441 | 10 | 0.09 |
| 14 | Pyraclostrobin | 9-Decenoic acid | 0.000469 | 0.004882 | 10 | 0.19 |
| 15 | Pyraclostrobin | Trans-2-undecenoic acid | 0.000469 | 0.004882 | 10 | 0.31 |
| 16 | Pyraclostrobin | (9Z)-octadecenoic acid | 0.00375 | 2.5 | 667 | 1.00 |

TABLE 34

Growth inhibition of *Sclerotinia sclerotiorum* by pyraclostrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Pyraclostrobin |  | 0.00375 |  |  |  |
|  |  | Trans-3-hexenoic acid |  | 0.15625 |  |  |
|  |  | Cis-3-hexenoic acid |  | 0.15625 |  |  |
|  |  | Trans-2-decenoic acid |  | 0.019531 |  |  |
|  |  | Cis-2-decenoic acid |  | 0.019531 |  |  |
| 1 | Pyraclostrobin | Trans-3-hexenoic acid | 0.001875 | 0.039062 | 21 | 0.75 |
| 2 | Pyraclostrobin | Cis-3-hexenoic acid | 0.001875 | 0.039062 | 21 | 0.75 |
| 3 | Pyraclostrobin | Trans-2-decenoic acid | 0.0009375 | 0.002441 | 3 | 0.38 |
| 4 | Pyraclostrobin | Cis-2-decenoic acid | 0.0009375 | 0.002441 | 3 | 0.38 |

TABLE 35

Growth inhibition of *Sclerotinia sclerotiorum* by azoxystrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Azoxystrobin |  | 0.15 |  |  |  |
|  |  | Trans-3-hexenoic acid |  | 0.15625 |  |  |
|  |  | 5-Hexenoic acid |  | 0.15625 |  |  |
|  |  | 3-Heptenoic acid |  | 0.078125 |  |  |

TABLE 35-continued

Growth inhibition of *Sclerotinia sclerotiorum* by azoxystrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  |  | 3-Octenoic acid |  | 0.039062 |  |  |
|  |  | Trans-3-octenoic acid |  | 0.039062 |  |  |
|  |  | 3-Nonenoic acid |  | 0.039062 |  |  |
|  |  | Trans-2-decenoic acid |  | 0.009766 |  |  |
|  |  | 3-Decenoic acid |  | 0.039062 |  |  |
|  |  | 9-Decenoic acid |  | 0.039062 |  |  |
| 1 | Azoxystrobin | Trans-3-hexenoic acid | 0.0375 | 0.039062 | 1 | 0.50 |
| 2 | Azoxystrobin | 5-Hexenoic acid | 0.0375 | 0.039062 | 1 | 0.50 |
| 3 | Azoxystrobin | 3-Heptenoic acid | 0.0375 | 0.019531 | 0.5 | 0.50 |
| 4 | Azoxystrobin | 3-Octenoic acid | 0.0375 | 0.019531 | 0.5 | 0.75 |
| 5 | Azoxystrobin | Trans-3-octenoic acid | 0.01875 | 0.009766 | 0.5 | 0.38 |
| 6 | Azoxystrobin | 3-Nonenoic acid | 0.0375 | 0.019531 | 0.5 | 0.75 |
| 7 | Azoxystrobin | Trans-2-decenoic acid | 0.0375 | 0.004882 | 0.1 | 0.75 |
| 8 | Azoxystrobin | 3-Decenoic acid | 0.01875 | 0.009766 | 0.5 | 0.38 |
| 9 | Azoxystrobin | 9-Decenoic acid | 0.01875 | 0.009766 | 0.5 | 0.38 |

TABLE 36

Growth inhibition of *Sclerotinia sclerotiorum* by chlorothalonil, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Chlorothalonil |  | $3.125 \times 10^{-5}$ |  |  |  |
|  |  | Trans-2-nonenoic acid |  | 0.039062 |  |  |
|  |  | 3-Nonenoic acid |  | 0.039062 |  |  |
|  |  | 9-Decenoic acid |  | 0.039062 |  |  |
| 1 | Chlorothalonil | Trans-2-nonenoic acid | $3.906 \times 10^{-6}$ | 0.009766 | 2500 | 0.38 |
| 2 | Chlorothalonil | 3-Nonenoic acid | $7.813 \times 10^{-6}$ | 0.019531 | 2500 | 0.75 |
| 3 | Chlorothalonil | 9-Decenoic acid | $7.813 \times 10^{-6}$ | 0.019531 | 2500 | 0.75 |

TABLE 37

Growth inhibition of *Sclerotinia sclerotiorum* by fludioxonil, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Fludioxonil |  | 0.000164 |  |  |  |
|  |  | Trans-2-octenoic acid |  | 0.078125 |  |  |
|  |  | 3-Octenoic acid |  | 0.078125 |  |  |
|  |  | Trans-2-nonenoic acid |  | 0.078125 |  |  |
|  |  | 3-Nonenoic acid |  | 0.078125 |  |  |
|  |  | Trans-2-decenoic acid |  | 0.039062 |  |  |
|  |  | 9-Decenoic acid |  | 0.15625 |  |  |
| 1 | Fludioxonil | Trans-2-octenoic acid | $8.203 \times 10^{-5}$ | 0.019531 | 238 | 0.75 |
| 2 | Fludioxonil | 3-Octenoic acid | $8.203 \times 10^{-5}$ | 0.019531 | 238 | 0.75 |
| 3 | Fludioxonil | Trans-2-nonenoic acid | $8.203 \times 10^{-5}$ | 0.009766 | 119 | 0.63 |
| 4 | Fludioxonil | 3-Nonenoic acid | $8.203 \times 10^{-5}$ | 0.009766 | 119 | 0.63 |
| 5 | Fludioxonil | Trans-2-decenoic acid | $8.203 \times 10^{-5}$ | 0.009766 | 119 | 0.75 |
| 6 | Fludioxonil | 9-Decenoic acid | $8.203 \times 10^{-5}$ | 0.019531 | 238 | 0.63 |

TABLE 38

Growth inhibition of *Sclerotinia sclerotiorum* by difenoconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Difenoconazole | | 0.0255 | | | |
| | | Trans-2-octenoic acid | | 0.078125 | | |
| | | Trans-2-nonenoic acid | | 0.039062 | | |
| | | 3-Nonenoic acid | | 0.078125 | | |
| | | Trans-2-decenoic acid | | 0.019531 | | |
| | | 3-decenoic acid | | 0.039062 | | |
| | | 9-Decenoic acid | | 0.078125 | | |
| | | Trans-2-undecenoic acid | | 0.039062 | | |
| 1 | Difenoconazole | Trans-2-octenoic acid | 0.006375 | 0.019531 | 3.1 | 0.50 |
| 2 | Difenoconazole | Trans-2-nonenoic acid | 0.006375 | 0.009766 | 1.5 | 0.50 |
| 3 | Difenoconazole | 3-Nonenoic acid | 0.006375 | 0.009766 | 1.5 | 0.38 |
| 4 | Difenoconazole | Trans-2-decenoic acid | 0.006375 | 0.009766 | 1.5 | 0.75 |
| 5 | Difenoconazole | 3-Decenoic acid | 0.006375 | 0.019531 | 3.1 | 0.75 |
| 6 | Difenoconazole | 9-Decenoic acid | 0.006375 | 0.019531 | 3.1 | 0.50 |
| 7 | Difenoconazole | Trans-2-undecenoic acid | 0.006375 | 0.009766 | 1.5 | 0.50 |

TABLE 39

Growth inhibition of *Sclerotinia sclerotiorum* by propiconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Propiconazole | | 0.089 | | | |
| | | 3-Heptenoic acid | | 0.078125 | | |
| | | Trans-2-nonenoic acid | | 0.019531 | | |
| | | Trans-2-decenoic acid | | 0.019531 | | |
| | | 9-Decenoic acid | | 0.039062 | | |
| | | Trans-2-undecenoic acid | | 0.039062 | | |
| 1 | Propiconazole | 3-Heptenoic acid | 0.02225 | 0.019531 | 0.9 | 0.50 |
| 2 | Propiconazole | Trans-2-nonenoic acid | 0.02225 | 0.009766 | 0.4 | 0.75 |
| 3 | Propiconazole | Trans-2-decenoic acid | 0.02225 | 0.009766 | 0.4 | 0.75 |
| 4 | Propiconazole | 9-Decenoic acid | 0.02225 | 0.009766 | 0.9 | 0.38 |
| 5 | Propiconazole | Trans-2-undecenoic acid | 0.02225 | 0.009766 | 0.4 | 0.75 |

TABLE 40

Growth inhibition of *Sclerotinia sclerotiorum* by epoxiconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Epoxiconazole | | 0.03 | | | |
| | | Trans-2-nonenoic acid | | 0.019531 | | |
| | | Trans-2-decenoic acid | | 0.019531 | | |
| | | 3-Decenoic acid | | 0.078125 | | |
| | | 9-Decenoic acid | | 0.078125 | | |
| 1 | Epoxiconazole | Trans-2-nonenoic acid | 0.0075 | 0.009766 | 1.3 | 0.75 |
| 2 | Epoxiconazole | Trans-2-decenoic acid | 0.0075 | 0.009766 | 1.3 | 0.75 |
| 3 | Epoxiconazole | 3-Decenoic acid | 0.0075 | 0.019531 | 2.6 | 0.50 |
| 4 | Epoxiconazole | 9-Decenoic acid | 0.0075 | 0.019531 | 2.6 | 0.50 |

TABLE 41

Growth inhibition of *Sclerotinia sclerotiorum* by tebuconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.1125 | | | |
| | | Trans-3-hexenoic acid | | 0.15625 | | |
| | | 3-Heptenoic acid | | 0.078125 | | |
| | | Trans-2-nonenoic acid | | 0.039062 | | |
| | | 3-Nonenoic acid | | 0.039062 | | |
| | | 3-Decenoic acid | | 0.078125 | | |
| | | 9-Decenoic acid | | 0.078125 | | |
| | | Trans-2-undecenoic acid | | 0.039062 | | |
| 1 | Tebuconazole | Trans-3-hexenoic acid | 0.05625 | 0.039062 | 0.7 | 0.75 |
| 2 | Tebuconazole | 3-Heptenoic acid | 0.05625 | 0.019531 | 0.3 | 0.75 |
| 3 | Tebuconazole | Trans-2-nonenoic acid | 0.028125 | 0.004882 | 0.2 | 0.38 |
| 4 | Tebuconazole | 3-Nonenoic acid | 0.05625 | 0.009766 | 0.2 | 0.75 |
| 5 | Tebuconazole | 3-Decenoic acid | 0.028125 | 0.009766 | 0.3 | 0.38 |
| 6 | Tebuconazole | 9-Decenoic acid | 0.028125 | 0.009766 | 0.3 | 0.38 |
| 7 | Tebuconazole | Trans-2-undecenoic acid | 0.05625 | 0.009766 | 0.2 | 0.75 |

TABLE 42

Growth inhibition of *Sclerotinia sclerotiorum* by tebuconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.1125 | | | |
| | | Trans-3-octanoic acid | | 0.039062 | | |
| | | Trans-2-decenoic acid | | 0.019531 | | |
| 1 | Tebuconazole | Trans-3-octanoic acid | 0.028125 | 0.019531 | 0.7 | 0.75 |
| 2 | Tebuconazole | Trans-2-decenoic acid | 0.028125 | 0.004882 | 0.2 | 0.50 |

Example 13: Growth Inhibition of *Botrytis cinerea* by Pyraclostrobin, Azoxystrobin, Chlorothalonil, Cyprodinil, Metalaxyl, Epoxiconazole, and Tebuconazole, in Combination with Various Exemplary Unsaturated Aliphatic Acids Working solutions of pyraclostrobin, azoxystrobin, chlorothalonil, cyprodinil, metalaxyl, epoxiconazole, and tebuconazole were each prepared as described above (as Compound A) and were serially diluted in PDB to the individual required concentrations for MIC testing as shown in Tables 43-50 below. Working solutions of (2E,4E)-2,4-hexadienoic acid, trans-2-hexenoic acid, trans-3-hexenoic acid, 5-hexenoic acid, 3-heptenoic acid, trans-2-octenoic acid, trans-3-octenoic acid, 3-octenoic acid, 7-octenoic acid, 3-decenoic acid, 9-decenoic acid, trans-2-nonenoic acid, 3-nonenoic acid, (9Z)-octadecenoic acid, trans-2-decenoic acid, and trans-2-undecenoic acid (as Compound B), were each prepared as described above, and were serially diluted in PDB to the individual required concentrations for MIC testing as shown in Tables 43-50 below.

Each individual compound and combination was tested over a range of 2-fold dilutions in the synergistic growth inhibition assay, observed following an incubation period of 48 hours, and the FIC Index for each combination calculated, as shown in Tables 43-50 below.

TABLE 43

Growth inhibition of *Botrytis cinerea* by pyraclostrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.001875 | | | |
| | | (2E,4E)-2,4-hexadienoic acid | | 0.0625 | | |
| | | Trans-2-hexenoic acid | | 0.078125 | | |
| | | Trans-3-hexenoic acid | | 0.15625 | | |
| | | 4-Hexenoic acid | | 0.3125 | | |
| | | 5-Hexenoic acid | | 0.15625 | | |
| | | 3-Heptenoic acid | | 0.078125 | | |
| | | Trans-2-octenoic acid | | 0.039062 | | |

TABLE 43-continued

Growth inhibition of *Botrytis cinerea* by pyraclostrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | | 3-Octenoic acid | | 0.078125 | | |
| | | 7-Octenoic acid | | 0.078125 | | |
| | | Trans-2-nonenoic acid | | 0.078125 | | |
| | | 3-Nonenoic acid | | 0.078125 | | |
| | | Trans-2-decenoic acid | | 0.019531 | | |
| | | 3-Decenoic acid | | 0.078125 | | |
| | | 9-Decenoic acid | | 0.15625 | | |
| | | Trans-2-undecenoic acid | | 0.15625 | | |
| 1 | Pyraclostrobin | (2E,4E)-2,4-hexadienoic acid | 0.000469 | 0.007812 | 17 | 0.38 |
| 2 | Pyraclostrobin | Trans-2-hexenoic acid | 0.000937 | 0.009766 | 10 | 0.63 |
| 3 | Pyraclostrobin | Trans-3-hexenoic acid | 0.000469 | 0.009766 | 21 | 0.31 |
| 4 | Pyraclostrobin | 4-Hexenoic acid | 0.000937 | 0.019531 | 21 | 0.56 |
| 5 | Pyraclostrobin | 5-Hexenoic acid | 0.000469 | 0.009766 | 21 | 0.31 |
| 6 | Pyraclostrobin | 3-Heptenoic acid | 0.000469 | 0.004882 | 10 | 0.31 |
| 7 | Pyraclostrobin | Trans-2-octenoic acid | 0.000234 | 0.002441 | 10 | 0.19 |
| 8 | Pyraclostrobin | 3-Octenoic acid | 0.000234 | 0.002441 | 10 | 0.16 |
| 9 | Pyraclostrobin | Trans-3-octenoic acid | 0.000469 | 0.004882 | 10 | 0.31 |
| 10 | Pyraclostrobin | 7-Octenoic acid | 0.000469 | 0.004882 | 10 | 0.31 |
| 11 | Pyraclostrobin | Trans-2-nonenoic acid | 0.000469 | 0.004882 | 10 | 0.31 |
| 12 | Pyraclostrobin | 3-Nonenoic acid | 0.000469 | 0.004882 | 10 | 0.31 |
| 13 | Pyraclostrobin | Trans-2-decenoic acid | 0.000469 | 0.004882 | 10 | 0.50 |
| 14 | Pyraclostrobin | 3-Decenoic acid | 0.000234 | 0.004882 | 21 | 0.19 |
| 15 | Pyraclostrobin | 9-Decenoic acid | 0.000234 | 0.002441 | 10 | 0.14 |
| 16 | Pyraclostrobin | Trans-2-undecenoic acid | 0.000937 | 0.009766 | 10 | 0.56 |

TABLE 44

Growth inhibition of *Botrytis cinerea* by pyraclostrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Pyraclostrobin | | 0.001875 | | | |
| | | (2E,4E)-2,4-hexadienoic acid | | 0.0625 | | |
| | | Trans-2-hexenoic acid | | 0.039062 | | |
| | | Trans-3-hexenoic acid | | 0.15625 | | |
| | | 5-Hexenoic acid | | 0.078125 | | |
| | | 3-Heptenoic acid | | 0.078125 | | |
| | | Trans-2-octenoic acid | | 0.039062 | | |
| | | 3-Octenoic acid | | 0.078125 | | |
| | | 7-Octenoic acid | | 0.039062 | | |
| | | Trans-2-nonenoic acid | | 0.039062 | | |
| | | 3-Nonenoic acid | | 0.078125 | | |
| | | Trans-2-decenoic acid | | 0.078125 | | |
| | | 3-Decenoic acid | | 0.078125 | | |
| | | 9-Decenoic acid | | 0.078125 | | |
| | | Trans-2-undecenoic acid | | 0.078125 | | |
| 1 | Pyraclostrobin | (2E,4E)-2,4-hexadienoic acid | 0.000234 | 0.003906 | 17 | 0.19 |
| 2 | Pyraclostrobin | Trans-2-hexenoic acid | 0.000234 | 0.002441 | 10 | 0.19 |
| 3 | Pyraclostrobin | Trans-3-hexenoic acid | 0.000469 | 0.009766 | 21 | 0.31 |
| 4 | Pyraclostrobin | 5-Hexenoic acid | 0.000469 | 0.009766 | 21 | 0.38 |
| 5 | Pyraclostrobin | 3-Heptenoic acid | 0.000469 | 0.004882 | 10 | 0.19 |
| 6 | Pyraclostrobin | Trans-2-octenoic acid | 0.000234 | 0.002441 | 10 | 0.19 |
| 7 | Pyraclostrobin | 3-Octenoic acid | 0.000469 | 0.004882 | 10 | 0.31 |
| 8 | Pyraclostrobin | 7-Octenoic acid | 0.000234 | 0.002441 | 10 | 0.19 |
| 9 | Pyraclostrobin | Trans-2-nonenoic acid | 0.000234 | 0.002441 | 10 | 0.19 |
| 10 | Pyraclostrobin | 3-Nonenoic acid | 0.000469 | 0.004882 | 10 | 0.31 |
| 11 | Pyraclostrobin | Trans-2-decenoic acid | 0.000234 | 0.002441 | 10 | 0.16 |
| 12 | Pyraclostrobin | 3-Decenoic acid | 0.000234 | 0.004882 | 21 | 0.19 |
| 13 | Pyraclostrobin | 9-Decenoic acid | 0.000234 | 0.002441 | 10 | 0.16 |
| 14 | Pyraclostrobin | Trans-2-undecenoic acid | 0.000234 | 0.002441 | 10 | 0.16 |

TABLE 45

Growth inhibition of *Botrytis cinerea* by azoxystrobin, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Azoxystrobin | | 0.075 | | | |
| | | Trans-2-hexenoic acid | | 0.15625 | | |
| | | Trans-3-hexenoic acid | | 0.3125 | | |
| | | 4-Hexenoic acid | | 0.3125 | | |
| | | 5-Hexenoic acid | | 0.3125 | | |
| | | Trans-2-octenoic acid | | 0.078125 | | |
| | | 3-Octenoic acid | | 0.078125 | | |
| | | Trans-3-octenoic acid | | 0.15625 | | |
| | | 7-Octenoic acid | | 0.15625 | | |
| | | Trans-2-nonenoic acid | | 0.039062 | | |
| | | 3-Nonenoic acid | | 0.078125 | | |
| | | Trans-2-decenoic acid | | 0.039062 | | |
| | | 3-Decenoic acid | | 0.078125 | | |
| | | 9-Decenoic acid | | 0.078125 | | |
| | | Trans-2-undecenoic acid | | 0.078125 | | |
| 1 | Azoxystrobin | Trans-2-hexenoic acid | 0.0375 | 0.039062 | 1 | 0.75 |
| 3 | Azoxystrobin | Trans-3-hexenoic acid | 0.0375 | 0.078125 | 2 | 0.75 |
| 4 | Azoxystrobin | 4-Hexenoic acid | 0.0375 | 0.078125 | 2 | 0.75 |
| 5 | Azoxystrobin | 5-Hexenoic acid | 0.0375 | 0.078125 | 2 | 0.75 |
| 6 | Azoxystrobin | Trans-2-octenoic acid | 0.009375 | 0.009766 | 1 | 0.25 |
| 7 | Azoxystrobin | 3-Octenoic acid | 0.01875 | 0.019531 | 1 | 0.50 |
| 8 | Azoxystrobin | Trans-3-octenoic acid | 0.01875 | 0.019531 | 1 | 0.38 |
| 9 | Azoxystrobin | 7-Octenoic acid | 0.01875 | 0.019531 | 1 | 0.38 |
| 10 | Azoxystrobin | Trans-2-nonenoic acid | 0.01875 | 0.019531 | 1 | 0.75 |
| 11 | Azoxystrobin | 3-Nonenoic acid | 0.01875 | 0.019531 | 1 | 0.50 |
| 12 | Azoxystrobin | Trans-2-decenoic acid | 0.009375 | 0.009766 | 1 | 0.38 |
| 13 | Azoxystrobin | 3-Decenoic acid | 0.009375 | 0.019531 | 2 | 0.38 |
| 14 | Azoxystrobin | 9-Decenoic acid | 0.01875 | 0.019531 | 1 | 0.50 |
| 15 | Azoxystrobin | Trans-2-undecenoic acid | 0.01875 | 0.019531 | 1 | 0.50 |

TABLE 46

Growth inhibition of *Botrytis cinerea* by chlorothalonil, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Chlorothalonil | | $1.758 \times 10^{-5}$ | | | |
| | | Trans-2-nonenoic acid | | 0.019531 | | |
| | | 9-Decenoic acid | | 0.039062 | | |
| 1 | Chlorothalonil | Trans-2-nonenoic acid | $4.395 \times 10^{-6}$ | 0.004882 | 1111 | 0.50 |
| 2 | Chlorothalonil | 9-Decenoic acid | $4.395 \times 10^{-6}$ | 0.019531 | 4444 | 0.75 |

TABLE 47

Growth inhibition of *Botrytis cinerea* by cyprodinil, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Cyprodinil | | 0.0045 | | | |
| | | 3-Heptenoic acid | | 0.078125 | | |
| | | Trans-2-octenoic acid | | 0.078125 | | |
| | | 3-Octenoic acid | | 0.078125 | | |
| | | 7-Octenoic acid | | 0.078125 | | |
| | | Trans-2-nonenoic acid | | 0.078125 | | |
| | | 3-Nonenoic acid | | 0.078125 | | |
| | | 3-Decenoic acid | | 0.078125 | | |
| | | 9-Decenoic acid | | 0.078125 | | |
| | | Trans-2-undecenoic acid | | 0.078125 | | |

TABLE 47-continued

Growth inhibition of *Botrytis cinerea* by cyprodinil, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| 1 | Cyprodinil | 3-Heptenoic acid | 0.001125 | 0.039062 | 35 | 0.75 |
| 2 | Cyprodinil | Trans-2-octenoic acid | 0.001125 | 0.039062 | 35 | 0.75 |
| 3 | Cyprodinil | 3-Octenoic acid | 0.001125 | 0.039062 | 35 | 0.75 |
| 4 | Cyprodinil | 7-Octenoic acid | 0.000562 | 0.019531 | 35 | 0.38 |
| 5 | Cyprodinil | Trans-2-nonenoic acid | 0.001125 | 0.039062 | 35 | 0.75 |
| 6 | Cyprodinil | 3-Nonenoic acid | 0.001125 | 0.039062 | 35 | 0.75 |
| 7 | Cyprodinil | 3-Decenoic acid | 0.000562 | 0.039062 | 69 | 0.63 |
| 8 | Cyprodinil | 9-Decenoic acid | 0.000562 | 0.019531 | 35 | 0.38 |
| 9 | Cyprodinil | Trans-2-undecenoic acid | 0.000562 | 0.019531 | 35 | 0.38 |

TABLE 48

Growth inhibition of *Botrytis cinerea* by metalaxyl, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Metalaxyl |  | 0.316 |  |  |  |
|  |  | 3-Nonenoic acid |  | 0.078125 |  |  |
|  |  | 9-Decenoic acid |  | 0.078125 |  |  |
|  |  | Trans-2-undecenoic acid |  | 0.078125 |  |  |
| 1 | Metalaxyl | 3-Nonenoic acid | 0.079 | 0.039062 | 0.5 | 0.75 |
| 2 | Metalaxyl | 9-Decenoic acid | 0.079 | 0.039062 | 0.5 | 0.75 |
| 3 | Metalaxyl | Trans-2-undecenoic acid | 0.079 | 0.039062 | 0.5 | 0.75 |

TABLE 49

Growth inhibition of *Botrytis cinerea* by epoxiconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
|  | Epoxiconazole |  | 0.03 |  |  |  |
|  |  | 3-Heptenoic acid |  | 0.078125 |  |  |
|  |  | Trans-2-octenoic acid |  | 0.15625 |  |  |
|  |  | 3-Octenoic acid |  | 0.078125 |  |  |
|  |  | Trans-3-octenoic acid |  | 0.078125 |  |  |
|  |  | Trans-2-nonenoic acid |  | 0.15625 |  |  |
|  |  | 3-Nonenoic acid |  | 0.078125 |  |  |
|  |  | Trans-2-decenoic acid |  | 0.078125 |  |  |
|  |  | 3-Decenoic acid |  | 0.078125 |  |  |
|  |  | 9-Decenoic acid |  | 0.15625 |  |  |
|  |  | Trans-2-undecenoic acid |  | 0.078125 |  |  |
|  |  | (9Z)-octadecenoic acid |  | 5.0 |  |  |
| 1 | Epoxiconazole | 3-Heptenoic acid | 0.0075 | 0.039062 | 5 | 0.75 |
| 2 | Epoxiconazole | Trans-2-octenoic acid | 0.0075 | 0.039062 | 5 | 0.50 |
| 3 | Epoxiconazole | 3-Octenoic acid | 0.0075 | 0.039062 | 5 | 0.75 |
| 4 | Epoxiconazole | Trans-3-octenoic acid | 0.0075 | 0.039062 | 5 | 0.75 |
| 5 | Epoxiconazole | Trans-2-nonenoic acid | 0.00375 | 0.019531 | 5 | 0.25 |
| 6 | Epoxiconazole | 3-Nonenoic acid | 0.00375 | 0.019531 | 5 | 0.38 |
| 7 | Epoxiconazole | Trans-2-decenoic acid | 0.00375 | 0.019531 | 5 | 0.38 |
| 8 | Epoxiconazole | 3-Decenoic acid | 0.001875 | 0.019531 | 10 | 0.31 |
| 9 | Epoxiconazole | 9-Decenoic acid | 0.00375 | 0.019531 | 5 | 0.25 |
| 10 | Epoxiconazole | Trans-2-undecenoic acid | 0.0075 | 0.039062 | 5 | 0.75 |
| 11 | Epoxiconazole | (9Z)-octadecenoic acid | 0.015 | 2.5 | 167 | 1.00 |

TABLE 50

Growth inhibition of *Botrytis cinerea* by tebuconazole, in combination with various exemplary unsaturated aliphatic acids

| Combination | Compound A | Compound B | MIC (A) (mg/mL) | MIC (B) (mg/mL) | Ratio Compound B/ Compound A | FIC Index |
|---|---|---|---|---|---|---|
| | Tebuconazole | | 0.1125 | | | |
| | | 5-Hexenoic acid | | 0.15625 | | |
| | | Trans-2-octenoic acid | | 0.039062 | | |
| | | Trans-2-decenoic acid | | 0.039062 | | |
| | | 3-Decenoic acid | | 0.078125 | | |
| | | 9-Decenoic acid | | 0.039062 | | |
| | | Trans-2-undecenoic acid | | 0.039062 | | |
| | | (9Z)-octadecenoic acid | | 5.0 | | |
| 1 | Tebuconazole | 5-Hexenoic acid | 0.028125 | 0.039062 | 1.4 | 0.50 |
| 2 | Tebuconazole | Trans-2-octenoic acid | 0.014062 | 0.009766 | 0.7 | 0.38 |
| 3 | Tebuconazole | Trans-2-decenoic acid | 0.028125 | 0.019531 | 0.7 | 0.75 |
| 4 | Tebuconazole | 3-Decenoic acid | 0.028125 | 0.019531 | 0.7 | 0.50 |
| 5 | Tebuconazole | 9-Decenoic acid | 0.014062 | 0.019531 | 1.4 | 0.63 |
| 6 | Tebuconazole | Trans-2-undecenoic acid | 0.028125 | 0.019531 | 0.7 | 0.75 |
| 7 | Tebuconazole | (9Z)-octadecenoic acid | 0.015 | 2.5 | 44 | 1.00 |

Example 14: Growth Inhibition of *Botrytis cinerea* by Picoxystrobin, Mancozeb, Isopyrazam, Oxathiapiprolin, Penthiopyrad, Prothioconazole and Trifloxystrobin, in Combination with Various Exemplary C4-C10 Saturated, Unsaturated, Hydroxy-, Methyl-, Ethyl-, and Diethyl-Substituted Aliphatic Acids Working solutions of picoxystrobin, mancozeb, isopyrazam, oxathiapiprolin, penthiopyrad, prothioconazole, and trifloxystrobin, were each prepared as described above (as Compound A) and were serially diluted in PDB to the individual required concentrations for MIC testing as shown in Tables 51-59 below. Working solutions of 2-hydroxybutyric acid, 2-hydroxyhexanoic acid, 2-hydroxyoctanoic acid, 3-hydroxybutyric acid, 3-hydroxyhexanoic acid, 3-hydroxyoctanoic acid, 3-hydroxydecanoic acid, 8-hydroxyoctanoic acid, 10-hydroxydecanoic acid, 12-hydroxydodecanoic acid, 2,2-diethylbutanoic acid, 2-ethylhexanoic acid, 2-methyloctanoic acid, 2-methyldecanoic acid, 3-methylbutyric acid, 3-methylhexanoic acid, 3-methylnonanoic acid, 4-methylhexanoic acid, hexanoic acid, octanoic acid, nonanoic acid, decanoic acid, dodecanoic acid, 2,4-hexedienoic acid, trans-2-hexenoic acid, trans-2-octenoic acid, trans-3-octenoic acid, 7-octenoic acid, trans-2-nonenoic acid, trans-2-decenoic acid, 3-decenoic acid, 9-decenoic acid, trans-2-undecenoic acid, 2-hydroxybutyric acid, 3-hydroxybutyric acid, 3-hydroxyhexanoic acid, 3-hydroxyoctanoic acid, 3-hydroxydecanoic acid, 8-hydroxyoctanoic acid, 12-hydroxydodecanoic acid, 2-methyloctanoic acid, 2-methyldecanoic acid, and oleic acid (as Compound B), were each prepared as described above, and were serially diluted in PDB to the individual required concentrations for MIC testing as shown in Tables 51-59 below.

Each individual compound and combination was tested over a range of 2-fold dilutions in the synergistic growth inhibition assay, observed following an incubation period of 48 hours, and the FIC Index for each combination calculated, as shown in Tables 51-59 below.

TABLE 51

Growth inhibition of *Botrytis cinerea* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | Picoxystrobin | | 0.25 | | | |
| | | Trans-2-decenoic acid | | 0.019531 | | |
| | | 2-Hydroxybutyric acid | | 5 | | |
| | | 2-Hydroxyhexanoic acid | | 1.25 | | |
| | | 2-Hydroxyoctanoic acid | | 0.625 | | |
| | | 3-Hydroxybutyric acid | | 10 | | |
| | | 3-Hydroxyhexanoic acid | | 2.5 | | |
| | | 3-Hydroxyoctanoic acid | | 0.625 | | |
| | | 3-Hydroxydecanoic acid | | 0.0625 | | |
| | | 8-Hydroxyoctanoic acid | | 1.25 | | |
| | | 10-Hydroxydecanoic acid | | 0.25 | | |
| | | 12-Hydroxydodecanoic acid | | 0.1 | | |
| | | 2,2-Diethylbutanoic acid | | 0.25 | | |
| | | 2-Ethylhexanoic acid | | 0.15625 | | |
| | | 2-Methyloctanoic acid | | 0.039062 | | |
| | | 2-Methyldecanoic acid | | 0.0078125 | | |
| | | 3-Methylbutyric acid | | 0.3125 | | |
| | | 3-Methylhexanoic acid | | 0.125 | | |
| | | 3-Methylnonanoic acid | | 0.015625 | | |
| | | 4-Methylhexanoic acid | | 0.078125 | | |

TABLE 51-continued

Growth inhibition of *Botrytis cinerea* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| 1 | Picoxystrobin | Trans-2-decenoic acid | 0.015625 | 0.004883 | 0.31 | 0.31 |
| 2 | Picoxystrobin | 2-Hydroxybutyric acid | 0.015625 | 0.625 | 40 | 0.19 |
| 3 | Picoxystrobin | 2-Hydroxyhexanoic acid | 0.015625 | 0.3125 | 20 | 0.31 |
| 4 | Picoxystrobin | 2-Hydroxyoctanoic acid | 0.015625 | 0.078125 | 5 | 0.19 |
| 5 | Picoxystrobin | 3-Hydroxybutyric acid | 0.015625 | 1.25 | 80 | 0.19 |
| 6 | Picoxystrobin | 3-Hydroxyhexanoic acid | 0.015625 | 0.3125 | 20 | 0.19 |
| 7 | Picoxystrobin | 3-Hydroxyoctanoic acid | 0.03125 | 0.15625 | 5 | 0.38 |
| 8 | Picoxystrobin | 3-Hydroxydecanoic acid | 0.015625 | 0.015625 | 1 | 0.31 |
| 9 | Picoxystrobin | 8-Hydroxyoctanoic acid | 0.015625 | 0.3125 | 20 | 0.31 |
| 10 | Picoxystrobin | 10-Hydroxydecanoic acid | 0.015625 | 0.0625 | 4 | 0.31 |
| 11 | Picoxystrobin | 12-Hydroxydodecanoic acid | 0.03125 | 0.025 | 0.8 | 0.38 |
| 12 | Picoxystrobin | 2,2-Diethylbutanoic acid | 0.015625 | 0.03125 | 2 | 0.19 |
| 13 | Picoxystrobin | 2-Ethylhexanoic acid | 0.015625 | 0.019531 | 1.25 | 0.19 |
| 14 | Picoxystrobin | 2-Methyloctanoic acid | 0.0078125 | 0.004883 | 0.6 | 0.16 |
| 15 | Picoxystrobin | 2-Methyldecanoic acid | 0.015625 | 0.003906 | 0.25 | 0.56 |
| 16 | Picoxystrobin | 3-Methylbutyric acid | 0.015625 | 0.078125 | 5 | 0.31 |
| 17 | Picoxystrobin | 3-Methylhexanoic acid | 0.015625 | 0.015625 | 1 | 0.19 |
| 18 | Picoxystrobin | 3-Methylnonanoic acid | 0.015625 | 0.001953 | 0.13 | 0.19 |
| 19 | Picoxystrobin | 4-Methylhexanoic acid | 0.015625 | 0.019531 | 1.25 | 0.31 |

TABLE 52

Growth inhibition of *Botrytis cinerea* by picoxystrobin, in combination with various exemplary unsaturated aliphatic acids.

| Combination | Compound A | Compound B | MIC (A) (mg/mL) | MIC(B) (mg/mL) | Ratio Compound B/ Compound A | FIC Index |
|---|---|---|---|---|---|---|
|  | Picoxystrobin |  | 0.25 |  |  |  |
|  |  | Decanoic acid |  | 0.015625 |  |  |
|  |  | Trans-2-hexenoic acid |  | 0.15625 |  |  |
|  | Picoxystrobin | Decanoic acid | 0.03125 | 0.0078125 | 0.25 | 0.63 |
|  | Picoxystrobin | Trans-2-hexenoic acid | 0.0625 | 0.019531 | 0.3 | 0.38 |

TABLE 53

Growth inhibition of *Botrytis cinerea* by mancozeb, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Mancozeb |  | 0.03125 |  |  |  |
|  |  | Trans-2-octenoic acid |  | 0.039062 |  |  |
|  |  | 3-Decenoic acid |  | 0.039062 |  |  |
| 1 | Mancozeb | Trans-2-octenoic acid | 0.003906 | 0.019531 | 5 | 0.63 |
| 2 | Mancozeb | 3-Decenoic acid | 0.003906 | 0.019531 | 5 | 0.63 |

TABLE 54

Growth inhibition of *Botrytis cinerea* by isopyrazam, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Isopyrazam |  | 0.03125 |  |  |  |
|  |  | Hexanoic acid |  | 0.15625 |  |  |
|  |  | Octanoic acid |  | 0.3125 |  |  |

TABLE 54-continued

Growth inhibition of *Botrytis cinerea* by isopyrazam, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | | Decanoic acid | | 0.015625 | | |
| | | Dodecanoic acid | | 0.05 | | |
| | | 2,4-Dihexenoic acid | | 0.125 | | |
| | | 5-Hexenoic acid | | 0.3125 | | |
| | | 7-Octenoic acid | | 0.3125 | | |
| | | 3-Nonenoic acid | | 0.078125 | | |
| | | Trans-3-octenoic acid | | 0.039062 | | |
| | | 3-Decenoic acid | | 0.039062 | | |
| | | 9-Decenoic acid | | 0.078125 | | |
| | | Oleic acid | | 5 | | |
| 1 | Isopyrazam | Hexanoic acid | 0.0078125 | 0.03906 | 5 | 0.50 |
| 2 | Isopyrazam | Octanoic acid | 0.0078125 | 0.019531 | 2.5 | 0.31 |
| 3 | Isopyrazam | Decanoic acid | 0.0039062 | 0.0078125 | 2 | 0.63 |
| 4 | Isopyrazam | Dodecanoic acid | 0.0078125 | 0.0125 | 1.6 | 0.50 |
| 5 | Isopyrazam | 2,4-Dihexenoic acid | 0.0078125 | 0.0625 | 8 | 0.75 |
| 6 | Isopyrazam | 5-Hexenoic acid | 0.0078125 | 0.039062 | 5 | 0.38 |
| 7 | Isopyrazam | 7-Octenoic acid | 0.0078125 | 0.019531 | 2.5 | 0.31 |
| 8 | Isopyrazam | 3-Nonenoic acid | 0.0078125 | 0.019531 | 2.5 | 0.50 |
| 9 | Isopyrazam | Trans-3-octenoic acid | 0.0078125 | 0.019531 | 2.5 | 0.75 |
| 10 | Isopyrazam | 3-Decenoic acid | 0.0078125 | 0.019531 | 2.5 | 0.75 |
| 11 | Isopyrazam | 9-Decenoic acid | 0.0078125 | 0.019531 | 2.5 | 0.50 |
| 12 | Isopyrazam | Oleic acid | 0.03125 | 5 | 160 | 2.0 |

TABLE 55

Growth inhibition of *Botrytis cinerea* by oxathiapiprolin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | Oxathiapiprolin | | 0.5 | | | |
| | | 12-Hydroxydodecanoic acid | | 0.1 | | |
| | | 2-Hydroxybutyric acid | | | | |
| 1 | Oxathiapiprolin | 12-Hydroxydodecanoic acid | 0.125 | 0.025 | 0.2 | 0.50 |
| 2 | Oxathiapiprolin | 2-Hydroxybutyric acid | 0.125 | 1.25 | 10 | 0.75 |

TABLE 56

Growth inhibition of *Botrytis cinerea* by penthiopyrad, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | Penthiopyrad | | 0.25 | | | |
| | | Hexanoic acid | | 0.15625 | | |
| | | Octanoic acid | | 0.3125 | | |
| | | Nonanoic acid | | 0.078125 | | |
| | | Decanoic acid | | 0.03125 | | |
| | | Dodecanoic acid | | 0.05 | | |
| | | (2E,4E)-2,4-Hexadienoic acid | | 0.125 | | |
| | | Trans-2-hexenoic acid | | 0.3125 | | |
| | | Trans-2-octenoic acid | | 0.078125 | | |
| | | Trans-3-octenoic acid | | 0.078125 | | |
| | | 7-Octenoic acid | | 0.3125 | | |
| | | Trans-2-nonenoic acid | | 0.15625 | | |
| | | Trans-2-decenoic acid | | 0.078125 | | |
| | | 3-Decenoic acid | | 0.078125 | | |
| | | 9-Decenoic acid | | 0.078125 | | |
| | | Trans-2-undecenoic acid | | 0.039062 | | |

TABLE 56-continued

Growth inhibition of Botrytis cinerea by penthiopyrad, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  |  | 2-Hydroxybutyric acid |  | 2.5 |  |  |
|  |  | 3-Hydroxybutyric acid |  | 10 |  |  |
|  |  | 3-Hydroxyhexanoic acid |  | 5 |  |  |
|  |  | 3-Hydroxyoctanoic acid |  | 0.625 |  |  |
|  |  | 3-Hydroxydecanoic acid |  | 0.125 |  |  |
|  |  | 8-Hydroxyoctanoic acid |  | 2.5 |  |  |
|  |  | 12-Hydroxydodecanoic acid |  | 0.1 |  |  |
|  |  | 2-Methyloctanoic acid |  | 0.3125 |  |  |
|  |  | 2-Methyldecanoic acid |  | 0.125 |  |  |
|  |  | Oleic acid |  | 5 |  |  |
| 1 | Penthiopyrad | Hexanoic acid | 0.0625 | 0.039062 | 0.6 | 0.50 |
| 2 | Penthiopyrad | Octanoic acid | 0.0625 | 0.019531 | 0.3 | 0.31 |
| 3 | Penthiopyrad | Nonanoic acid | 0.0625 | 0.019531 | 0.3 | 0.50 |
| 4 | Penthiopyrad | Decanoic acid | 0.03125 | 0.0078125 | 0.25 | 0.38 |
| 5 | Penthiopyrad | Dodecanoic acid | 0.0625 | 0.0125 | 0.2 | 0.50 |
| 6 | Penthiopyrad | (2E,4E)-2,4-Hexadienoic acid | 0.0625 | 0.0625 | 1 | 0.75 |
| 7 | Penthiopyrad | Trans-2-hexenoic acid | 0.0625 | 0.019531 | 0.3 | 0.31 |
| 8 | Penthiopyrad | Trans-2-octenoic acid | 0.0625 | 0.019531 | 0.3 | 0.50 |
| 9 | Penthiopyrad | Trans-3-octenoic acid | 0.0625 | 0.019531 | 0.3 | 0.50 |
| 10 | Penthiopyrad | 7-Octenoic acid | 0.0625 | 0.019531 | 0.3 | 0.31 |
| 11 | Penthiopyrad | Trans-2-nonenoic acid | 0.0625 | 0.009766 | 0.16 | 0.31 |
| 12 | Penthiopyrad | Trans-2-decenoic acid | 0.03125 | 0.004883 | 0.16 | 0.19 |
| 13 | Penthiopyrad | 3-Decenoic acid | 0.0625 | 0.019531 | 0.3 | 0.50 |
| 14 | Penthiopyrad | 9-Decenoic acid | 0.0625 | 0.019531 | 0.3 | 0.50 |
| 15 | Penthiopyrad | Trans-2-undecenoic acid | 0.0625 | 0.019531 | 0.3 | 0.63 |
| 16 | Penthiopyrad | 2-Hydroxybutyric acid | 0.0625 | 1.25 | 20 | 0.75 |
| 17 | Penthiopyrad | 3-Hydroxybutyric acid | 0.0625 | 2.5 | 40 | 0.50 |
| 18 | Penthiopyrad | 3-Hydroxyhexanoic acid | 0.0625 | 0.625 | 10 | 0.38 |
| 19 | Penthiopyrad | 3-Hydroxyoctanoic acid | 0.0625 | 0.15625 | 2.5 | 0.50 |
| 20 | Penthiopyrad | 3-Hydroxydecanoic acid | 0.0625 | 0.03125 | 0.5 | 0.50 |
| 21 | Penthiopyrad | 8-Hydroxyoctanoic acid | 0.03125 | 0.3125 | 10 | 0.25 |
| 22 | Penthiopyrad | 12-Hydroxydodecanoic acid | 0.0625 | 0.025 | 0.4 | 0.50 |
| 23 | Penthiopyrad | 2-Methyloctanoic acid | 0.0625 | 0.019531 | 0.3 | 0.31 |
| 24 | Penthiopyrad | 2-Methyldecanoic acid | 0.03125 | 0.0039062 | 0.13 | 0.16 |
| 25 | Penthiopyrad | Oleic acid | 0.125 | 2.5 | 20 | 1.0 |

TABLE 57

Growth inhibition of Botrytis cinerea by prothioconazole, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Prothioconazole |  | 0.03125 |  |  |  |
|  |  | 2-Hydroxybutyric acid |  | 2.5 |  |  |
| 1 | Prothioconazole | 2-Hydroxybutyric acid | 0.0078125 | 1.25 | 160 | 0.75 |

TABLE 58

Growth inhibition of Botrytis cinerea by trifloxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Trifloxystrobin |  | 0.25 |  |  |  |
|  |  | Hexanoic acid |  | 0.3125 |  |  |
|  |  | Octanoic acid |  | 0.625 |  |  |
|  |  | Decanoic acid |  | 0.03125 |  |  |

TABLE 58-continued

Growth inhibition of *Botrytis cinerea* by trifloxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  |  | (2E,4E)-2,4-Hexadienoic acid |  | 0.25 |  |  |
|  |  | Trans-2-octenoic acid |  | 0.078125 |  |  |
|  |  | Trans-2-decenoic acid |  | 0.15625 |  |  |
|  |  | 3-Decenoic acid |  | 0.15625 |  |  |
|  |  | 9-Decenoic acid |  | 0.15625 |  |  |
|  |  | Trans-2-undecenoic acid |  | 0.15625 |  |  |
| 1 | Trifloxystrobin | Hexanoic acid | 0.03125 | 0.039062 | 1.25 | 0.25 |
| 2 | Trifloxystrobin | Octanoic acid | 0.03125 | 0.019531 | 0.6 | 0.16 |
| 3 | Trifloxystrobin | Decanoic acid | 0.03125 | 0.015625 | 0.5 | 0.63 |
| 4 | Trifloxystrobin | (2E,4E)-2,4-Hexadienoic acid | 0.03125 | 0.0625 | 2 | 0.38 |
| 5 | Trifloxystrobin | Trans-2-octenoic acid | 0.03125 | 0.019531 | 0.6 | 0.38 |
| 6 | Trifloxystrobin | Trans-2-decenoic acid | 0.03125 | 0.009766 | 0.3 | 0.19 |
| 7 | Trifloxystrobin | 3-Decenoic acid | 0.03125 | 0.019531 | 0.6 | 0.25 |
| 8 | Trifloxystrobin | 9-Decenoic acid | 0.03125 | 0.019531 | 0.6 | 0.25 |
| 9 | Trifloxystrobin | Trans-2-undecenoic acid | 0.03125 | 0.019531 | 0.6 | 0.25 |

TABLE 59

Growth inhibition of *Botrytis cinerea* by trifloxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Trifloxystrobin |  | 0.25 |  |  |  |
|  |  | Heptanoic acid |  | 0.078125 |  |  |
|  |  | Nonanoic acid |  | 0.078125 |  |  |
|  |  | 2-Hydroxybutyric acid |  | 2.5 |  |  |
|  |  | 2-hydroxyhexanoic acid |  | 1.25 |  |  |
|  |  | 2-Hydroxydecanoic acid |  | 0.3125 |  |  |
|  |  | 3-Hydroxybutyric acid |  | 5 |  |  |
|  |  | 3-Hydroxyhexanoic acid |  | 2.5 |  |  |
|  |  | 3-Hydroxyoctanoic acid |  | 0.625 |  |  |
|  |  | 3-Hydroxydecanoic acid |  | 0.125 |  |  |
|  |  | 8-Hydroxyoctanoic acid |  | 1.25 |  |  |
|  |  | 10-Hydroxydecanoic acid |  | 0.25 |  |  |
|  |  | 12-Hydroxydodecanoic acid |  | 0.05 |  |  |
|  |  | 2,2-Diethylbutanoic acid |  | 0.25 |  |  |
|  |  | 2-Ethylhexanoic acid |  | 0.15625 |  |  |
|  |  | 2-Methyloctanoic acid |  | 0.078125 |  |  |
|  |  | 2-Methyldecanoic acid |  | 0.125 |  |  |
|  |  | 3-Methylbutyric acid |  | 0.3125 |  |  |
|  |  | 3-Methylhexanoic acid |  | 0.125 |  |  |
|  |  | 4-Methylhexanoic acid |  | 0.078125 |  |  |
| 1 | Trifloxystrobin | Heptanoic acid | 0.03125 | 0.019531 | 0.6 | 0.38 |
| 2 | Trifloxystrobin | Nonanoic acid | 0.015625 | 0.009766 | 0.6 | 0.19 |
| 3 | Trifloxystrobin | 2-Hydroxybutyric acid | 0.03125 | 1.25 | 40 | 0.63 |
| 4 | Trifloxystrobin | 2-hydroxyhexanoic acid | 0.03125 | 0.625 | 20 | 0.63 |
| 5 | Trifloxystrobin | 2-Hydroxydecanoic acid | 0.03125 | 0.15625 | 5 | 0.63 |
| 6 | Trifloxystrobin | 3-Hydroxybutyric acid | 0.03125 | 2.5 | 80 | 0.63 |
| 7 | Trifloxystrobin | 3-Hydroxyhexanoic acid | 0.03125 | 0.625 | 20 | 0.38 |
| 8 | Trifloxystrobin | 3-Hydroxyoctanoic acid | 0.03125 | 0.15625 | 5 | 0.38 |
| 9 | Trifloxystrobin | 3-Hydroxydecanoic acid | 0.03125 | 0.03125 | 1 | 0.38 |
| 10 | Trifloxystrobin | 8-Hydroxyoctanoic acid | 0.03125 | 0.625 | 20 | 0.63 |
| 11 | Trifloxystrobin | 10-Hydroxydecanoic acid | 0.03125 | 0.125 | 4 | 0.63 |
| 12 | Trifloxystrobin | 12-Hydroxydodecanoic acid | 0.03125 | 0.025 | 0.8 | 0.63 |
| 13 | Trifloxystrobin | 2,2-Diethylbutanoic acid | 0.03125 | 0.0625 | 2 | 0.38 |
| 14 | Trifloxystrobin | 2-Ethylhexanoic acid | 0.015625 | 0.019531 | 1.25 | 0.19 |
| 15 | Trifloxystrobin | 2-Methyloctanoic acid | 0.015625 | 0.009766 | 0.6 | 0.19 |
| 16 | Trifloxystrobin | 2-Methyldecanoic acid | 0.015625 | 0.0039062 | 0.25 | 0.09 |
| 17 | Trifloxystrobin | 3-Methylbutyric acid | 0.03125 | 0.15625 | 5 | 0.63 |
| 18 | Trifloxystrobin | 3-Methylhexanoic acid | 0.03125 | 0.03125 | 1 | 0.38 |
| 19 | Trifloxystrobin | 4-Methylhexanoic acid | 0.015625 | 0.019531 | 1.25 | 0.31 |

Example 15: Growth Inhibition of *Alternaria solani* by Picoxystrobin, Mancozeb, Penthiopyrad, and Prothioconazole, in Combination with Various Exemplary C4-C10 Saturated, Unsaturated, Hydroxy-, Methyl-, Ethyl-, and Diethyl-Substituted Aliphatic Acids Working solutions of picoxystrobin, mancozeb, penthiopyrad, and prothioconazole were each prepared as described above (as Compound A) and were serially diluted in PDB to the individual required concentrations for MIC testing as shown in Tables 60-64 below. Working solutions of 2-hydroxybutyric acid, 2-hydroxyoctanoic acid, 2-ethylhexanoic acid, 2-methyloctanoic acid, 2-methyldecanoic acid, 3-methylhexanoic acid, 3-methylnonanoic acid, 4-methylhexanoic acid, hexanoic acid, heptanoic, octanoic acid, nonanoic acid, decanoic acid, dodecanoic acid, 2,4-hexedienoic acid, trans-3-hexenoic acid, 5-hexenoic acid, 3-heptenoic acid, trans-2-octenoic acid, 3-octenoic acid, trans-3-octenoic acid, trans-2-nonenoic acid, 3-nonenoic acid, trans-2-decenoic acid, cis-3-hexenoic acid, 7-octenoic acid, 3-decenoic acid, 9-decenoic acid, trans-2-undecenoic acid, 2-hydroxybutyric acid, 3-hydroxybutyric acid, 3-hydroxyhexanoic acid, 3-hydroxyoctanoic acid, 3-hydroxydecanoic acid, 8-hydroxyoctanoic acid, 12-hydroxydodecanoic acid, 2-methyloctanoic acid, 2-methyldecanoic acid, and oleic acid (as Compound B), were each prepared as described above, and were serially diluted in PDB to the individual required concentrations for MIC testing as shown in Tables 60-64 below.

Each individual compound and combination was tested over a range of 2-fold dilutions in the synergistic growth inhibition assay, observed following an incubation period of 7 days, and the FIC Index for each combination calculated, as shown in Tables 60-64 below.

TABLE 60

Growth inhibition of *Alternaria solani* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| | Picoxystrobin | | 0.5 | | | |
| | | Hexanoic acid | | 0.15625 | | |
| | | Heptanoic acid | | 0.15625 | | |
| | | Octanoic acid | | 0.15625 | | |
| | | Nonanoic acid | | 0.15625 | | |
| | | Decanoic acid | | 0.03125 | | |
| | | Dodecanoic acid | | 0.1 | | |
| | | (2E,4E)-2,4-Hexadienoic acid | | 0.125 | | |
| | | Trans-3-hexenoic acid | | 0.3125 | | |
| | | 5-Hexenoic acid | | 0.3125 | | |
| | | 3-Heptenoic acid | | 0.3125 | | |
| | | Trans-2-octenoic acid | | 0.078125 | | |
| | | 3-Octenoic acid | | 0.15625 | | |
| | | Trans-3-octenoic acid | | 0.15625 | | |
| | | Trans-2-nonenoic acid | | 0.078125 | | |
| | | 3-Nonenoic acid | | 0.078125 | | |
| | | Trans-2-decenoic acid | | 0.078125 | | |
| | | 3-Decenoic acid | | 0.078125 | | |
| | | 9-Decenoic acid | | 0.03906 | | |
| | | Trans-2-undecenoic acid | | 0.15625 | | |
| 1 | Picoxystrobin | Hexanoic acid | 0.125 | 0.039062 | 0.3 | 0.50 |
| 2 | Picoxystrobin | Heptanoic acid | 0.0625 | 0.019531 | 0.3 | 0.25 |
| 3 | Picoxystrobin | Octanoic acid | 0.03125 | 0.019531 | 0.6 | 0.19 |
| 4 | Picoxystrobin | Nonanoic acid | 0.0625 | 0.009766 | 0.16 | 0.19 |
| 5 | Picoxystrobin | Decanoic acid | 0.0625 | 0.0078125 | 0.13 | 0.38 |
| 6 | Picoxystrobin | Dodecanoic acid | 0.0625 | 0.0125 | 0.2 | 0.25 |
| 7 | Picoxystrobin | (2E,4E)-2,4-Hexadienoic acid | 0.0625 | 0.03125 | 0.5 | 0.38 |
| 8 | Picoxystrobin | Trans-3-hexenoic acid | 0.125 | 0.078125 | 0.6 | 0.50 |
| 9 | Picoxystrobin | 5-Hexenoic acid | 0.125 | 0.078125 | 0.6 | 0.50 |
| 10 | Picoxystrobin | 3-Heptenoic acid | 0.125 | 0.039062 | 0.3 | 0.38 |
| 11 | Picoxystrobin | Trans-2-octenoic acid | 0.125 | 0.019531 | 0.16 | 0.50 |
| 12 | Picoxystrobin | 3-Octenoic acid | 0.125 | 0.039062 | 0.3 | 0.50 |
| 13 | Picoxystrobin | Trans-3-octenoic acid | 0.0625 | 0.019531 | 0.3 | 0.25 |
| 14 | Picoxystrobin | Trans-2-nonenoic acid | 0.03125 | 0.019531 | 0.6 | 0.31 |
| 15 | Picoxystrobin | 3-Nonenoic acid | 0.0625 | 0.019531 | 0.3 | 0.38 |
| 16 | Picoxystrobin | Trans-2-decenoic acid | 0.125 | 0.039062 | 0.3 | 0.75 |
| 17 | Picoxystrobin | 3-Decenoic acid | 0.0625 | 0.019531 | 0.3 | 0.38 |
| 18 | Picoxystrobin | 9-Decenoic acid | 0.0625 | 0.019531 | 0.3 | 0.63 |
| 19 | Picoxystrobin | Trans-2-undecenoic acid | 0.0625 | 0.019531 | 0.3 | 0.25 |

TABLE 61

Growth inhibition of *Alternaria solani* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Picoxystrobin |  | 0.5 |  |  |  |
|  |  | Trans-2-decenoic acid |  | 0.039062 |  |  |
|  |  | Cis-3-hexenoic acid |  | 0.3125 |  |  |
|  |  | 7-Octenoic acid |  | 0.15625 |  |  |
|  |  | 3-Hydroxyoctanoic acid |  | 1.25 |  |  |
|  |  | 8-Hydroxyoctanoic acid |  | 2.5 |  |  |
|  |  | 10-Hydroxydecanoic acid |  | 1 |  |  |
|  |  | 12-Hydroxydodecanoic acid |  | 0.1 |  |  |
|  |  | 2-Hydroxybutyric acid |  | 2.5 |  |  |
|  |  | 2-Hydroxyoctanoic acid |  | 0.625 |  |  |
|  |  | 2-Ethylhexanoic acid |  | 0.15625 |  |  |
|  |  | 2-Methyloctanoic acid |  | 0.15625 |  |  |
|  |  | 3-Methylhexanoic acid |  | 0.25 |  |  |
|  |  | 3-Methylnonanoic acid |  | 0.0625 |  |  |
|  |  | 4-Methylhexanoic acid |  | 0.3125 |  |  |
|  |  | 2-Methyldecanoic acid |  | 0.125 |  |  |
| 1 | Picoxystrobin | Trans-2-decenoic acid | 0.0625 | 0.019531 | 0.3 | 0.63 |
| 2 | Picoxystrobin | Cis-3-hexenoic acid | 0.125 | 0.078125 | 0.6 | 0.50 |
| 3 | Picoxystrobin | 7-Octenoic acid | 0.0625 | 0.019531 | 0.3 | 0.25 |
| 4 | Picoxystrobin | 3-Hydroxyoctanoic acid | 0.125 | 0.15625 | 1.25 | 0.38 |
| 5 | Picoxystrobin | 8-Hydroxyoctanoic acid | 0.125 | 0.625 | 5 | 0.50 |
| 6 | Picoxystrobin | 10-Hydroxydecanoic acid | 0.125 | 0.125 | 1 | 0.38 |
| 7 | Picoxystrobin | 12-Hydroxydodecanoic acid | 0.125 | 0.025 | 0.2 | 0.50 |
| 8 | Picoxystrobin | 2-Hydroxybutyric acid | 0.125 | 0.625 | 5 | 0.50 |
| 9 | Picoxystrobin | 2-Hydroxyoctanoic acid | 0.125 | 0.15625 | 1.25 | 0.50 |
| 10 | Picoxystrobin | 2-Ethylhexanoic acid | 0.125 | 0.039062 | 0.3 | 0.50 |
| 11 | Picoxystrobin | 2-Methyloctanoic acid | 0.0625 | 0.019531 | 0.3 | 0.25 |
| 12 | Picoxystrobin | 3-Methylhexanoic acid | 0.125 | 0.03125 | 0.25 | 0.38 |
| 13 | Picoxystrobin | 3-Methylnonanoic acid | 0.125 | 0.015625 | 0.13 | 0.50 |
| 14 | Picoxystrobin | 4-Methylhexanoic acid | 0.125 | 0.039062 | 0.3 | 0.38 |
| 15 | Picoxystrobin | 2-Methyldecanoic acid | 0.125 | 0.03125 | 0.25 | 0.50 |

TABLE 62

Growth inhibition of *Alternaria solani* by penthiopyrad, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Penthiopyrad |  | 0.5 |  |  |  |
|  |  | Octanoic acid |  | 0.3125 |  |  |
|  |  | Trans-2-nonenoic acid |  | 0.15625 |  |  |
|  |  | Trans-3-octenoic acid |  | 0.15625 |  |  |
| 1 | Penthiopyrad | Octanoic acid | 0.0625 | 0.039062 | 0.6 | 0.25 |
| 2 | Penthiopyrad | Trans-2-nonenoic acid | 0.125 | 0.078125 | 0.6 | 0.75 |
| 3 | Penthiopyrad | Trans-3-octenoic acid | 0.125 | 0.039062 | 0.3 | 0.50 |

TABLE 63

Growth inhibition of *Alternaria solani* by prothioconazole, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Prothioconazole |  | 0.5 |  |  |  |
|  |  | 2-Hydroxybutyric acid |  | 2.5 |  |  |
|  |  | 2-Hydroxyhexanoic acid |  | 2.5 |  |  |
|  |  | 3-Hydroxybutyric acid |  | 5 |  |  |

TABLE 63-continued

Growth inhibition of *Alternaria solani* by prothioconazole, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  |  | 3-Hydroxyhexanoic acid |  | 2.5 |  |  |
|  |  | 8-Hydroxyoctanoic acid |  | 2.5 |  |  |
|  |  | 2-Ethylhexanoic acid |  | 0.3125 |  |  |
|  |  | 3-Methylnonanoic acid |  | 0.0625 |  |  |
|  |  | 2-Methyldecanoic acid |  | 1 |  |  |
|  |  | 3-Methylbutyric acid |  | 0.3125 |  |  |
| 1 | Prothioconazole | 2-Hydroxybutyric acid | 0.125 | 0.625 | 5 | 0.50 |
| 2 | Prothioconazole | 2-Hydroxyhexanoic acid | 0.125 | 0.625 | 5 | 0.50 |
| 3 | Prothioconazole | 3-Hydroxybutyric acid | 0.125 | 1.25 | 10 | 0.50 |
| 4 | Prothioconazole | 3-Hydroxyhexanoic acid | 0.125 | 0.625 | 5 | 0.50 |
| 5 | Prothioconazole | 8-Hydroxyoctanoic acid | 0.125 | 0.625 | 5 | 0.50 |
| 6 | Prothioconazole | 2-Ethylhexanoic acid | 0.125 | 0.039062 | 0.3 | 0.38 |
| 7 | Prothioconazole | 3-Methylnonanoic acid | 0.125 | 0.015625 | 0.13 | 0.50 |
| 8 | Prothioconazole | 2-Methyldecanoic acid | 0.125 | 0.03125 | 0.25 | 0.28 |
| 9 | Prothioconazole | 3-Methylbutyric acid | 0.125 | 0.078125 | 0.6 | 0.50 |

TABLE 64

Growth inhibition of *Alternaria solani* by mancozeb, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Mancozeb |  | 0.5 |  |  |  |
|  |  | Heptanoic acid |  | 0.15625 |  |  |
|  |  | 2-Methyloctanoic acid |  | 0.625 |  |  |
|  |  | 2-Methyldecanoic acid |  | 1 |  |  |
| 1 | Mancozeb | Heptanoic acid | 0.125 | 0.039062 | 0.3 | 0.50 |
| 2 | Mancozeb | 2-Methyloctanoic acid | 0.125 | 0.039062 | 0.3 | 0.31 |
| 3 | Mancozeb | 2-Methyldecanoic acid | 0.125 | 0.03125 | 0.25 | 0.28 |

Example 16: Growth Inhibition of *Sclerotinia sclerotiorum* by Picoxystrobin, Penthiopyrad, and Prothioconazole, in Combination with Various Exemplary C4-C10 Saturated, Unsaturated, Hydroxy-, Methyl-, and Ethyl-Substituted Aliphatic Acids Working solutions of picoxystrobin, penthiopyrad, and prothioconazole were each prepared as described above (as Compound A) and were serially diluted in PDB to the individual required concentrations for MIC testing as shown in Tables 65-68 below. Working solutions of 2-hydroxybutyric acid, 2-hydroxyoctanoic acid, 2-ethylhexanoic acid, 3-methylbutyric acid, nonanoic acid, trans-3-hexenoic acid, 3-heptenoic acid, trans-2-nonenoic acid, trans-2-decenoic acid, 3-decenoic acid, 9-decenoic acid, and 10-hydroxydecanoic acid (as Compound B), were each prepared as described above, and were serially diluted in PDB to the individual required concentrations for MIC testing as shown in Tables 65-68 below.

Each individual compound and combination was tested over a range of 2-fold dilutions in the synergistic growth inhibition assay, observed following an incubation period of 7 days, and the FIC Index for each combination calculated, as shown in Tables 65-68 below.

TABLE 65

Growth inhibition of *Sclerotinia sclerotiorum* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Picoxystrobin |  | 0.5 |  |  |  |
|  |  | Nonanoic acid |  | 0.039062 |  |  |
|  |  | Trans-2-octenoic acid |  | 0.039062 |  |  |
|  |  | 3-Nonenoic acid |  | 0.078125 |  |  |
|  |  | 3-Decenoic acid |  | 0.15625 |  |  |

TABLE 65-continued

Growth inhibition of *Sclerotinia sclerotiorum* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
| 1 | Picoxystrobin | Nonanoic acid | 0.125 | 0.019531 | 0.16 | 0.75 |
| 2 | Picoxystrobin | Trans-2-octenoic acid | 0.125 | 0.009766 | 0.08 | 0.50 |
| 3 | Picoxystrobin | 3-Nonenoic acid | 0.125 | 0.019531 | 0.16 | 0.50 |
| 4 | Picoxystrobin | 3-Decenoic acid | 0.125 | 0.019531 | 0.16 | 0.38 |

TABLE 66

Growth inhibition of *Sclerotinia sclerotiorum* by picoxystrobin, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Picoxystrobin |  | 0.5 |  |  |  |
|  |  | Trans-2-decenoic acid |  | 0.019531 |  |  |
|  |  | 10-Hydroxydecanoic acid |  | 0.5 |  |  |
|  |  | 2-Hydroxybutyric acid |  | 5 |  |  |
|  |  | 2-Hydroxyoctanoic acid |  | 0.625 |  |  |
|  |  | 2-Ethylhexanoic acid |  | 0.15625 |  |  |
|  |  | 3-Methylbutyric acid |  | 0.625 |  |  |
| 1 | Picoxystrobin | Trans-2-decenoic acid | 0.125 | 0.004883 | 0.04 | 0.5 |
| 2 | Picoxystrobin | 10-Hydroxydecanoic acid | 0.125 | 0.125 | 1 | 0.50 |
| 3 | Picoxystrobin | 2-Hydroxybutyric acid | 0.125 | 1.25 | 10 | 0.50 |
| 4 | Picoxystrobin | 2-Hydroxyoctanoic acid | 0.125 | 0.15625 | 1.25 | 0.50 |
| 5 | Picoxystrobin | 2-Ethylhexanoic acid | 0.125 | 0.078125 | 0.625 | 0.75 |
| 6 | Picoxystrobin | 3-Methylbutyric acid | 0.125 | 0.15625 | 1.25 | 0.50 |

TABLE 67

Growth inhibition of *Sclerotinia sclerotiorum* by penthiopyrad, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Penthiopyrad |  | 0.5 |  |  |  |
|  |  | Trans-3-hexenoic acid |  | 0.3125 |  |  |
|  |  | 3-Heptenoic acid |  | 0.15625 |  |  |
|  |  | Trans-2-nonenoic acid |  | 0.078125 |  |  |
|  |  | 3-Decenoic acid |  | 0.15625 |  |  |
|  |  | 9-Decenoic acid |  | 0.078125 |  |  |
| 1 | Penthiopyrad | Trans-3-hexenoic acid | 0.125 | 0.039062 | 0.3 | 0.38 |
| 2 | Penthiopyrad | 3-Heptenoic acid | 0.125 | 0.019531 | 0.16 | 0.38 |
| 3 | Penthiopyrad | Trans-2-nonenoic acid | 0.125 | 0.019531 | 0.16 | 0.50 |
| 4 | Penthiopyrad | 3-Decenoic acid | 0.125 | 0.019531 | 0.16 | 0.38 |
| 5 | Penthiopyrad | 9-Decenoic acid | 0.125 | 0.019531 | 0.16 | 0.50 |

TABLE 68

Growth inhibition of *Sclerotinia sclerotiorum* by prothioconazole, in combination with various exemplary saturated, unsaturated, and substituted aliphatic acids.

| Combination | Compound A | Compound B | MIC (A) (mg/mL) | MIC (B) (mg/mL) | Ratio Compound B/ Compound A | FIC Index |
|---|---|---|---|---|---|---|
|  | Prothioconazole |  | 0.0625 |  |  |  |
|  |  | 2-Hydroxybutyric acid |  | 5 |  |  |
| 1 | Prothioconazole | 2-Hydroxybutyric acid | 0.015625 | 1.25 | 80 | 0.50 |

Example 17: In-Vitro Insecticidal Efficacy Against *Trichoplusia ni* by Chlorfenapyr (Active Ingredient in Pylon® Insecticide), in Combination with Various Exemplary Unsaturated Aliphatic Acids (and Agriculturally Acceptable Salts Thereof)

Sample Preparation:

Chlorfenapyr, a halogenated pyrrole synthetic miticide-insecticide, is the active ingredient in Pylon® insecticide (available from BASF Corp., Research Triangle Park, NC, USA), and is present as 21.4% w/w of the Pylon® liquid formulation. Pylon® liquid formulation was diluted in water to form a 2 mg/mL Pylon® stock solution (containing 0.428 mg/mL of chlorfenapyr).

A stock solution was prepared for each of trans-2-hexenoic acid and trans-3-hexenoic acid (both available from Sigma-Aldrich, St. Louis, MO, USA), by dissolving each exemplary unsaturated aliphatic acid in 100% dimethylsulfoxide (DMSO) at a concentration of 20 mg/mL (20,000 ppm). A stock solution for the potassium salt of (2E,4E)-2,4-hexadienoic acid was prepared by dissolving the salt in water to form a 20 mg/mL (20,000 ppm) solution.

An artificial diet suitable for *Trichoplusia ni* (cabbage looper caterpillar) was prepared according to the modified McMorran artificial diet recipe known in the entomology field (containing agar, casein, potassium hydroxide, alpha-cel, Wesson's salt mix, sugar, toasted wheat germ, choline chloride, ascorbic acid, methyl paraben, aureomycin, linseed oil and vitamin solution).

The Pylon® stock solutions was diluted in 35 mL of the artificial diet to produce a concentration of 0.0016 mg/mL for each Pylon® treatment, and each of the unsaturated aliphatic acid (and salt) stock solutions were diluted in 35 mL of the artificial diet at concentrations of 0.05 mg/mL, 0.15 mg/mL, and 0.30 mg/mL, for each unsaturated aliphatic acid (and salt) treatment, and combinations of Pylon® and each aliphatic acid (and salt) were added to the artificial diet at the same concentrations for each combination treatment. The treated artificial diet was then used to fill each well of a 24-well treatment plate with approximately 0.5 mL of artificial diet, which was allowed to solidify at room temperature and stored overnight at approximately 4 C. The following day, freshly hatched *Trichoplusia ni* (cabbage looper) larvae (hatched from eggs obtained from the Natural Resource Canada insect research facility in Sault-Ste-Marie, ON, Canada) were added to each well of the plate, and their survival rate was monitored at 72 hours, and every 24 hours for up to 144 hours (6 days) in total, to determine the insecticidal efficacy of the Pylon® treatment alone, each unsaturated aliphatic acid (and salt) alone, and each combination of Pylon® and unsaturated aliphatic acid (and salt). Each experiment contained 3 replicates, and was repeated at least 3 times.

Figure 3:
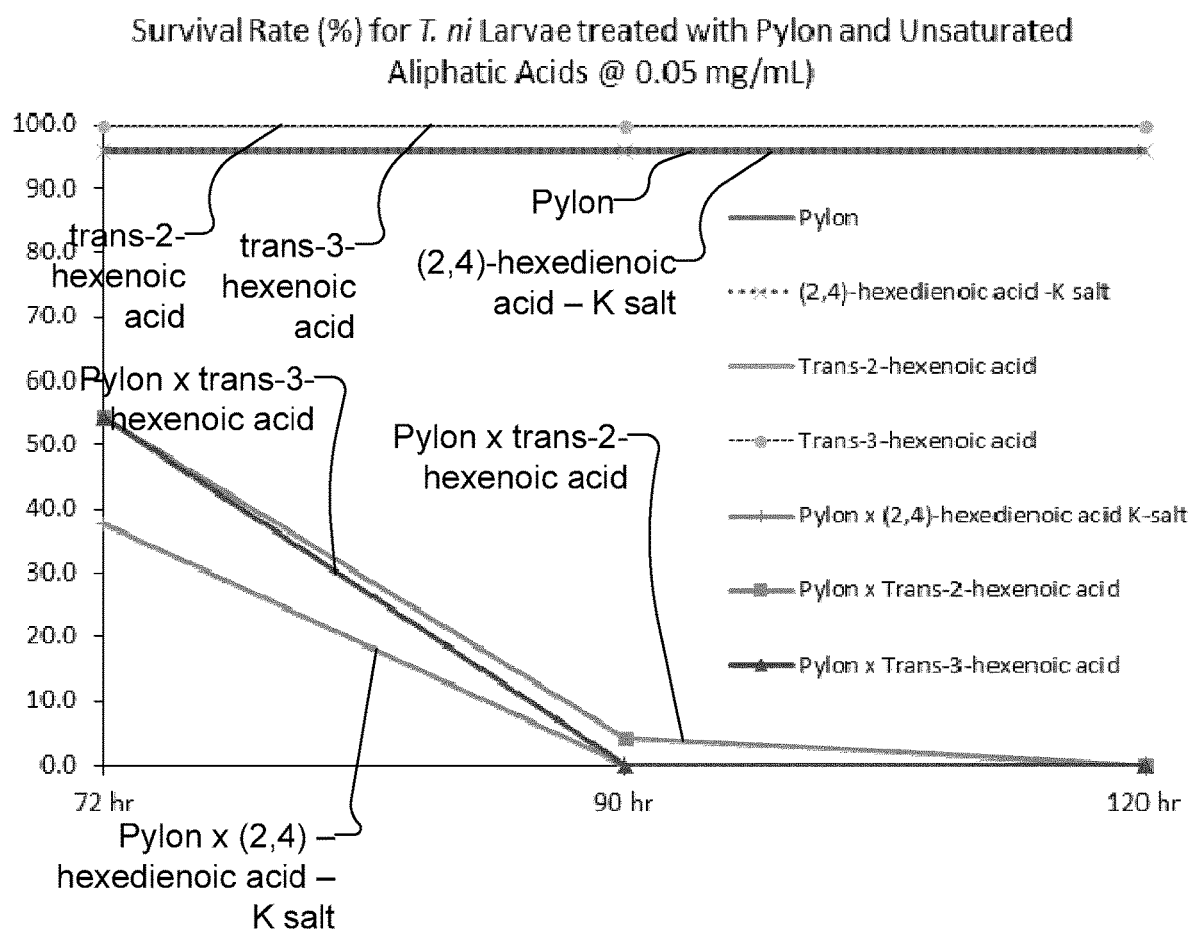
FIGS. 3-5 illustrate the observed survival rate (percent of original insects still surviving) for *Trichoplusia ni* (cabbage looper caterpillar) over time for in-vitro testing on a modified McMorran artificial diet to which treatments of Pylon® insecticide (containing chlorfenapyr as the pesticidal active ingredient) and exemplary unsaturated aliphatic acids (and salts) alone are shown in comparison with the corresponding survival rates for treatments with a synergistic pesticidal composition combining Pylon® insecticide with each of the exemplary unsaturated aliphatic acids (and salts) at three concentrations (shown in FIGS. 3, 4, and 5 respectively), according to an embodiment of the present invention.
Figure 4:
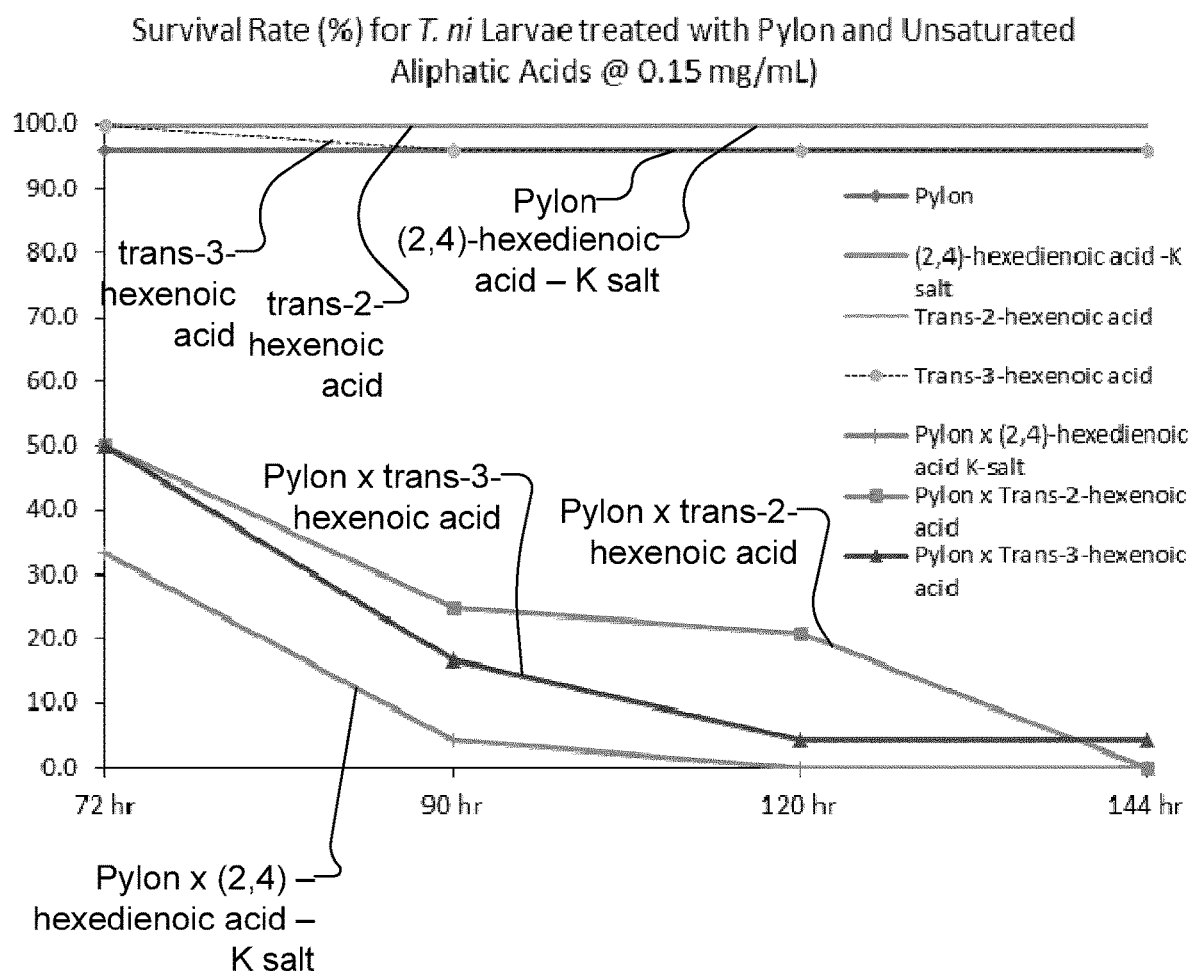
Figure 5:
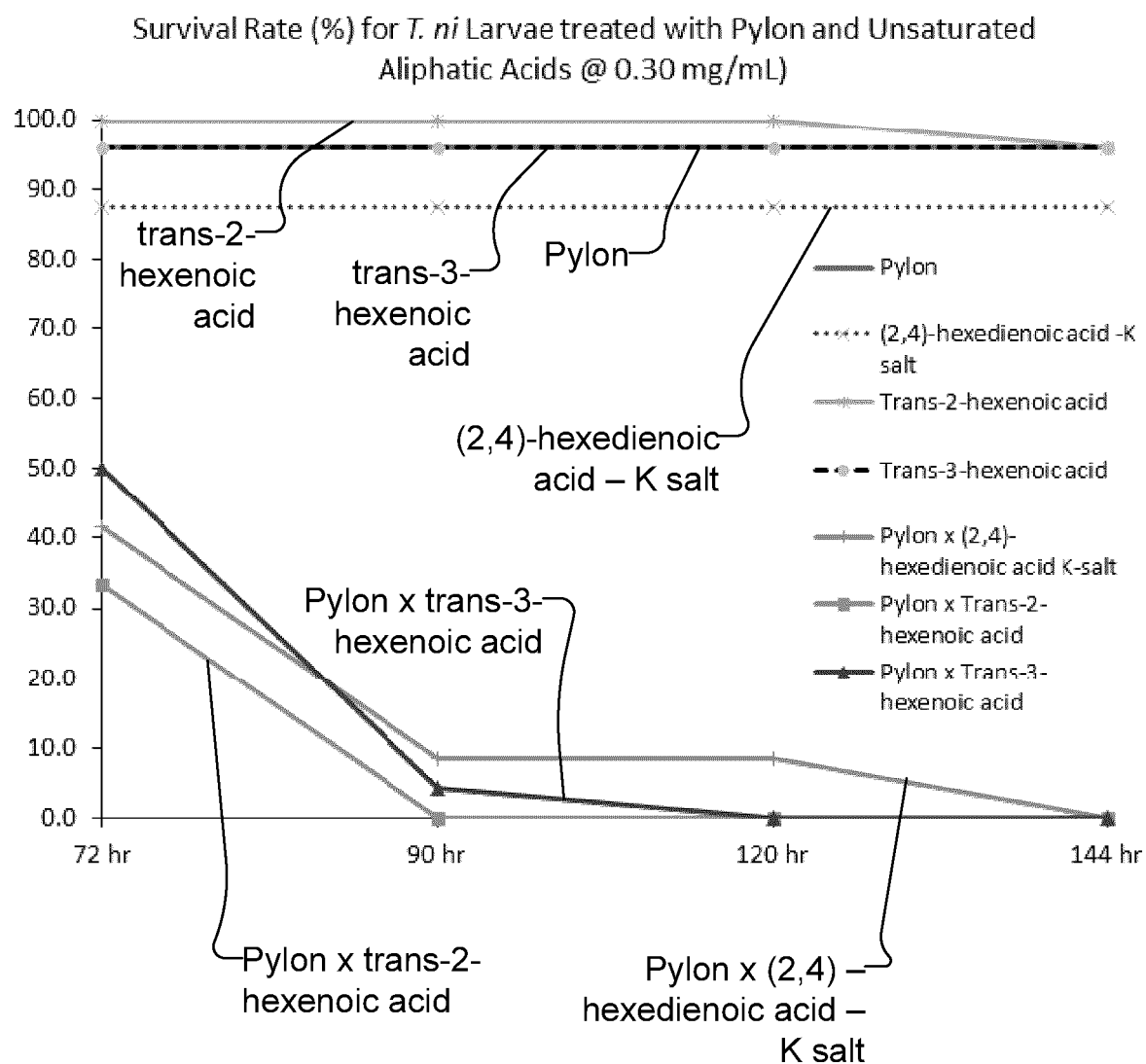

The observed survival rate for the larvae at each time interval for the Pylon® and unsaturated aliphatic acid (and salt) treatments alone are shown in comparison with the corresponding survival rates for the combination treatments for each of the three concentrations of the unsaturated aliphatic acids (and salt) in FIGS. 3-5.

The aggregate results showing the insecticidal efficacy (which is equal to (100%−(survival rate)) for each treatment are shown below in Tables 69-71 (corresponding to unsaturated aliphatic acid and salt concentrations of 0.05 mg/mL, 0.15 mg/mL, and 0.30 mg/mL, respectively).

The observed efficacy rate (1−(survival rate)) of individual and combination treatments was used to evaluate the efficacy data in Tables 116-118 for synergistic effects in the combination of Pylon® and the exemplary unsaturated aliphatic acids (and salt), using the Colby Formula (also referred to as the Abbott Formula), per S. R. Colby, Calculating Synergistic and Antagonistic Responses of Herbicide Combinations, Weeds, Vol. 15, No. 1 (January 1967), as is well known in the agricultural experimental field for determining synergism between two or more compounds. In accordance with the Colby Formula, the expected efficacy, E (%), of a combination treatment of compounds A and B in concentrations a and b, respectively, can be determined by evaluating:

$$E = x + y - (xy/100); \text{ where:}$$

x=efficacy (%) of compound A alone, applied at concentration a;

y=efficacy (%) of compound B alone, applied at concentration b.

The existence and extent of synergy present in a combination treatment can be determined according to the Colby Formula by evaluating a Synergy Factor, SF=(Observed efficacy)/(Expected efficacy). For values of SF>1, synergistic efficacy is shown in the observed efficacy of the combination of compounds, with increasing synergy present as the SF increases above 1. While for SF<1, antagonism is present and for SF=1, the efficacy of the compounds is merely additive. Tables 69-71 show the Synergy Factor calculated according to the above Colby Formula for the observed insecticidal efficacy of each combination treatment between Pylon® and the tested exemplary unsaturated aliphatic acids (and salt). As shown in Tables 69-71, the combination of Pylon® insecticide at 0.0016 mg/mL (equivalent to 0.00034 mg/mL of chlorfenapyr as the insecticidal active ingredient) with exemplary unsaturated aliphatic acid (and salt) concentrations between 0.05 mg/mL and 0.30 mg/mL produced synergistic efficacy factors of between 4 and 24 times, relative to the expected efficacy of the individual components, thus indicating strong evidence of the synergistic pesticidal efficacy of the combinations, according to an embodiment of the invention.

TABLE 69

Expected and Observed Efficacy (%) at 0.05 mg/mL Unsaturated Aliphatic Acid (salt) Concentration

| Treatment | 72 hr Exp. | 72 hr Obs. | 72 hr Synergy Factor | 90 hr Exp. | 90 hr Obs. | 90 hr Synergy Factor | 120 hr Exp. | 120 hr Obs. | 120 hr Synergy Factor |
|---|---|---|---|---|---|---|---|---|---|
| Pylon ® | — | 4 | — | — | 4 | — | — | 4 | — |
| 2,4-hexenoic acid-Ksalt | — | 4 | — | — | 4 | — | — | 4 | — |
| Trans-2-hexenoic acid | — | 0 | — | — | 0 | — | — | 0 | — |
| Trans-3-hexenoic acid | — | 0 | — | — | 0 | — | — | 0 | — |
| Pylon ® × 2,4-hex acid K-salt | 8 | 62 | 8 | 8 | 100 | 12 | 8 | 100 | 12 |

TABLE 69-continued

Expected and Observed Efficacy (%) at 0.05 mg/mL
Unsaturated Aliphatic Acid (salt) Concentration

| Treatment | 72 hr Exp. | 72 hr Obs. | 72 hr Synergy Factor | 90 hr Exp. | 90 hr Obs. | 90 hr Synergy Factor | 120 hr Exp. | 120 hr Obs. | 120 hr Synergy Factor |
|---|---|---|---|---|---|---|---|---|---|
| Pylon ® × Trans-2-hex. acid | 4 | 46 | 11 | 4 | 96 | 23 | 4 | 100 | 24 |
| Pylon ® × Trans-3-hex. acid | 4 | 46 | 11 | 4 | 100 | 24 | 4 | 100 | 24 |

TABLE 70

Expected and Observed Efficacy (%) at 0.15 mg/mL
Unsaturated Aliphatic Acid (salt) Concentration

| Treatment | 72 hr Exp. | 72 hr Obs. | 72 hr Synergy Factor | 90 hr Exp. | 90 hr Obs. | 90 hr Synergy Factor | 120 hr Exp. | 120 hr Obs. | 120 hr Synergy Factor |
|---|---|---|---|---|---|---|---|---|---|
| Pylon ® | — | 4 | — | — | 4 | — | — | 4 | — |
| 2,4-hexenoic acid-Ksalt | — | 4 | — | — | 4 | — | — | 4 | — |
| Trans-2-hexenoic acid | — | 0 | — | — | 0 | — | — | 0 | — |
| Trans-3-hexenoic acid | — | 0 | — | — | 4 | — | — | 4 | — |
| Pylon ® × 2,4-hex acid K-salt | 4 | 67 | 16 | 4 | 96 | 23 | 4 | 96 | 12 |
| Pylon ® × Trans-2-hex. acid | 4 | 50 | 12 | 4 | 75 | 18 | 4 | 79 | 19 |
| Pylon ® × Trans-3-hex. acid | 4 | 50 | 12 | 8 | 83 | 10 | 8 | 96 | 12 |

TABLE 71

Expected and Observed Efficacy (%) at 0.30 mg/mL
Unsaturated Aliphatic Acid (salt) Concentration

| Treatment | 72 hr Exp. | 72 hr Obs. | 72 hr Synergy Factor | 90 hr Exp. | 90 hr Obs. | 90 hr Synergy Factor | 120 hr Exp. | 120 hr Obs. | 120 hr Synergy Factor |
|---|---|---|---|---|---|---|---|---|---|
| Pylon ® | — | 4 | — | — | 4 | — | — | 4 | — |
| 2,4-hexenoic acid-Ksalt | — | 13 | — | — | 13 | — | — | 4 | — |
| Trans-2-hexenoic acid | — | 0 | — | — | 0 | — | — | 0 | — |
| Trans-3-hexenoic acid | — | 4 | — | — | 4 | — | — | 0 | — |
| Pylon ® × 2,4-hex acid K-salt | 16 | 58 | 4 | 16 | 92 | 6 | 16 | 92 | 6 |
| Pylon ® × Trans-2-hex. acid | 8 | 67 | 8 | 8 | 100 | 12 | 4 | 100 | 24 |
| Pylon ® × Trans-3-hex. acid | 8 | 50 | 6 | 8 | 96 | 12 | 4 | 100 | 24 |

Example 18: In-Planta Insecticidal Efficacy Against *Trichoplusia ni* by Chlorfenapyr (Active Ingredient in Pylon® Insecticide), in Combination with Various Exemplary Unsaturated Aliphatic Acids (and Agriculturally Acceptable Salts Thereof)

Sample Preparation:

Chlorfenapyr, a halogenated pyrrole synthetic miticide-insecticide, was provided as the active ingredient in Pylon® insecticide (available from BASF Corp., Research Triangle Park, NC, USA), and is present as 21.4% w/w of the Pylon® liquid formulation. Pylon® liquid formulation was diluted in water to form a 0.187 mg/mL Pylon® treatment solution (containing 0.0400 mg/mL of chlorfenapyr).

A stock solution was prepared for trans-2-hexenoic acid (available from Sigma-Aldrich, St. Louis, MO, USA), by dissolving trans-2-hexenoic acid in 100% dimethylsulfoxide (DMSO) at a concentration of 20 mg/mL. A stock solution for the potassium salt of (2E,4E)-2,4-hexadienoic acid was prepared by dissolving the salt in water to form a 20 mg/mL (20,000 ppm) solution. Combined treatment solutions were prepared by adding stock solution of each of the exemplary unsaturated aliphatic acid and salt to the Pylon® treatment solution, to provide a combined treatment solution having a Pylon® concentration of 0.187 mg/mL and concentrations of the exemplary unsaturated aliphatic acid (or salt) of 0.06 mg/mL.

Green cabbage plants (*Brassica oleracea* var. capitate, Danish Ballhead cultivar) were grown from seed (available from West Coast Seeds, Delta, BC, Canada) in potting soil for 4 weeks in a pest-free indoor growing environment. At 4 weeks of age, each cabbage plant was sprayed with 10 mL of treatment solution using a hand pump sprayer bottle, and allowed to dry. After the treatment solution sprays had dried on the leaves of the cabbage plants, 15-30 first instar *Trichoplusia ni* (cabbage looper) larvae (hatched from eggs obtained from the Natural Resource Canada insect research facility in Sault-Ste-Marie, ON, Canada) were placed directly on the leaves of each cabbage plant. The treated cabbage plants were then placed in nylon isolation tents and kept in an indoor growing environment and the larvae were left to feed on the plants. In one set of cabbage plants, the larvae were left to feed for 48 hours, and then the number of surviving larvae were observed and survival rates (%) were determined. In a second separate set of cabbage plants, the larvae were left to feed for 72 hours, and then the number of surviving larvae were observed and survival rates (%) were determined. Each experiment was repeated at least 3 times.

The aggregate results showing the insecticidal efficacy (which is equal to (100%−(observed survival rate)) for each treatment are shown below in Tables 119-120 (corresponding to observation intervals of 48 hours and 72 hours for the two sets of plants, both with unsaturated aliphatic acid and salt concentrations of 0.06 mg/mL and Pylon® concentration of 0.187 mg/mL). The observed insecticidal efficicacy rate in percent (equal to 100%−(survival rate)) of individual and combination treatments was used to evaluate the efficacy data in Tables 119-120 for synergistic effects in the combination of Pylon® and the exemplary unsaturated aliphatic acids (and salt), using the Colby Formula (also referred to as the Abbott Formula), per S. R. Colby, Calculating Synergistic and Antagonistic Responses of Herbicide Combinations, Weeds, Vol. 15, No. 1 (January 1967), as is well known in the agricultural experimental field for determining synergism between two or more compounds. In accordance with the Colby Formula, the expected efficacy, E (%), of a combination treatment of compounds A and B in concentrations a and b, respectively, can be determined by evaluating:

$E = x + y − (xy/100)$; where:

x=efficacy (%) of compound A alone, applied at concentration a;
y=efficacy (%) of compound B alone, applied at concentration b.

The existence and extent of synergy present in a combination treatment can be determined according to the Colby Formula by evaluating a Synergy Factor, SF=(Observed efficacy)/(Expected efficacy). For values of SF>1, synergistic efficacy is shown in the observed efficacy of the combination of compounds, with increasing synergy present as the SF increases above 1. While for SF<1, antagonism is present and for SF=1, the efficacy of the compounds is merely additive. Tables 72 and 73 show the Synergy Factor calculated according to the above Colby Formula for the observed insecticidal efficacy of each combination treatment between Pylon® and the tested exemplary unsaturated aliphatic acid (and salt). As shown in Tables 72-73, the combination of Pylon® insecticide at 0.187 mg/mL (equivalent to 0.0400 mg/mL of chlorfenapyr as the pesticidal active ingredient) with exemplary unsaturated aliphatic acid (and salt) concentration of 0.06 mg/mL produced synergistic efficacy factors of between 1.14 and 1.25, relative to the expected efficacy of the individual components, thus indicating evidence of the synergistic pesticidal efficacy of the combinations, according to an embodiment of the invention.

TABLE 72

Expected and Observed Efficacy (%) in-planta against *Trichoplusia ni* at 0.187 mg/mL Pylon ® and 0.06 mg/mL exemplary unsaturated aliphatic acid (and salt) concentrations, after 48 hours

| Treatment | Observed Efficacy (%) | Expected Efficacy (%) | Synergy Factor |
|---|---|---|---|
| Pylon | 87 | — | — |
| 2,4-hexadienoic acid, K-salt | 13 | — | — |
| Trans-2-hexenoic acid | 0 | — | — |
| Pylon × 2,4-hexadienoic acid, K-salt | 100 | 88 | 1.14 |
| Pylon × Trans-2-hexenoic acid | 100 | 87 | 1.15 |

TABLE 73

Expected and Observed Efficacy (%) in-planta against *Trichoplusia ni* at 0.187 mg/mL Pylon ® and 0.06 mg/mL exemplary unsaturated aliphatic acid (and salt) concentrations, after 72 hours

| Treatment | Observed Efficacy (%) | Expected Efficacy (%) | Synergy Factor |
|---|---|---|---|
| Pylon | 80 | — | — |
| 2,4-hexadienoic acid, K-salt | 0 | — | — |
| Trans-2-hexenoic acid | 0 | — | — |
| Pylon × 2,4-hexadienoic acid, K-salt | 100 | 80 | 1.25 |
| Pylon × Trans-2-hexenoic acid | 100 | 81 | 1.23 |

Example 19: In-Vitro Insecticidal Efficacy Against *Trichoplusia ni* by Spinosad (Active Ingredient in Entrust® SC Insecticide and Comprising Insecticidal Spinosyns a and D), in Combination with Various Exemplary Saturated and Unsaturated Aliphatic Acids (and Agriculturally Acceptable Salts Thereof)

Sample Preparation:

Spinosad, an insecticide isolated from culture of *S. spinosa* and comprising spinosyns A and D, was provided as the active ingredient in Entrust® SC insecticide (available from Dow Agrosciences LLC, Indianapolis, IN, USA), and is present as 22.5% w/w of the Entrust® SC liquid formulation. Entrust® SC liquid formulation was diluted in water to form an Entrust® SC stock solution of 0.0000034% or 0.034 ppm of the Entrust® SC formulation (and containing 0.0077 ppm spinosad active ingredient). A stock solution was prepared for each of: (2E,4E)-2,4 hexadienoic acid, trans-2 hexanoic acid, trans-3 hexanoic acid, hexanoic acid, octanoic acid, octanoic acid potassium salt, decanoic acid, dodecanoic acid, 5-hexenoic acid, 7-octenoic acid, 3-heptanoic acid, trans-2 nonenoic acid, 3-nonenoic acid, 3-octenoic acid, trans-3 octenoic acid, trans-2 decenoic acid, 3-decenoic acid, 9-decenoic acid, trans-2 undecenoic acid, heptanoic acid, and nonanoic acid (sourced as disclosed in examples above), by dissolving each exemplary unsaturated aliphatic acid in 100% dimethylsulfoxide (DMSO), followed by 50-fold dilution with water to provide a concentration of each aliphatic acid of 0.1% or 1,000 ppm in the stock solution. A stock solution was prepared for each of the potassium salt of (2E,4E)-2,4-hexadienoic acid, and the potassium salt of octanoic acid by dissolving the salt in water to form a 1.0% (1000 ppm) stock solution.

An artificial diet suitable for *Trichoplusia ni* (cabbage looper caterpillar) was prepared from a commercially available general purpose lepidoptera artificial diet premix (General Purpose Lepidoptera Diet available from Frontier Scientific Services, Newark, DE) mixed in agar media and then heated to liquify the media. The liquid artificial diet media was then used to fill each well of a 96-well treatment plate with 200 uL of artificial diet media, which was allowed to solidify at room temperature and stored at approximately 4 C.

The Entrust® SC stock solution and each exemplary saturated or unsaturated aliphatic acid (or salt thereof) individually and in combination, were diluted in water to produce treatment formulations having a concentration of 0.00000085% (0.0085 ppm) for the Entrust® SC formulation (and containing 0.0019 ppm spinosad active ingredient), and 0.5% (500 ppm) for each of the exemplary unsaturated or saturated aliphatic acid (and salt) components. A 20 uL treatment sample of each treatment formulation was then placed on top of the solidified artificial diet media in each well of the 96 well plates and allowed to dry overnight. The following day, one neonate Trichoplusia ni (cabbage looper) larva (hatched from eggs obtained from the Natural Resource Canada insect research facility in Sault-Ste-Marie, ON, Canada) was added to each well of the plate, and their mortality rate was evaluated after 5 days, to determine the insecticidal efficacy of the Entrust® SC treatment alone, each exemplary unsaturated or saturated aliphatic acid (and salt) alone, and each combination of spinosad (as Entrust® SC) and unsaturated or saturated aliphatic acid (and salt). Each experiment contained 3 replicates.

The aggregate results showing the insecticidal efficacy (which is equal to (100%−(survival rate)) for each treatment are shown below in Table 121 (corresponding to an unsaturated or saturated aliphatic acid and salt concentration of 500 ppm).

The observed survival rate in percent (equal to 1−(mortality rate in %)) was converted to observed treatment efficacies to take account of the background mortality in the untreated (water) control using the well-established Abbott Formula:

Observed Efficacy, W, of a treatment $$Y \text{ (in \%)} = W_y = \frac{(X-Y)}{X} \times 100. \quad \text{(min zero)}$$

where X=survival rate of untreated control (%)
Y=survival rate of treatment Y (%)
-per W. S. Abbott, A Method of Computing the Effectiveness of an Insecticide, Journal of Economic Entomology, Vol. 19, 1925, pp. 265-267.

The resulting Observed Efficacy of individual and combination treatments was used to evaluate the efficacy data in Table 74 for synergistic effects in the combination of spinosad (as Entrust® SC) and the exemplary unsaturated and saturated aliphatic acids (and salts), using the Colby Formula, per S. R. Colby, Calculating Synergistic and Antagonistic Responses of Herbicide Combinations, Weeds, Vol. 15, No. 1 (January 1967), as is well known in the agricultural experimental field for determining synergism between two or more compounds. In accordance with the Colby Formula, the expected efficacy, E (%), of a combination treatment of compounds A (spinosad) and B (unsaturated or saturated aliphatic acid or salt) in concentrations a and b, respectively, can be determined by evaluating:

$E=x+y-(xy/100)$; where:

x=efficacy (%) of compound A alone, applied at concentration a;

y=efficacy (%) of compound B alone, applied at concentration b.

The existence and extent of synergy present in a combination treatment can be determined according to the Colby Formula by evaluating a Synergy Factor, SF=(Observed efficacy) W/(Expected efficacy) E. For values of SF>1, synergistic efficacy is shown in the observed efficacy of the combination of compounds, with increasing synergy present as the SF increases above 1. While for SF<1, antagonism is present and for SF=1, the efficacy of the compounds is merely additive. Table 121 shows the Synergy Factor calculated according to the above Colby Formula for the observed insecticidal efficacy of each combination treatment between spinosad (as Enturst® SC) and the tested exemplary unsaturated or saturated aliphatic acids (and salts). As shown in Table 74, the combination of spinosad (as Entrust® SC) insecticide at 0.034 ppm (equivalent to 0.0019 ppm of spinosad as the insecticidal active ingredient) with exemplary unsaturated or saturated aliphatic acid (and salt) concentration of 500 ppm produced synergistic efficacy factors of between 1.17 to 3.0 times, relative to the Expected efficacy of the individual components assuming mere additivity, thus indicating strong evidence of the synergistic pesticidal efficacy of the below combinations, according to an embodiment of the invention.

TABLE 74

Expected and Observed Efficacy (%) of Entrust ® SC (Spinosad AI) at 0.034 ppm (0.0019 ppm of spinosad) in combination with Unsaturated/Saturated Aliphatic Acid (salt) at 500 ppm

| Treatment | Observed Efficacy, W (%) | Expected Efficacy, E (%) | Synergy Factor (W/E) |
|---|---|---|---|
| Entrust ® SC @ 0.034 ppm (0.0019 ppm spinosad) | 27.3 | — | — |
| (2E,4E)-2,4 hexadienoic acid, K-salt | 9.1 | — | — |
| (2E,4E)-2,4 hexadienoic acid | 4.5 | — | — |
| Trans-2-hexenoic acid | 0 | — | — |
| Trans-3-hexenoic acid | 0 | — | — |
| Hexanoic acid | 27.3 | — | — |
| Octanoic acid | 4.5 | — | — |
| Octanoic acid, K-salt | 0 | — | — |
| Decanoic acid | 0 | — | — |
| Dodecanoic acid | 0 | — | — |
| 5-hexenoic acid | 0 | — | — |
| 7-octenoic acid | 0 | — | — |
| 3-heptanoic acid | 4.5 | — | — |
| Trans-2 nonenoic acid | 3.6 | — | — |
| 3-nonenoic acid | 9.1 | — | — |
| 3-octenoic acid | 0 | — | — |
| Trans-3 octenoic acid | 4.5 | — | — |
| Trans-2 decenoic acid | 0 | — | — |
| 3-decenoic acid | 0 | — | — |
| 9-decenoic acid | 4.5 | — | — |
| Trans-2 undecenoic acid | 27.3 | — | — |
| Heptanoic acid | 9.1 | — | — |
| Nonanoic acid | 0 | — | — |
| Entrust ® SC × (2E,4E)-2,4 hexadienoic acid, K-salt | 40.9 | 33.9 | 1.21 |
| Entrust ® SC × (2E,4E)-2,4 hexadienoic acid | 59.1 | 30.6 | 1.93 |
| Entrust ® SC × Trans-2-hexenoic acid | 40.9 | 27.3 | 1.50 |
| Entrust ® SC × Trans-3-hexenoic acid | 50.0 | 20.7 | 2.42 |
| Entrust ® SC × Hexanoic acid | 73.7 | 47.1 | 1.54 |
| Entrust ® SC × Octanoic acid | 63.6 | 30.6 | 2.08 |
| Entrust ® SC × Octanoic acid, K-salt | 31.8 | 27.3 | 1.17 |
| Entrust ® SC × Decanoic acid | 77.3 | 27.3 | 2.83 |
| Entrust ® SC × Dodecanoic acid | 40.9 | 27.3 | 1.50 |

TABLE 74-continued

Expected and Observed Efficacy (%) of Entrust ® SC
(Spinosad AI) at 0.034 ppm (0.0019 ppm of spinosad) in combination
with Unsaturated/Saturated Aliphatic Acid (salt) at 500 ppm

| Treatment | Observed Efficacy, W (%) | Expected Efficacy, E (%) | Synergy Factor (W/E) |
|---|---|---|---|
| Entrust ® SC × 5-hexenoic acid | 40.9 | 27.3 | 1.50 |
| Entrust ® SC × 7-octenoic acid | 45.5 | 27.3 | 1.67 |
| Entrust ® SC × 3-heptanoic acid | 50.0 | 30.6 | 1.64 |
| Entrust ® SC × Trans-2 nonenoic acid | 77.3 | 27.3 | 2.83 |
| Entrust ® SC × 3-nonenoic acid | 81.8 | 33.9 | 2.41 |
| Entrust ® SC × 3-octenoic acid | 63.6 | 27.3 | 2.33 |
| Entrust ® SC × Trans-3 octenoic acid | 68.2 | 30.6 | 2.23 |
| Entrust ® SC × Trans-2 decenoic acid | 68.2 | 27.3 | 2.50 |
| Entrust ® SC × 3-decenoic acid | 77.3 | 27.3 | 2.83 |
| Entrust ® SC × 9-decenoic acid | 90.9 | 30.6 | 2.97 |
| Entrust ® SC × Trans-2 undecenoic acid | 95.5 | 47.1 | 2.03 |
| Entrust ® SC × Heptanoic acid | 72.7 | 33.9 | 2.15 |
| Entrust ® SC × Nonanoic acid | 81.8 | 27.3 | 3.00 |

Example 20: In-Planta Insecticidal Efficacy Against *Trichoplusia ni* by Spinosad (Active Ingredient in Entrust® SC Insecticide), in Combination with an Exemplary Saturated Aliphatic Acid Sample Preparation:

Spinosad, an insecticide isolated from culture of *S. spinosa* and comprising spinosyns A and D, was provided as the active ingredient in Entrust® SC insecticide (available from Dow Agrosciences LLC, Indianapolis, IN, USA), and is present as 22.5% w/w of the Entrust® SC liquid formulation. Entrust® SC liquid formulation was diluted in water to form an Entrust® SC stock solution of 0.0584% or 584 ppm of the Entrust® SC formulation (and containing 131 ppm spinosad as active ingredient).

A stock solution was prepared for octanoic acid (available from Sigma-Aldrich, St. Louis, MO, USA), by dissolving octanoic acid in water with Tween® 60 ethoxylated sorbitan ester (available from Croda Inc., Edison, NJ, USA) to provide a concentration of octanoic acid of 0.1% or 1,000 ppm, and a concentration of Tween® 60 of 3% in the stock solution. Individual and combined treatment formulations were prepared by adding stock solution of the exemplary saturated aliphatic acid (octanoic acid) to the spinosad (provided as Entrust® SC) stock solution, and diluting with water to provide treatment formulations having Entrust® SC concentrations of 14.6 ppm, 3.65 ppm, and 1.46 ppm, (corresponding to spinosad concentrations of 3.29 ppm, 0.821 ppm, and 0.329 ppm, respectively) and concentrations of the exemplary octanoic acid saturated aliphatic acid of 100 ppm for all treatment formulations.

Green cabbage plants (*Brassica oleracea* var. capitate, Danish Ballhead cultivar) were grown from seed (available from West Coast Seeds, Delta, BC, Canada) in potting soil for 4-6 weeks in a pest-free indoor growing environment. At between 4-6 weeks of age, each cabbage plant was sprayed with 20 mL of treatment solution using a pressurized $CO_2$ sprayer, and allowed to dry. After the treatment solution sprays had dried on the leaves of the cabbage plants, 5 neonate *Trichoplusia ni* (cabbage looper) larvae (hatched from eggs obtained from the Natural Resource Canada insect research facility in Sault-Ste-Marie, ON, Canada) were placed directly on each leaf of each cabbage plant. Small fine mesh organza bags were then secured over each leaf to contain the 5 larvae on each leaf and the treated and infested cabbage plants were then placed in an indoor growing environment and the larvae were left to feed on the plants for 6 days, at which time the number of surviving larvae were observed and survival rates (%) were determined.

The aggregate results showing the insecticidal efficacy (which is equal to (100%−(survival rate)) for each treatment are shown below in Table 75 (corresponding to octanoic acid concentration of 100 ppm, and Entrust® SC concentrations of 14.6 ppm, 3.65 ppm, and 1.46 ppm, which correspond to spinosad concentrations of 3.29 ppm, 0.821 ppm, and 0.329 ppm, respectively).

The observed survival rate in percent (also equivalent to 100−(mortality rate in %)) was converted to observed treatment efficacies to take account of the background mortality in the untreated (water) control using the well-established Abbott Formula:

Observed Efficacy, W, of a treatment $$Y \text{ (in \%)} = W_Y = \frac{(X - Y)}{X} \times 100. \qquad \text{(min zero)}$$

where X=survival rate of untreated control (%)
Y=survival rate of treatment Y (%)
-per W. S. Abbott, A Method of Computing the Effectiveness of an Insecticide, Journal of Economic Entomology, Vol. 19, 1925, pp. 265-267.

The resulting Observed Efficacy of individual and combination treatments was used to evaluate the efficacy data in Table 122 for synergistic effects in the combination of spinosad (as Entrust® SC) and octanoic acid as an exemplary aliphatic acid, using the Colby Formula, per S. R. Colby, Calculating Synergistic and Antagonistic Responses of Herbicide Combinations, Weeds, Vol. 15, No. 1 (January 1967), as is well known in the agricultural experimental field for determining synergism between two or more compounds. In accordance with the Colby Formula, the expected efficacy, E (%), of a combination treatment of compounds A (spinosad) and B (aliphatic acid) in concentrations a and b, respectively, can be determined by evaluating:

$E=x+y-(xy/100)$; where:

x=efficacy (%) of compound A alone, applied at concentration a;
y=efficacy (%) of compound B alone, applied at concentration b.

The existence and extent of synergy present in a combination treatment can be determined according to the Colby Formula by evaluating a Synergy Factor, SF=(Observed efficacy) W/(Expected efficacy) E. For values of SF>1, synergistic efficacy is shown in the observed efficacy of the combination of compounds, with increasing synergy present as the SF increases above 1. While for SF<1, antagonism is present and for SF=1, the efficacy of the compounds is merely additive.

Table 75 shows the Synergy Factor calculated according to the above Colby Formula for the observed insecticidal efficacy of each combination treatment between spinosad (as Entrust® SC) and the tested exemplary octanoic acid as aliphatic acid. As shown in Table 122, the tested combinations of spinosad (as Entrust® SC) insecticide and exemplary octanoic acid aliphatic acid produced synergistic efficacy factors of between 1.19 to 2.44 times, relative to the Expected efficacy of the individual components assuming mere additivity, thus indicating strong evidence of the synergistic pesticidal efficacy of the below combinations, according to an embodiment of the invention. In a further embodiment, it was also found that occurrence of leaf damage to the cabbage leaves during the above-described *T. ni* trials decreased in plants treated with combinations (Entrust® SC and octanoic acid) which showed synergistic pesticidal efficacy, relative to plants treated with the spinosad pesticidal active or aliphatic acid individually.

TABLE 75

Expected and Observed Efficacy (%) of Entrust ® SC (Spinosad AI) at 14.6, 3.65 and 1.46 ppm (3.29 ppm, 0.821 ppm, and 0.329 ppm of spinosad) in combination with an exemplary Aliphatic Acid at 100 ppm

| Treatment | Observed Efficacy, W (%) | Expected Efficacy, E (%) | Synergy Factor (W/E) |
|---|---|---|---|
| Entrust ® SC @ 14.6 ppm (3.29 ppm spinosad) | 84.1 | — | — |
| Entrust ® SC @ 3.65 ppm (0.821 ppm spinosad) | 40.9 | — | — |
| Entrust ® SC @ 1.46 ppm (0.329 ppm spinosad) | 40.9 | — | — |
| Octanoic acid @ 100 ppm | 0 | — | — |
| Entrust ® SC @ 14.6 ppm × Octanoic acid @ 100 ppm | 100 | 84.1 | 1.19 |
| Entrust ® SC @ 3.65 ppm × Octanoic acid @ 100 ppm | 100 | 40.9 | 2.44 |
| Entrust ® SC @ 1.46 ppm × Octanoic acid @ 100 ppm | 93.2 | 40.9 | 2.28 |

In some embodiments according to the present disclosure, and as illustrated in some exemplary embodiments in the above-described experimental examples, the combination of a C6-C10 unsaturated aliphatic acid (and agriculturally acceptable salts thereof in some particular embodiments) and a pesticidal active ingredient produces a synergistic pesticidal composition demonstrating a synergistic effect. That is, when used in combination, the C6-C10 unsaturated aliphatic acid and the pesticidal active ingredient have an efficacy that is greater than would be expected by simply adding the efficacy of the pesticidal active ingredient and the C6-C10 unsaturated aliphatic acid when used alone. In some alternative embodiments, the unsaturated aliphatic acid or agriculturally acceptable salt thereof may comprise a C11 unsaturated aliphatic acid or agriculturally acceptable salt thereof. In some further alternative embodiments, the unsaturated aliphatic acid or agriculturally acceptable salt thereof may comprise a C12 unsaturated aliphatic acid or agriculturally acceptable salt thereof.

In some embodiments according to the present disclosure, and as illustrated in some exemplary embodiments in the above-described experimental examples, the combination of a C6-C10 saturated aliphatic acid (and agriculturally acceptable salts thereof in some particular embodiments) and a pesticidal active ingredient produces a synergistic pesticidal composition demonstrating a synergistic effect. That is, when used in combination, the C6-C10 saturated aliphatic acid and the pesticidal active ingredient have an efficacy that is greater than would be expected by simply adding the efficacy of the pesticidal active ingredient and the C6-C10 saturated aliphatic acid when used alone. In some alternative embodiments according to the present disclosure, the combination of a C11 or C12 saturated aliphatic acid (and agriculturally acceptable salts thereof in some particular embodiments) and a pesticidal active ingredient produces a synergistic pesticidal composition demonstrating a synergistic effect.

While a number of exemplary aspects and embodiments have been discussed above, those of skill in the art will recognize certain modifications, permutations, additions and sub-combinations thereof. It is therefore intended that the following appended claims and claims hereafter introduced are to be given the broadest interpretation consistent with the disclosure as a whole.

What is claimed is:

1. A pesticidal composition comprising:
   an insecticidal active ingredient comprising at least one nicotinic acetylcholine receptor disruptor or allosteric modulator, wherein the at least one nicotinic acetylcholine receptor disruptor or allosteric modulator is a spinosyn, spinosad or spinetoram; and
   a C6-C10 saturated or unsaturated aliphatic acid or an agriculturally compatible salt thereof;
   wherein a ratio of the concentrations of said pesticidal active ingredient and said C6-C10 saturated or unsaturated aliphatic acid or an agriculturally compatible salt thereof is between about 1:1 and about 1:15000.

2. The pesticidal composition according to claim 1, wherein the at least one nicotinic acetylcholine receptor disruptor or allosteric modulator is spinosad.

3. The pesticidal composition according to claim 1, wherein the at least one nicotinic acetylcholine receptor disruptor or allosteric modulator is a spinosyn.

4. The pesticidal composition according to claim 1, wherein the pesticidal composition has a FIC Index value of less than 1.

5. The pesticidal composition according to claim 1, wherein the C6-C10 saturated or unsaturated aliphatic acid comprises a C6-C10 saturated or unsaturated aliphatic acid additionally comprising a methyl-, ethyl-, hydroxy-, or amino-substituent.

6. The pesticidal composition according to claim 1, wherein said composition comprises a pesticidally effective concentration of said insecticidal active ingredient and said C6-C10 saturated or unsaturated aliphatic acid or agriculturally compatible salt thereof.

7. The pesticidal composition according to claim 1, wherein said agriculturally compatible salt thereof comprises at least one of a potassium, sodium, calcium, aluminum and ammonium salt of a C6-C10 saturated or unsaturated aliphatic acid.

8. The pesticidal composition according to claim 1, wherein a ratio of the concentrations of said insecticidal active ingredient and said C6-C10 saturated or unsaturated aliphatic acid or an agriculturally compatible salt thereof is between at least one of: about 1:1 and about 1:15,000, about 1:1 and about 1:10,000, about 1:1 and about 1:5000, about 1:1 and about 1:2500, about 1:1 and about 1:1500, about 1:1 and about 1:1000, about 1:1 and about 1:750, about 1:1 and about 1:500, about 1:1 and about 1:400, about 1:1 and about 1:300, about 1:1 and about 1:250, about 1:1 and about 1:200, about 1:1 and about 1:150, about 1:1 and about 1:100, about 1:1 and about 1:90, about 1:1 and about 1:80, about 1:1 and about 1:70, about 1:1 and about 1:60, about 1:1 and about 1:50, about 1:1 and about 1:40, about 1:1 and about 1:30, about 1:1 and about 1:25, about 1:1 and about 1:20, about 1:1 and about 1:15, about 1:1 and about 1:10, about 1:1 and about 1:9, about 1:1 and about 1:8, about 1:1 and about 1:7, about 1:1 and about 1:6, about 1:1 and about 1:5, about 1:1 and about 1:4, about 1:1 and about 1:3, about 1:1 and about 1:2, about 1:1 and about 1:1.5, and about 1:1 and about 1.25.

9. The pesticidal composition according to claim 1, wherein the pesticidal composition has a FIC Index value of less than 0.75.

10. The pesticidal composition according to claim 1, wherein the pesticidal composition has a FIC Index value of less than 0.5.

11. A method of enhancing the pesticidal activity of at least one nicotinic acetylcholine receptor disruptor or allosteric modulator pesticidal active ingredient adapted to control at least one target insect or acari pest, comprising:
   providing the at least one nicotinic acetylcholine receptor disruptor or allosteric modulator insecticidal active ingredient that is active for said at least one target insect or acari pest, wherein the at least one nicotinic acetylcholine receptor disruptor or allosteric modulator is a spinosyn, spinosad or spinetoram;
   adding an effective concentration of at least one C6-C10 saturated or unsaturated aliphatic acid, or an agriculturally acceptable salt thereof, to said insecticidal active ingredient to provide a pesticidal composition; and
   applying said pesticidal composition in a pesticidally effective concentration to control said at least one target insect or acari pest;
   wherein a ratio of the concentrations of said pesticidal active ingredient and said C6-C10 saturated or unsaturated aliphatic acid or an agriculturally compatible salt thereof is between about 1:1 and about 1:15000.

12. The method according to claim 11, wherein the C6-C10 saturated or unsaturated aliphatic acid comprises a C6-C10 saturated or unsaturated aliphatic acid additionally comprising a methyl-, ethyl-, hydroxy-, or amino-substituent.

13. The method according to claim 11, wherein the at least one nicotinic acetylcholine receptor disruptor or allosteric modulator insecticidal active ingredient is spinosad.

14. The method according to claim 11, wherein the at least one nicotinic acetylcholine receptor disruptor or allosteric modulator insecticidal active ingredient is a spinosyn.

15. The method according to claim 11, wherein a ratio of said concentration of said C6-C10 saturated or unsaturated aliphatic acid or an agriculturally compatible salt thereof and said nicotinic acetylcholine receptor disruptor or allosteric modulator insecticidal active ingredient is between at least one of: about 1:1 and about 1:15,000, about 1:1 and about 1:10,000, about 1:1 and about 1:5000, about 1:1 and about 1:2500, about 1:1 and about 1:1500, about 1:1 and about 1:1000, about 1:1 and about 1:750, about 1:1 and about 1:500, about 1:1 and about 1:400, about 1:1 and about 1:300, about 1:1 and about 1:250, about 1:1 and about 1:200, about 1:1 and about 1:150, about 1:1 and about 1:100, about 1:1 and about 1:90, about 1:1 and about 1:80, about 1:1 and about 1:70, about 1:1 and about 1:60, about 1:1 and about 1:50, about 1:1 and about 1:40, about 1:1 and about 1:30, about 1:1 and about 1:25, about 1:1 and about 1:20, about 1:1 and about 1:15, about 1:1 and about 1:10, about 1:1 and about 1:9, about 1:1 and about 1:8, about 1:1 and about 1:7, about 1:1 and about 1:6, about 1:1 and about 1:5, about 1:1 and about 1:4, about 1:1 and about 1:3, about 1:1 and about 1:2, about 1:1 and about 1:1.5, and about 1:1 and about 1.25.

16. The method according to claim 11, wherein the C6-C10 unsaturated aliphatic acid comprises at least one of: a trans-hexenoic acid, a cis-hexenoic acid, a hexa-dienoic acid, a hexynoic acid, a trans-heptenoic acid, a cis-heptenoic acid, a hepta-dienoic acid, a heptynoic acid, a trans-octenoic acid, a cis-octenoic acid, an octa-dienoic acid, an octynoic acid, a trans-nonenoic acid, a cis-nonenoic acid, a nona-dienoic acid, a nonynoic acid, a trans-decenoic acid, a cis-decenoic acid, a deca-dienoic acid, and a decynoic acid; and/or
wherein the C6-C10 saturated aliphatic acid comprises at least one of hexanoic, heptanoic, octanoic, nonanoic and decanoic acid.

17. A pesticidal composition comprising:
one or more nicotinic acetylcholine receptor disruptor or allosteric modulator insecticidal agents, wherein the at least one nicotinic acetylcholine receptor disruptor or allosteric modulator insecticidal agent is a spinosyn, spinosad or spinetoram; and
one or more saturated or unsaturated C6-C10 aliphatic acids or agriculturally compatible salts thereof,
wherein said one or more nicotinic acetylcholine receptor disruptor or allosteric modulator insecticidal agents and said one or more saturated or unsaturated C6-C10 aliphatic acids are present in a concentration ratio between about 1:1 and about 1:15,000.

18. The pesticidal composition according to claim 17, wherein the one or more nicotinic acetylcholine receptor disruptor insecticidal agent is spinosad.

19. The pesticidal composition according to claim 17, wherein the at least one nicotinic acetylcholine receptor disruptor or allosteric modulator insecticidal agent is a spinosyn.

20. The pesticidal composition according to claim 17, wherein said concentration ratio of said insecticidal agent and said C6-C10 saturated or unsaturated aliphatic acid or an agriculturally compatible salt thereof is between at least one of: about 1:1 and about 1:15,000, about 1:1 and about 1:10,000, about 1:1 and about 1:5000, about 1:1 and about 1:2500, about 1:1 and about 1:1500, about 1:1 and about 1:1000, about 1:1 and about 1:750, about 1:1 and about 1:500, about 1:1 and about 1:400, about 1:1 and about 1:300, about 1:1 and about 1:250, about 1:1 and about 1:200, about 1:1 and about 1:150, about 1:1 and about 1:100, about 1:1 and about 1:90, about 1:1 and about 1:80, about 1:1 and about 1:70, about 1:1 and about 1:60, about 1:1 and about 1:50, about 1:1 and about 1:40, about 1:1 and about 1:30, about 1:1 and about 1:25, about 1:1 and about 1:20, about 1:1 and about 1:15, about 1:1 and about 1:10, about 1:1 and about 1:9, about 1:1 and about 1:8, about 1:1 and about 1:7, about 1:1 and about 1:6, about 1:1 and about 1:5, about 1:1 and about 1:4, about 1:1 and about 1:3, about 1:1 and about 1:2, about 1:1 and about 1:1.5, and about 1:1 and about 1.25.

21. The pesticidal composition according to claim 17, wherein the C6-C10 saturated or unsaturated aliphatic acid comprises a C6-C10 unsaturated aliphatic acid, and wherein the unsaturated C6-C10 aliphatic acid comprises at least one of: a trans-2, trans-3, trans-4, trans-5, trans-6, trans-7, trans-8, and trans-9, cis-2, cis-3, cis-4, cis-5, cis-6, cis-7, cis-8, and cis-9 unsaturated bond.

22. The pesticidal composition according to claim 17, wherein the C6-C10 saturated or unsaturated aliphatic acid comprises a C6-C10 saturated aliphatic acid, comprising at least one of: a hexanoic, a heptanoic, an octanoic, a nonanoic and a decanoic acid.

* * * * *